United States Patent
Yang et al.

(10) Patent No.: US 9,552,495 B2
(45) Date of Patent: Jan. 24, 2017

(54) SYSTEM AND METHOD FOR SECURITY AND PRIVACY AWARE VIRTUAL MACHINE CHECKPOINTING

(71) Applicant: The Research Foundation for the State University of New York, Binghamton, NY (US)

(72) Inventors: Ping Yang, Vestal, NY (US); Kartik Gopalan, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 0 days.

(21) Appl. No.: 14/753,800

(22) Filed: Jun. 29, 2015

(65) Prior Publication Data
US 2015/0317491 A1 Nov. 5, 2015

Related U.S. Application Data

(63) Continuation of application No. 14/040,820, filed on Sep. 30, 2013, now Pat. No. 9,069,782.

(60) Provisional application No. 61/708,232, filed on Oct. 1, 2012.

(51) Int. Cl.
| | | |
|---|---|---|
| G06F 21/62 | (2013.01) | |
| G06F 11/14 | (2006.01) | |
| G06F 17/30 | (2006.01) | |
| G06F 9/455 | (2006.01) | |
| G06F 21/53 | (2013.01) | |

(Continued)

(52) U.S. Cl.
CPC ....... *G06F 21/6245* (2013.01); *G06F 9/45558* (2013.01); *G06F 11/1451* (2013.01); *G06F 17/30088* (2013.01); *G06F 17/30091* (2013.01); *G06F 21/53* (2013.01); *G06F 21/79* (2013.01); *G06F 2009/45583* (2013.01); *G06F 2009/45587* (2013.01); *G06F 2201/84* (2013.01)

(58) Field of Classification Search
None
See application file for complete search history.

(56) References Cited

U.S. PATENT DOCUMENTS

| | | |
|---|---|---|
| 4,247,892 A | 1/1981 | Lawrence |
| 4,514,846 A | 4/1985 | Federico et al. |
| 4,584,639 A | 4/1986 | Hardy |

(Continued)

OTHER PUBLICATIONS

Xfree86. www.xfree86.org/4.2.0/xwininfo.1.html, Apr. 2, 2011.

(Continued)

*Primary Examiner* — Scott Sun
(74) *Attorney, Agent, or Firm* — Steven M. Hoffberg, Esq.; Ostrolenk Faber LLP

(57) ABSTRACT

A checkpointing method for creating a file representing a restorable state of a virtual machine in a computing system, comprising identifying processes executing within the virtual machine that may store confidential data, and marking memory pages and files that potentially contain data stored by the identified processes; or providing an application programming interface for marking memory regions and files within the virtual machine that contain confidential data stored by processes; and creating a checkpoint file, by capturing memory pages and files representing a current state of the computing system, which excludes information from all of the marked memory pages and files.

20 Claims, 6 Drawing Sheets

(51) Int. Cl.
*G06F 21/79* (2013.01)
*G06F 3/00* (2006.01)

(56) References Cited

U.S. PATENT DOCUMENTS

| | | |
|---|---|---|
| 4,625,081 A | 11/1986 | Lotito et al. |
| 4,665,520 A | 5/1987 | Strom et al. |
| 4,674,038 A | 6/1987 | Brelsford et al. |
| 4,916,605 A | 4/1990 | Beardsley et al. |
| 4,987,532 A | 1/1991 | Noguchi |
| 5,165,031 A | 11/1992 | Pruul et al. |
| 5,170,340 A | 12/1992 | Prokop et al. |
| 5,175,679 A | 12/1992 | Allen et al. |
| 5,179,702 A | 1/1993 | Spix et al. |
| 5,191,651 A | 3/1993 | Halim et al. |
| 5,222,217 A | 6/1993 | Blount et al. |
| 5,237,684 A | 8/1993 | Record et al. |
| 5,261,089 A | 11/1993 | Coleman et al. |
| 5,276,876 A | 1/1994 | Coleman et al. |
| 5,305,056 A | 4/1994 | Salgado et al. |
| 5,305,454 A | 4/1994 | Record et al. |
| 5,319,773 A | 6/1994 | Britton et al. |
| 5,319,774 A | 6/1994 | Ainsworth et al. |
| 5,327,532 A | 7/1994 | Ainsworth et al. |
| 5,347,632 A | 9/1994 | Filepp et al. |
| 5,355,484 A | 10/1994 | Record et al. |
| 5,363,505 A | 11/1994 | Maslak et al. |
| 5,410,684 A | 4/1995 | Ainsworth et al. |
| 5,410,700 A | 4/1995 | Fecteau et al. |
| 5,421,012 A | 5/1995 | Khoyi et al. |
| 5,446,904 A | 8/1995 | Belt et al. |
| 5,530,868 A | 6/1996 | Record et al. |
| 5,551,033 A | 8/1996 | Foster et al. |
| 5,592,670 A | 1/1997 | Pletcher |
| 5,606,668 A | 2/1997 | Shwed |
| 5,608,720 A | 3/1997 | Biegel et al. |
| 5,613,060 A | 3/1997 | Britton et al. |
| 5,625,821 A | 4/1997 | Record et al. |
| 5,758,072 A | 5/1998 | Filepp et al. |
| 5,765,004 A | 6/1998 | Foster et al. |
| 5,822,564 A | 10/1998 | Chilton et al. |
| 5,903,766 A | 5/1999 | Walker et al. |
| 5,905,855 A | 5/1999 | Klaiber et al. |
| 6,016,500 A | 1/2000 | Waldo et al. |
| 6,075,938 A | 6/2000 | Bugnion et al. |
| 6,094,528 A | 7/2000 | Jordan |
| 6,112,304 A | 8/2000 | Clawson |
| 6,115,712 A | 9/2000 | Islam et al. |
| 6,178,504 B1 | 1/2001 | Fieres et al. |
| 6,186,677 B1 | 2/2001 | Angel et al. |
| 6,195,676 B1 | 2/2001 | Spix et al. |
| 6,199,100 B1 | 3/2001 | Filepp et al. |
| 6,199,198 B1 | 3/2001 | Graham |
| 6,223,293 B1 | 4/2001 | Foster et al. |
| 6,243,716 B1 | 6/2001 | Waldo et al. |
| 6,247,027 B1 | 6/2001 | Chaudhry et al. |
| 6,275,852 B1 | 8/2001 | Filepp et al. |
| 6,289,382 B1 | 9/2001 | Bowman-Amuah |
| 6,301,673 B1 | 10/2001 | Foster et al. |
| 6,317,438 B1 | 11/2001 | Trebes, Jr. |
| 6,321,366 B1 | 11/2001 | Tseng et al. |
| 6,332,163 B1 | 12/2001 | Bowman-Amuah |
| 6,339,832 B1 | 1/2002 | Bowman-Amuah |
| 6,353,881 B1 | 3/2002 | Chaudhry et al. |
| 6,360,193 B1 | 3/2002 | Stoyen |
| 6,378,068 B1 | 4/2002 | Foster et al. |
| 6,397,379 B1 | 5/2002 | Yates, Jr. et al. |
| 6,421,739 B1 | 7/2002 | Holiday |
| 6,430,570 B1 | 8/2002 | Judge et al. |
| 6,430,649 B1 | 8/2002 | Chaudhry et al. |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,438,677 B1 | 8/2002 | Chaudhry et al. |
| 6,442,663 B1 | 8/2002 | Sun et al. |
| 6,442,748 B1 | 8/2002 | Bowman-Amuah |
| 6,453,463 B1 | 9/2002 | Chaudhry et al. |
| 6,460,067 B1 | 10/2002 | Chaudhry et al. |
| 6,463,457 B1 | 10/2002 | Armentrout et al. |
| 6,463,526 B1 | 10/2002 | Chaudhry et al. |
| 6,463,582 B1 | 10/2002 | Lethin et al. |
| 6,477,580 B1 | 11/2002 | Bowman-Amuah |
| 6,477,665 B1 | 11/2002 | Bowman-Amuah |
| 6,493,730 B1 | 12/2002 | Lewis et al. |
| 6,496,850 B1 | 12/2002 | Bowman-Amuah |
| 6,502,102 B1 | 12/2002 | Haswell et al. |
| 6,502,135 B1 | 12/2002 | Munger et al. |
| 6,502,213 B1 | 12/2002 | Bowman-Amuah |
| 6,510,352 B1 | 1/2003 | Badavas et al. |
| 6,523,027 B1 | 2/2003 | Underwood |
| 6,523,059 B1 | 2/2003 | Schmidt |
| 6,529,909 B1 | 3/2003 | Bowman-Amuah |
| 6,529,948 B1 | 3/2003 | Bowman-Amuah |
| 6,539,396 B1 | 3/2003 | Bowman-Amuah |
| 6,546,397 B1 | 4/2003 | Rempell |
| 6,549,949 B1 | 4/2003 | Bowman-Amuah |
| 6,549,959 B1 | 4/2003 | Yates et al. |
| 6,550,057 B1 | 4/2003 | Bowman-Amuah |
| 6,571,282 B1 | 5/2003 | Bowman-Amuah |
| 6,578,068 B1 | 6/2003 | Bowman-Amuah |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,609,128 B1 | 8/2003 | Underwood |
| 6,615,199 B1 | 9/2003 | Bowman-Amuah |
| 6,615,253 B1 | 9/2003 | Bowman-Amuah |
| 6,618,761 B2 | 9/2003 | Munger et al. |
| 6,625,751 B1 | 9/2003 | Starovic et al. |
| 6,633,878 B1 | 10/2003 | Underwood |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,643,650 B1 | 11/2003 | Slaughter et al. |
| 6,658,451 B1 | 12/2003 | Chaudhry et al. |
| 6,684,398 B2 | 1/2004 | Chaudhry et al. |
| 6,691,250 B1 | 2/2004 | Chandiramani et al. |
| 6,701,514 B1 | 3/2004 | Haswell et al. |
| 6,704,862 B1 | 3/2004 | Chaudhry et al. |
| 6,704,873 B1 | 3/2004 | Underwood |
| 6,715,145 B1 | 3/2004 | Bowman-Amuah |
| 6,718,438 B2 | 4/2004 | Lewis et al. |
| 6,718,486 B1 | 4/2004 | Roselli et al. |
| 6,718,535 B1 | 4/2004 | Underwood |
| 6,718,538 B1 | 4/2004 | Mathiske |
| 6,721,944 B2 | 4/2004 | Chaudhry et al. |
| 6,732,363 B1 | 5/2004 | Chaudhry et al. |
| 6,742,015 B1 | 5/2004 | Bowman-Amuah |
| 6,742,123 B1 | 5/2004 | Foote |
| 6,754,855 B1 | 6/2004 | Denninghoff et al. |
| 6,760,736 B2 | 7/2004 | Waldo et al. |
| 6,760,815 B1 | 7/2004 | Traversat et al. |
| 6,760,825 B1 | 7/2004 | Sexton et al. |
| 6,763,440 B1 | 7/2004 | Traversat et al. |
| 6,763,452 B1 | 7/2004 | Yates, Jr. et al. |
| 6,772,296 B1 | 8/2004 | Mathiske |
| 6,779,107 B1 | 8/2004 | Yates |
| 6,788,688 B2 | 9/2004 | Trebes, Jr. |
| 6,788,980 B1 | 9/2004 | Johnson |
| 6,789,077 B1 | 9/2004 | Slaughter et al. |
| 6,789,126 B1 | 9/2004 | Saulpaugh et al. |
| 6,789,181 B1 | 9/2004 | Yates et al. |
| 6,792,466 B1 | 9/2004 | Saulpaugh et al. |
| 6,795,966 B1 | 9/2004 | Lim et al. |
| 6,826,616 B2 | 11/2004 | Larson et al. |
| 6,826,748 B1 | 11/2004 | Hohensee et al. |
| 6,832,367 B1 | 12/2004 | Choi et al. |
| 6,834,310 B2 | 12/2004 | Munger et al. |
| 6,837,427 B2 | 1/2005 | Overhultz et al. |
| 6,839,759 B2 | 1/2005 | Larson et al. |
| 6,842,906 B1 | 1/2005 | Bowman-Amuah |
| 6,850,979 B1 | 2/2005 | Saulpaugh et al. |
| 6,854,115 B1 | 2/2005 | Traversat et al. |

(56) References Cited

U.S. PATENT DOCUMENTS

| | | |
|---|---|---|
| 6,862,594 B1 | 3/2005 | Saulpaugh et al. |
| 6,865,657 B1 | 3/2005 | Traversat et al. |
| 6,868,447 B1 | 3/2005 | Slaughter et al. |
| 6,874,066 B2 | 3/2005 | Traversat et al. |
| 6,895,460 B2 | 5/2005 | Desoli et al. |
| 6,898,618 B1 | 5/2005 | Slaughter et al. |
| 6,898,791 B1 | 5/2005 | Chandy et al. |
| 6,907,473 B2 | 6/2005 | Schmidt et al. |
| 6,907,546 B1 | 6/2005 | Haswell et al. |
| 6,912,708 B2 | 6/2005 | Wallman et al. |
| 6,917,976 B1 | 7/2005 | Slaughter et al. |
| 6,918,084 B1 | 7/2005 | Slaughter et al. |
| 6,934,755 B1 | 8/2005 | Saulpaugh et al. |
| 6,934,832 B1 | 8/2005 | Van Dyke et al. |
| 6,938,130 B2 | 8/2005 | Jacobson et al. |
| 6,941,410 B1 | 9/2005 | Traversat et al. |
| 6,941,545 B1 | 9/2005 | Reese et al. |
| 6,950,875 B1 | 9/2005 | Slaughter et al. |
| 6,954,923 B1 | 10/2005 | Yates, Jr. et al. |
| 6,957,237 B1 | 10/2005 | Traversat et al. |
| 6,970,869 B1 | 11/2005 | Slaughter et al. |
| 6,973,493 B1 | 12/2005 | Slaughter et al. |
| 6,973,646 B1 | 12/2005 | Bordawekar et al. |
| 6,978,462 B1 | 12/2005 | Adler et al. |
| 7,003,770 B1 | 2/2006 | Pang et al. |
| 7,010,573 B1 | 3/2006 | Saulpaugh et al. |
| 7,013,456 B1 | 3/2006 | Van Dyke et al. |
| 7,016,966 B1 | 3/2006 | Saulpaugh et al. |
| 7,020,532 B2 | 3/2006 | Johnson et al. |
| 7,020,697 B1 | 3/2006 | Goodman et al. |
| 7,021,535 B2 | 4/2006 | Overhultz et al. |
| 7,028,306 B2 | 4/2006 | Boloker et al. |
| 7,047,394 B1 | 5/2006 | Van Dyke et al. |
| 7,051,192 B2 | 5/2006 | Chaudhry et al. |
| 7,065,549 B2 | 6/2006 | Sun et al. |
| 7,065,574 B1 | 6/2006 | Saulpaugh et al. |
| 7,065,633 B1 | 6/2006 | Yates, Jr. et al. |
| 7,069,421 B1 | 6/2006 | Yates, Jr. et al. |
| 7,072,967 B1 | 7/2006 | Saulpaugh et al. |
| 7,080,078 B1 | 7/2006 | Slaughter et al. |
| 7,089,374 B2 | 8/2006 | Tremblay et al. |
| 7,093,004 B2 | 8/2006 | Bernardin et al. |
| 7,093,086 B1 | 8/2006 | van Rietschote |
| 7,100,195 B1 | 8/2006 | Underwood |
| 7,111,290 B1 | 9/2006 | Yates, Jr. et al. |
| 7,131,026 B2 | 10/2006 | Denninghoff et al. |
| 7,137,016 B2 | 11/2006 | Nalawadi et al. |
| 7,137,110 B1 | 11/2006 | Reese et al. |
| 7,146,305 B2 | 12/2006 | van der Made |
| 7,159,211 B2 | 1/2007 | Jalan et al. |
| 7,168,076 B2 | 1/2007 | Chaudhry et al. |
| 7,185,319 B2 | 2/2007 | Kaler et al. |
| 7,185,323 B2 | 2/2007 | Nair et al. |
| 7,188,180 B2 | 3/2007 | Larson et al. |
| 7,188,251 B1 | 3/2007 | Slaughter et al. |
| 7,191,440 B2 | 3/2007 | Cota-Robles et al. |
| 7,191,441 B2 | 3/2007 | Abbott et al. |
| 7,200,705 B2 | 4/2007 | Santos et al. |
| 7,200,848 B1 | 4/2007 | Slaughter et al. |
| 7,203,477 B2 | 4/2007 | Coppinger et al. |
| 7,203,485 B2 | 4/2007 | Coppinger et al. |
| 7,206,805 B1 | 4/2007 | McLaughlin, Jr. |
| 7,206,903 B1 | 4/2007 | Moir et al. |
| 7,213,047 B2 | 5/2007 | Yeager et |
| 7,213,246 B1 | 5/2007 | van Rietsc |
| 7,228,404 B1 | 6/2007 | Patel et al. |
| 7,234,076 B2 | 6/2007 | Daynes et al. |
| 7,237,140 B2 | 6/2007 | Nakamura et al. |
| 7,243,267 B2 | 7/2007 | Klemm et al. |
| 7,243,356 B1 | 7/2007 | Saulpaugh et al. |
| 7,249,280 B2 | 7/2007 | Lamport et al. |
| 7,254,390 B2 | 8/2007 | Coppinger et al. |
| 7,254,608 B2 | 8/2007 | Yeager et al. |
| 7,254,806 B1 | 8/2007 | Yates, Jr. et al. |
| 7,260,543 B1 | 8/2007 | Saulpaugh et al. |
| 7,269,693 B2 | 9/2007 | Tremblay et al. |
| 7,269,694 B2 | 9/2007 | Tremblay et al. |
| 7,275,183 B2 | 9/2007 | Santos et al. |
| 7,275,246 B1 | 9/2007 | Yates, Jr. et al. |
| 7,286,815 B2 | 10/2007 | Coppinger et al. |
| 7,289,964 B1 | 10/2007 | Bowman-Amuah |
| 7,293,267 B1 | 11/2007 | Fresko |
| 7,302,609 B2 | 11/2007 | Matena et al. |
| 7,307,526 B2 | 12/2007 | Rajapakse et al. |
| 7,328,243 B2 | 2/2008 | Yeager et al. |
| 7,330,844 B2 | 2/2008 | Stoyen |
| 7,334,154 B2 | 2/2008 | Lorch et al. |
| 7,356,679 B1 | 4/2008 | Le et al. |
| 7,363,288 B2 | 4/2008 | Santos et al. |
| 7,366,880 B2 | 4/2008 | Chaudhry et al. |
| 7,370,064 B2 | 5/2008 | Yousefi'zadeh |
| 7,370,091 B1 | 5/2008 | Slaughter et al. |
| 7,370,360 B2 | 5/2008 | van der Made |
| 7,373,451 B2 | 5/2008 | Lam et al. |
| 7,374,096 B2 | 5/2008 | Overhultz et al. |
| 7,380,039 B2 | 5/2008 | Miloushev et al. |
| 7,380,051 B2 | 5/2008 | Birrell et al. |
| 7,382,264 B2 | 6/2008 | Rajapakse et al. |
| 7,389,383 B2 | 6/2008 | Tremblay et al. |
| 7,395,333 B1 | 7/2008 | Saulpaugh et al. |
| 7,395,536 B2 | 7/2008 | Verbeke et al. |
| 7,398,349 B2 | 7/2008 | Birrell et al. |
| 7,398,533 B1 | 7/2008 | Slaughter et al. |
| 7,409,584 B2 | 8/2008 | Denninghoff et al. |
| 7,409,719 B2 | 8/2008 | Armstrong et al. |
| 7,412,518 B1 | 8/2008 | Duigou et al. |
| 7,412,520 B2 | 8/2008 | Sun |
| 7,418,504 B2 | 8/2008 | Larson et al. |
| 7,421,698 B2 | 9/2008 | Fresko |
| 7,426,721 B1 | 9/2008 | Saulpaugh et al. |
| 7,437,606 B2 | 10/2008 | Janakiraman et al. |
| 7,437,614 B2 | 10/2008 | Haswell et al. |
| 7,444,644 B1 | 10/2008 | Slaughter et al. |
| 7,448,079 B2 | 11/2008 | Tremain |
| 7,458,082 B1 | 11/2008 | Slaughter et al. |
| 7,467,198 B2 | 12/2008 | Goodman et al. |
| 7,467,202 B2 | 12/2008 | Savchuk |
| 7,467,333 B2 | 12/2008 | Keeton et al. |
| 7,478,278 B2 | 1/2009 | Archer et al. |
| 7,480,761 B2 | 1/2009 | Birrell et al. |
| 7,484,208 B1 | 1/2009 | Nelson |
| 7,490,151 B2 | 2/2009 | Munger et al. |
| 7,512,769 B1 | 3/2009 | Lowell et al. |
| 7,516,365 B2 | 4/2009 | Lev |
| 7,516,366 B2 | 4/2009 | Lev et al. |
| 7,529,897 B1 | 5/2009 | Waldspurger et al. |
| 7,533,141 B2 | 5/2009 | Nadgir et al. |
| 7,533,229 B1 | 5/2009 | van Rietschote |
| 7,546,600 B2 | 6/2009 | Tumer et al. |
| 7,548,946 B1 | 6/2009 | Saulpaugh et al. |
| 7,549,167 B1 | 6/2009 | Huang et al. |
| 7,549,579 B2 | 6/2009 | Overhultz et al. |
| 7,552,312 B2 | 6/2009 | Archer et al. |
| 7,552,434 B2 | 6/2009 | Turner et al. |
| 7,562,369 B1 | 7/2009 | Salamone et al. |
| 7,568,025 B2 | 7/2009 | Vasudeva |
| 7,574,588 B2 | 8/2009 | Chaudhry et al. |
| 7,577,834 B1 | 8/2009 | Traversat et al. |
| 7,590,972 B2 | 9/2009 | Axelrod et al. |
| 7,594,168 B2 | 9/2009 | Rempell |
| 7,596,790 B2 | 9/2009 | Moakley |
| 7,603,392 B2 | 10/2009 | Ben-Yehuda et al. |
| 7,603,440 B1 | 10/2009 | Grabowski et al. |
| 7,607,129 B2 | 10/2009 | Rosu et al. |
| 7,610,510 B2 | 10/2009 | Agarwal et al. |
| 7,613,749 B2 | 11/2009 | Flynn, Jr. et al. |
| 7,613,929 B2 | 11/2009 | Cohen et al. |
| 7,624,383 B2 | 11/2009 | Barr et al. |
| 7,653,833 B1 | 1/2010 | Miller et al. |
| 7,657,419 B2 | 2/2010 | van der Made |
| 7,669,040 B2 | 2/2010 | Dice |
| 7,669,081 B2 | 2/2010 | Lett et al. |
| 7,676,456 B2 | 3/2010 | Suganuma et al. |
| 7,680,919 B2 | 3/2010 | Nelson |

(56) References Cited

U.S. PATENT DOCUMENTS

| | | |
|---|---|---|
| 7,681,075 B2 | 3/2010 | Havemose et al. |
| 7,685,251 B2 | 3/2010 | Houlihan et al. |
| 7,689,676 B2 | 3/2010 | Vinberg et al. |
| 7,689,859 B2 | 3/2010 | Westenberg |
| 7,698,465 B2 | 4/2010 | Lamport |
| 7,702,660 B2 | 4/2010 | Chan et al. |
| 7,707,583 B2 | 4/2010 | Schmidt et al. |
| 7,716,492 B1 | 5/2010 | Saulpaugh et al. |
| 7,721,138 B1 | 5/2010 | Lyadvinsky et al. |
| 7,721,139 B2 | 5/2010 | Castro et al. |
| 7,730,364 B2 | 6/2010 | Chang et al. |
| 7,734,607 B2 | 6/2010 | Grinstein et al. |
| 7,734,859 B2 | 6/2010 | Daniel et al. |
| 7,743,126 B2 | 6/2010 | Russell |
| 7,743,389 B2 | 6/2010 | Mahalingam et al. |
| 7,747,730 B1 | 6/2010 | Harlow |
| 7,747,814 B2 | 6/2010 | Green |
| 7,752,459 B2 | 7/2010 | Cowan et al. |
| 7,760,743 B2 | 7/2010 | Shokri et al. |
| 7,779,298 B2 | 8/2010 | Challenger et al. |
| 7,783,779 B1 | 8/2010 | Scales et al. |
| 7,783,914 B1 | 8/2010 | Havemose |
| 7,805,761 B2 | 9/2010 | Ray et al. |
| 7,810,081 B2 | 10/2010 | Dickenson et al. |
| 7,814,142 B2 | 10/2010 | Mamou et al. |
| 7,814,295 B2 | 10/2010 | Inglett et al. |
| 7,814,470 B2 | 10/2010 | Mamou et al. |
| 7,817,981 B2 | 10/2010 | Coppinger et al. |
| 7,818,510 B2 | 10/2010 | Tremblay et al. |
| 7,822,410 B2 | 10/2010 | Coppinger et al. |
| 7,831,787 B1 | 11/2010 | Yueh |
| 7,836,215 B2 | 11/2010 | Fuente |
| 7,836,303 B2 | 11/2010 | Levy et al. |
| 7,839,803 B1 | 11/2010 | Snelgrove et al. |
| 7,840,787 B2 | 11/2010 | De Pauw et al. |
| 7,844,954 B2 | 11/2010 | Venkitachalam et al. |
| 7,849,450 B1 | 12/2010 | Rydh et al. |
| 7,849,624 B2 | 12/2010 | Holt et al. |
| 7,865,872 B2 | 1/2011 | Chamieh et al. |
| 7,865,893 B1 | 1/2011 | Omelyanchuk et al. |
| 7,870,424 B2 | 1/2011 | Okabe |
| 7,873,869 B2 | 1/2011 | Darrington et al. |
| 7,877,436 B2 | 1/2011 | Arimilli et al. |
| 7,882,216 B2 | 2/2011 | Houlihan et al. |
| 7,890,689 B2 | 2/2011 | Lam et al. |
| 7,899,788 B2 | 3/2011 | Chandhok et al. |
| 7,899,915 B2 | 3/2011 | Reisman |
| 7,900,003 B2 | 3/2011 | Ben-Yehuda et al. |
| 7,904,664 B2 | 3/2011 | Tremblay et al. |
| 7,904,746 B2 | 3/2011 | Nakamura et al. |
| 7,908,255 B2 | 3/2011 | Detlefs et al. |
| 7,908,653 B2 | 3/2011 | Brickell et al. |
| 7,917,596 B2 | 3/2011 | Chan et al. |
| 7,921,211 B2 | 4/2011 | Larson et al. |
| 7,921,686 B2 | 4/2011 | Bagepalli et al. |
| 7,925,791 B2 | 4/2011 | Ellis et al. |
| 7,925,850 B1 | 4/2011 | Waldspurger et al. |
| 7,930,733 B1 | 4/2011 | Iftode et al. |
| 7,933,990 B2 | 4/2011 | Munger et al. |
| 7,934,020 B1 | 4/2011 | Xu et al. |
| 7,934,035 B2 | 4/2011 | Miloushev et al. |
| 7,937,547 B2 | 5/2011 | Liu et al. |
| 7,937,618 B2 | 5/2011 | Dorai et al. |
| 7,941,402 B2 | 5/2011 | Smits |
| 7,941,647 B2 | 5/2011 | Yates, Jr. et al. |
| 7,941,698 B1 | 5/2011 | Aggarwal et al. |
| 7,941,799 B2 | 5/2011 | Easton et al. |
| 7,945,654 B2 | 5/2011 | Larson et al. |
| 7,953,588 B2 | 5/2011 | Altman et al. |
| 7,958,558 B1 | 6/2011 | Leake et al. |
| 7,962,137 B2 | 6/2011 | Coppinger et al. |
| 7,962,545 B2 | 6/2011 | Knauerhase et al. |
| 7,962,620 B2 | 6/2011 | Safari et al. |
| 7,962,703 B1 | 6/2011 | Shah et al. |
| 7,962,798 B2 | 6/2011 | Locasto et al. |
| 7,962,909 B1 | 6/2011 | Klaiber |
| 7,966,519 B1 | 6/2011 | Aggarwal et al. |
| 7,966,614 B2 | 6/2011 | Chodroff et al. |
| 7,970,736 B2 | 6/2011 | Ben-Yehuda et al. |
| 7,971,015 B2 | 6/2011 | Waldspurger et al. |
| 7,975,138 B2 | 7/2011 | Andrade |
| 7,975,165 B2 | 7/2011 | Shneorson et al. |
| 7,975,176 B2 | 7/2011 | Bak et al. |
| 7,979,846 B2 | 7/2011 | Grechanik et al. |
| 7,984,304 B1 | 7/2011 | Waldspurger et al. |
| 7,987,274 B2 | 7/2011 | Larson et al. |
| 7,987,491 B2 | 7/2011 | Reisman |
| 8,001,232 B1 | 8/2011 | Saulpaugh et al. |
| 8,001,342 B2 | 8/2011 | Armstrong et al. |
| 8,001,505 B2 | 8/2011 | Bist et al. |
| 8,006,079 B2 | 8/2011 | Goodson et al. |
| 8,010,495 B1 | 8/2011 | Kuznetzov et al. |
| 8,011,010 B2 | 8/2011 | Michael et al. |
| 8,019,964 B2 | 9/2011 | Greiner et al. |
| 8,020,099 B1 | 9/2011 | Lu |
| 8,028,071 B1 | 9/2011 | Mahalingam et al. |
| 8,037,112 B2 | 10/2011 | Nath et al. |
| 8,037,202 B2 | 10/2011 | Yeager et al. |
| 8,037,278 B2 | 10/2011 | Greiner et al. |
| 8,037,350 B1 | 10/2011 | Aggarwal et al. |
| 8,041,760 B2 | 10/2011 | Mamou et al. |
| 8,041,922 B2 | 10/2011 | Greiner et al. |
| 8,041,923 B2 | 10/2011 | Greiner et al. |
| 8,051,181 B2 | 11/2011 | Larson et al. |
| 8,055,940 B2 | 11/2011 | Ellis et al. |
| 8,060,553 B2 | 11/2011 | Mamou et al. |
| 8,065,240 B2 | 11/2011 | Jung et al. |
| 8,065,504 B2 | 11/2011 | Yates, Jr. et al. |
| 8,069,218 B1 | 11/2011 | Tormasov et al. |
| 8,069,374 B2 | 11/2011 | Panigrahy et al. |
| 8,074,055 B1 | 12/2011 | Yates, Jr. et al. |
| 8,078,854 B2 | 12/2011 | Vick et al. |
| 8,078,910 B1 | 12/2011 | Backensto et al. |
| 8,082,405 B2 | 12/2011 | Greiner et al. |
| 8,082,468 B1 | 12/2011 | Backensto et al. |
| 8,082,481 B2 | 12/2011 | Casper et al. |
| 8,082,491 B1 | 12/2011 | Abdelaziz et al. |
| 8,086,811 B2 | 12/2011 | Gainey, Jr. et al. |
| 8,090,452 B2 | 1/2012 | Johnson et al. |
| 8,102,071 B2 | 1/2012 | Catlin |
| 8,103,674 B2 | 1/2012 | de Moura et al. |
| 8,103,851 B2 | 1/2012 | Greiner et al. |
| 8,108,455 B2 | 1/2012 | Yeager et al. |
| 8,108,662 B2 | 1/2012 | Darrington et al. |
| 8,108,722 B1 | 1/2012 | Havemose et al. |
| 8,108,855 B2 | 1/2012 | Dias et al. |
| 8,117,372 B2 | 2/2012 | Daniel et al. |
| 8,117,417 B2 | 2/2012 | Greiner et al. |
| 8,117,496 B2 | 2/2012 | Bashir et al. |
| 8,117,554 B1 | 2/2012 | Grechishkin et al. |
| 8,121,828 B2 | 2/2012 | Yates, Jr. et al. |
| 8,122,434 B2 | 2/2012 | Kostadinov et al. |
| 8,127,060 B2 | 2/2012 | Doll et al. |
| 8,127,121 B2 | 2/2012 | Yates, Jr. et al. |
| 8,127,412 B2 | 3/2012 | Gleichauf et al. |
| 8,131,845 B1 | 3/2012 | Vasudeva |
| 8,131,851 B2 | 3/2012 | Harlow |
| 8,135,796 B1 | 3/2012 | Slaughter et al. |
| 8,140,565 B2 | 3/2012 | D'Angelo et al. |
| 8,140,905 B2 | 3/2012 | Beaty et al. |
| 8,140,907 B2 | 3/2012 | Beaty et al. |
| 8,145,945 B2 | 3/2012 | Lee |
| 8,151,083 B2 | 4/2012 | Greiner et al. |
| 8,156,373 B2 | 4/2012 | Zheng et al. |
| 8,161,172 B2 | 4/2012 | Reisman |
| 8,161,321 B2 | 4/2012 | Zheng et al. |
| 8,161,479 B2 | 4/2012 | Sedukhin et al. |
| 8,166,477 B1 | 4/2012 | Tormasov |
| 8,166,693 B2 | 5/2012 | Hughes et al. |
| 8,171,301 B2 | 5/2012 | Seguin et al. |
| 8,171,338 B2 | 5/2012 | Agesen et al. |
| 8,176,364 B1 | 5/2012 | Havemose |
| 8,181,150 B2 | 5/2012 | Szpak et al. |
| 8,181,182 B1 | 5/2012 | Martin |

(56) References Cited

U.S. PATENT DOCUMENTS

| | | |
|---|---|---|
| 8,185,502 B2 | 5/2012 | Irisawa et al. |
| 8,190,574 B2 | 5/2012 | Barnes et al. |
| 8,195,722 B1 | 6/2012 | Havemose et al. |
| 8,195,739 B2 | 6/2012 | Bernardin et al. |
| 8,195,774 B2 | 6/2012 | Lambeth et al. |
| 8,195,984 B2 | 6/2012 | Alberi et al. |
| 8,196,139 B2 | 6/2012 | Easton et al. |
| 8,196,205 B2 | 6/2012 | Gribble et al. |
| 8,200,771 B2 | 6/2012 | Ganesh et al. |
| 8,201,169 B2 | 6/2012 | Venkitachalam et al. |
| 8,204,082 B2 | 6/2012 | Jungck et al. |
| 8,205,120 B2 | 6/2012 | Heidasch et al. |
| 8,205,194 B2 | 6/2012 | Fries et al. |
| 8,209,524 B2 | 6/2012 | Ferren et al. |
| 8,209,680 B1 | 6/2012 | Le et al. |
| 8,214,191 B2 | 7/2012 | Ferren et al. |
| 8,214,367 B2 | 7/2012 | Baratto et al. |
| 8,214,622 B2 | 7/2012 | Blandy et al. |
| 8,214,686 B2 | 7/2012 | Ueda |
| 8,214,829 B2 | 7/2012 | Neogi et al. |
| 8,219,063 B2 | 7/2012 | Rogel et al. |
| 8,219,947 B2 | 7/2012 | Bist et al. |
| 8,225,314 B2 | 7/2012 | Martins et al. |
| 8,233,882 B2 | 7/2012 | Rogel |
| 8,239,340 B2 | 8/2012 | Hanson |
| 8,239,633 B2 | 8/2012 | Wood et al. |
| 8,239,646 B2 | 8/2012 | Colbert et al. |
| 8,239,649 B2 | 8/2012 | Gainey, Jr. et al. |
| 8,244,954 B2 | 8/2012 | Ganesh et al. |
| 8,245,013 B2 | 8/2012 | Ganesh et al. |
| 8,245,083 B2 | 8/2012 | Van Der Merwe et al. |
| 8,250,405 B2 | 8/2012 | Elnozahy |
| 8,255,651 B2 | 8/2012 | Liu et al. |
| 8,260,904 B2 | 9/2012 | Nelson |
| 8,261,233 B2 | 9/2012 | Szpak et al. |
| 8,266,125 B2 | 9/2012 | Wester et al. |
| 8,266,275 B2 | 9/2012 | Xu et al. |
| 8,266,276 B1 | 9/2012 | Vasudeva |
| 8,266,404 B2 | 9/2012 | Waldspurger et al. |
| 8,266,607 B2 | 9/2012 | Burka et al. |
| 8,271,950 B2 | 9/2012 | Bharadwaj |
| 8,271,990 B2 | 9/2012 | De et al. |
| 8,276,127 B2 | 9/2012 | Rydh et al. |
| 8,280,944 B2 | 10/2012 | Laadan et al. |
| 8,280,974 B2 | 10/2012 | Herington |
| 8,281,317 B1 | 10/2012 | Backensto et al. |
| 8,281,318 B2 | 10/2012 | Chanda et al. |
| 8,285,999 B1 | 10/2012 | Ghose et al. |
| 8,286,174 B1 | 10/2012 | Schmidt et al. |
| 8,295,834 B2 | 10/2012 | Coppinger et al. |
| 8,295,835 B2 | 10/2012 | Coppinger et al. |
| 8,296,419 B1 | 10/2012 | Khanna et al. |
| 8,296,551 B2 | 10/2012 | Bugnion |
| 8,296,759 B1 | 10/2012 | Hutchins et al. |
| 8,301,672 B2 | 10/2012 | Jiva et al. |
| 8,301,700 B1 | 10/2012 | Havemose |
| 8,302,094 B2 | 10/2012 | Rogel et al. |
| 8,307,187 B2 | 11/2012 | Chawla et al. |
| 8,312,224 B2 | 11/2012 | Elnozahy |
| 8,315,991 B2 | 11/2012 | Mandagere et al. |
| 8,321,558 B1 | 11/2012 | Sirota et al. |
| 8,321,643 B1 | 11/2012 | Vaghani et al. |
| 8,321,948 B2 | 11/2012 | Robinson et al. |
| 8,326,449 B2 | 12/2012 | Hartz et al. |
| 8,327,350 B2 | 12/2012 | Chess et al. |
| 8,332,632 B2 | 12/2012 | Iftode et al. |
| 8,332,689 B2 | 12/2012 | Timashev et al. |
| 8,332,824 B2 | 12/2012 | Shemenzon et al. |
| 8,335,906 B2 | 12/2012 | Greiner et al. |
| 8,341,749 B2 | 12/2012 | Rogel |
| 8,346,726 B2 | 1/2013 | Liu et al. |
| 8,346,891 B2 | 1/2013 | Safari et al. |
| 8,347,140 B1 | 1/2013 | Backensto et al. |
| 8,347,288 B1 | 1/2013 | Brandwine |
| 8,352,801 B2 | 1/2013 | Van Der Merwe et al. |
| 8,356,314 B2 | 1/2013 | Sprunk |
| 8,370,493 B2 | 2/2013 | Sirota et al. |
| 8,370,530 B2 | 2/2013 | Tripathi et al. |
| 8,370,802 B2 | 2/2013 | Pacifici et al. |
| 8,370,811 B2 | 2/2013 | Grechanik et al. |
| 8,370,814 B2 | 2/2013 | Grechanik et al. |
| 8,370,837 B2 | 2/2013 | Emelianov et al. |
| 8,370,838 B1 | 2/2013 | Omelyanchuk et al. |
| 8,375,188 B1 | 2/2013 | Shah et al. |
| 8,381,028 B2 | 2/2013 | Elnozahy |
| 8,381,032 B2 | 2/2013 | Burn et al. |
| 8,381,224 B2 | 2/2013 | Huetter et al. |
| 8,386,428 B2 | 2/2013 | Kuznetzov et al. |
| 8,386,594 B2 | 2/2013 | Underwood et al. |
| 8,386,838 B1 | 2/2013 | Byan |
| 8,386,853 B2 | 2/2013 | Alberi et al. |
| 8,392,838 B2 | 3/2013 | Chawla et al. |
| 8,397,032 B2 | 3/2013 | Elnozahy |
| 8,401,940 B1 | 3/2013 | Havemose |
| 8,401,941 B1 | 3/2013 | Havemose |
| 8,402,305 B1 | 3/2013 | Havemose |
| 8,402,318 B2 | 3/2013 | Nieh et al. |
| 8,402,464 B2 | 3/2013 | Dice et al. |
| 8,407,428 B2 | 3/2013 | Cheriton et al. |
| 8,407,455 B2 | 3/2013 | Christie et al. |
| 8,407,518 B2 | 3/2013 | Nelson et al. |
| 8,413,145 B2 | 4/2013 | Chou et al. |
| 8,417,885 B2 | 4/2013 | Chou et al. |
| 8,417,916 B2 | 4/2013 | Greiner et al. |
| 8,423,959 B1 | 4/2013 | Petras |
| 8,423,961 B2 | 4/2013 | Byers et al. |
| 8,424,005 B2 | 4/2013 | Strom et al. |
| 8,429,362 B1 | 4/2013 | Natanzon et al. |
| 8,433,682 B2 | 4/2013 | Ngo |
| 8,433,951 B1 | 4/2013 | Havemose et al. |
| 8,434,093 B2 | 4/2013 | Larimore et al. |
| 8,438,256 B2 | 5/2013 | Rogel et al. |
| 8,438,360 B2 | 5/2013 | Youngworth |
| 8,438,609 B2 | 5/2013 | Cohen et al. |
| 8,442,955 B2 | 5/2013 | Al Kiswany et al. |
| 8,443,069 B2 | 5/2013 | Bagepalli et al. |
| 8,443,367 B1 | 5/2013 | Taylor et al. |
| 8,446,224 B2 | 5/2013 | Cortadella et al. |
| 8,448,022 B1 | 5/2013 | Scott |
| 8,453,120 B2 | 5/2013 | Ceze et al. |
| 8,458,341 B2 | 6/2013 | Larson et al. |
| 8,458,517 B1 | 6/2013 | Vermeulen et al. |
| 8,458,696 B2 | 6/2013 | Park et al. |
| 8,463,825 B1 | 6/2013 | Harty et al. |
| 8,464,256 B1 | 6/2013 | Havemose |
| 8,468,310 B2 | 6/2013 | Colbert et al. |
| 8,468,521 B2 | 6/2013 | Pawlowski |
| 8,473,594 B2 | 6/2013 | Astete et al. |
| 8,473,627 B2 | 6/2013 | Astete et al. |
| 8,473,900 B2 | 6/2013 | Frost |
| 8,484,732 B1 | 7/2013 | Chen et al. |
| 8,489,699 B2 | 7/2013 | Goggin et al. |
| 8,489,853 B2 | 7/2013 | Greiner et al. |
| 8,489,939 B2 | 7/2013 | Hiltunen et al. |
| 8,495,326 B2 | 7/2013 | Gainey, Jr. et al. |
| 8,495,633 B2 | 7/2013 | Easton et al. |
| 8,495,708 B2 | 7/2013 | Cohen et al. |
| 8,498,966 B1 | 7/2013 | Waghole |
| 8,499,297 B2 | 7/2013 | Chen et al. |
| 8,504,670 B2 | 8/2013 | Wu et al. |
| 8,504,696 B2 | 8/2013 | Larson et al. |
| 8,504,697 B2 | 8/2013 | Larson et al. |
| 8,504,791 B2 | 8/2013 | Cheriton et al. |
| 8,510,596 B1 | 8/2013 | Gupta et al. |
| 8,510,827 B1 | 8/2013 | Leake et al. |
| 8,516,117 B2 | 8/2013 | Munger et al. |
| 8,516,131 B2 | 8/2013 | Larson et al. |
| 8,520,002 B2 | 8/2013 | Stambaugh |
| 8,521,888 B2 | 8/2013 | Larson et al. |
| 8,527,462 B1 | 9/2013 | Talius et al. |
| 8,527,640 B2 | 9/2013 | Reisman |
| 8,527,809 B1 | 9/2013 | Backensto et al. |
| 8,527,990 B1 | 9/2013 | Marathe et al. |
| 8,533,382 B2 | 9/2013 | Scales et al. |

(56) References Cited

U.S. PATENT DOCUMENTS

| | | |
|---|---|---|
| 8,533,390 B2 | 9/2013 | Dong et al. |
| 8,533,663 B2 | 9/2013 | Moir et al. |
| 8,533,713 B2 | 9/2013 | Dong |
| 8,539,066 B1 | 9/2013 | Vasudeva |
| 8,539,137 B1 | 9/2013 | Protassov et al. |
| 8,539,262 B2 | 9/2013 | Huang et al. |
| 8,539,434 B2 | 9/2013 | Vertes |
| 8,539,488 B1 | 9/2013 | Havemose |
| 8,548,146 B2 | 10/2013 | Soo et al. |
| 8,548,790 B2 | 10/2013 | Tylutki |
| 8,549,210 B2 | 10/2013 | Hunter et al. |
| 8,549,241 B2 | 10/2013 | Scales et al. |
| 8,549,313 B2 | 10/2013 | Seguin et al. |
| 8,549,646 B2 | 10/2013 | Stavrou et al. |
| 8,554,899 B2 | 10/2013 | Larson et al. |
| 8,554,900 B2 | 10/2013 | Nelson |
| 8,554,981 B2 | 10/2013 | Schmidt et al. |
| 8,560,705 B2 | 10/2013 | Larson et al. |
| 8,560,772 B1 | 10/2013 | Piszczek et al. |
| 8,560,816 B2 | 10/2013 | Moir et al. |
| 8,561,045 B2 | 10/2013 | Porras et al. |
| 8,561,046 B2 | 10/2013 | Song et al. |
| 8,566,640 B2 | 10/2013 | Timashev et al. |
| 8,572,247 B2 | 10/2013 | Larson et al. |
| 8,572,613 B1 | 10/2013 | Brandwine |
| 8,572,735 B2 | 10/2013 | Ghosh et al. |
| 8,572,876 B2 | 11/2013 | Shekarri et al. |
| 8,576,881 B2 | 11/2013 | Jungck et al. |
| 8,577,845 B2 | 11/2013 | Nguyen et al. |
| 8,578,000 B2 | 11/2013 | Van Wie et al. |
| 8,584,101 B2 | 11/2013 | Moon et al. |
| 8,584,127 B2 | 11/2013 | Yoshida |
| 8,588,179 B2 | 11/2013 | Fujino |
| 8,589,406 B2 | 11/2013 | Lillibridge |
| 8,595,191 B2 | 11/2013 | Prahlad et al. |
| 8,601,483 B2 | 12/2013 | He et al. |
| 8,607,039 B2 | 12/2013 | Filali-Adib et al. |
| 8,607,242 B2 | 12/2013 | Clarke |
| 8,612,802 B1 | 12/2013 | Havemose |
| 8,621,180 B2 | 12/2013 | Greiner et al. |
| 8,621,183 B2 | 12/2013 | Hohmuth et al. |
| 8,621,275 B1 | 12/2013 | Havemose |
| 8,621,283 B2 | 12/2013 | Van Der Merwe et al. |
| 8,621,496 B2 | 12/2013 | Madampath |
| 8,622,839 B1 | 1/2014 | McKenzie et al. |
| 8,627,000 B2 | 1/2014 | Green et al. |
| 8,627,143 B2 | 1/2014 | Ranganathan et al. |
| 8,631,066 B2 | 1/2014 | Lim et al. |
| 8,631,216 B2 | 1/2014 | Greiner et al. |
| 8,631,248 B2 | 1/2014 | Cowan et al. |
| 8,631,456 B2 | 1/2014 | Reisman |
| 8,639,599 B1 | 1/2014 | Havemose |
| 8,645,240 B1 | 2/2014 | Havemose |
| 8,645,754 B1 | 2/2014 | Backensto et al. |
| 8,645,958 B2 | 2/2014 | Huetter et al. |
| 8,656,077 B2 | 2/2014 | Miloushev et al. |
| 8,656,412 B2 | 2/2014 | Kashyap |
| 8,661,457 B2 | 2/2014 | Kashyap |
| 8,667,066 B1 | 3/2014 | Havemose |
| 8,671,085 B2 | 3/2014 | Dhamankar et al. |
| 8,677,352 B2 | 3/2014 | Hiltgen et al. |
| 8,683,004 B2 | 3/2014 | Bauer |
| 8,694,821 B2 | 4/2014 | Griffith et al. |
| 8,694,828 B2 | 4/2014 | Nelson et al. |
| 8,706,992 B2 | 4/2014 | Liu et al. |
| 8,713,268 B2 | 4/2014 | Dillow et al. |
| 8,713,273 B2 | 4/2014 | Waldspurger et al. |
| 8,713,362 B2 | 4/2014 | Griffith et al. |
| 8,719,520 B1 | 5/2014 | Piszczek et al. |
| 8,719,849 B2 | 5/2014 | Madampath |
| 8,725,782 B2 | 5/2014 | Starks et al. |
| 8,726,078 B1 | 5/2014 | Havemose |
| 8,726,251 B2 | 5/2014 | Kalogeropulos et al. |
| 8,739,164 B2 | 5/2014 | Chung et al. |
| 8,745,098 B1 | 6/2014 | Havemose et al. |
| 8,745,442 B1 | 6/2014 | Havemose |
| 8,745,601 B1 | 6/2014 | Carlson et al. |
| 8,752,048 B1 | 6/2014 | Backensto et al. |
| 8,752,049 B1 | 6/2014 | Backensto et al. |
| 8,775,871 B1 | 7/2014 | Backensto et al. |
| 8,776,038 B2 | 7/2014 | Larimore et al. |
| 8,782,365 B2 | 7/2014 | Mooring et al. |
| 8,782,434 B1 | 7/2014 | Ghose |
| 8,782,435 B1 | 7/2014 | Ghose |
| 8,782,632 B1 | 7/2014 | Chigurapati et al. |
| 8,788,792 B2 | 7/2014 | Yates, Jr. et al. |
| 8,789,034 B1 | 7/2014 | Emelyanov et al. |
| 8,799,119 B1 | 8/2014 | Havemose |
| 8,805,788 B2 | 8/2014 | Gross, IV et al. |
| 8,806,266 B1 | 8/2014 | Qu et al. |
| 8,818,886 B1 | 8/2014 | Havemose |
| 8,826,070 B1 | 9/2014 | Havemose et al. |
| 8,826,273 B1 | 9/2014 | Chen |
| 8,832,682 B2 | 9/2014 | Xu et al. |
| 8,839,426 B1 | 9/2014 | Brueckner et al. |
| 8,843,643 B2 | 9/2014 | Larson et al. |
| 8,850,009 B2 | 9/2014 | Larson et al. |
| 8,856,473 B2 | 10/2014 | van Riel |
| 8,856,767 B2 | 10/2014 | Jalan et al. |
| 8,862,538 B2 | 10/2014 | Patil et al. |
| 8,868,506 B1 | 10/2014 | Bhargava et al. |
| 8,868,705 B2 | 10/2014 | Larson et al. |
| 8,869,139 B2 | 10/2014 | Le et al. |
| 8,875,160 B2 | 10/2014 | Hunt et al. |
| 8,880,473 B1 | 11/2014 | Havemose et al. |
| 8,881,171 B1 | 11/2014 | Backensto et al. |
| 8,893,129 B1 | 11/2014 | Havemose |
| 8,893,147 B2 | 11/2014 | Yin et al. |
| 8,903,705 B2 | 12/2014 | Douceur et al. |
| 8,904,189 B1 | 12/2014 | Ghose |
| 8,904,516 B2 | 12/2014 | Larson et al. |
| 8,918,879 B1 | 12/2014 | Li et al. |
| 8,930,705 B1 | 1/2015 | Ghose et al. |
| 8,943,201 B2 | 1/2015 | Larson et al. |
| 8,943,501 B1 | 1/2015 | Havemose |
| 8,949,585 B2 | 2/2015 | Hiltgen et al. |
| 8,966,315 B2 | 2/2015 | Burn et al. |
| 8,977,736 B2 | 3/2015 | Nelson |
| 8,996,912 B1 | 3/2015 | Havemose et al. |
| 9,003,229 B1 | 4/2015 | Havemose |
| 9,009,212 B2 | 4/2015 | Sankararaman |
| 9,026,849 B2 | 5/2015 | Patterson et al. |
| 9,027,003 B2 | 5/2015 | Weissman et al. |
| 9,027,022 B2 | 5/2015 | Huetter et al. |
| 9,027,115 B2 | 5/2015 | Larson et al. |
| 9,032,170 B2 | 5/2015 | Vaghani et al. |
| 9,032,249 B1 | 5/2015 | Havemose |
| 9,037,713 B2 | 5/2015 | Larson et al. |
| 9,037,883 B2 | 5/2015 | Huang et al. |
| 9,038,163 B2 | 5/2015 | Larson et al. |
| 9,043,640 B1 | 5/2015 | Havemose |
| 9,047,178 B2 | 6/2015 | Talagala et al. |
| 9,058,599 B1 | 6/2015 | Havemose |
| 9,058,600 B1 | 6/2015 | Havemose |
| 9,063,821 B1 | 6/2015 | Emelyanov et al. |
| 9,065,706 B2 | 6/2015 | Koinuma et al. |
| 9,069,782 B2 | 6/2015 | Yang et al. |
| 9,077,694 B2 | 7/2015 | Larson et al. |
| 9,077,695 B2 | 7/2015 | Larson et al. |
| 9,081,602 B1 | 7/2015 | Omelyanchuk et al. |
| 9,086,969 B2 | 7/2015 | Bekiroglu et al. |
| 9,092,837 B2 | 7/2015 | Bala et al. |
| 9,094,399 B2 | 7/2015 | Larson et al. |
| 9,094,449 B2 | 7/2015 | Brueckner et al. |
| 9,098,347 B2 | 8/2015 | Hiltgen et al. |
| 9,100,371 B2 | 8/2015 | Bagepalli et al. |
| 9,100,375 B2 | 8/2015 | Larson et al. |
| 9,104,624 B2 | 8/2015 | Timashev et al. |
| 9,110,722 B2 | 8/2015 | Adams et al. |
| 9,116,812 B2 | 8/2015 | Joshi et al. |
| 9,116,847 B2 | 8/2015 | Liu et al. |
| 9,117,087 B2 | 8/2015 | Tan et al. |
| 9,122,765 B1 | 9/2015 | Chen |
| 9,135,667 B2 | 9/2015 | Drees et al. |

(56) References Cited

U.S. PATENT DOCUMENTS

| | | |
|---|---|---|
| 9,141,502 B2 | 9/2015 | Havemose |
| 9,141,786 B2 | 9/2015 | Edery et al. |
| 9,146,764 B1 | 9/2015 | Wagner |
| 9,146,819 B2 | 9/2015 | Banikazemi et al. |
| 9,152,508 B1 | 10/2015 | Barnes et al. |
| 9,152,610 B2 | 10/2015 | Drees et al. |
| 9,158,626 B1 | 10/2015 | Havemose et al. |
| 9,164,843 B1 | 10/2015 | Havemose |
| 9,164,847 B1 | 10/2015 | Havemose et al. |
| 9,183,089 B1 | 11/2015 | Havemose |
| 9,189,233 B2 | 11/2015 | Sasanka et al. |
| 9,189,265 B2 | 11/2015 | Hiltgen et al. |
| 9,189,621 B2 | 11/2015 | Touboul |
| 9,195,519 B2 | 11/2015 | Tan et al. |
| 9,201,737 B1 | 12/2015 | Backensto et al. |
| 9,207,934 B2 | 12/2015 | Larimore et al. |
| 9,208,030 B1 | 12/2015 | Mooring et al. |
| 9,218,278 B2 | 12/2015 | Talagala et al. |
| 9,219,755 B2 | 12/2015 | Touboul |
| 9,223,967 B2 | 12/2015 | Ghose |
| 9,229,758 B2 | 1/2016 | Ammons et al. |
| 9,230,122 B2 | 1/2016 | Ghose |
| 9,239,765 B2 | 1/2016 | Block et al. |
| 9,251,004 B1 | 2/2016 | Havemose |
| 9,256,496 B1 | 2/2016 | Havemose |
| 9,262,194 B2 | 2/2016 | Sudhakar |
| 9,268,602 B2 | 2/2016 | Prahlad et al. |
| 9,268,702 B2 | 2/2016 | Bilas et al. |
| 9,280,393 B2 | 3/2016 | Bird et al. |
| 9,282,166 B2 | 3/2016 | Markley et al. |
| 9,286,109 B1 | 3/2016 | Backensto et al. |
| 9,286,703 B2 | 3/2016 | Brumer et al. |
| 9,292,330 B2 | 3/2016 | Bonilla et al. |
| 9,294,282 B1 | 3/2016 | Potlapally et al. |
| 9,304,869 B1 | 4/2016 | Backensto et al. |
| 9,311,140 B2 | 4/2016 | Raghu et al. |
| 9,311,313 B2 | 4/2016 | Le et al. |
| 9,317,315 B2 | 4/2016 | Mehta |
| 9,317,326 B2 | 4/2016 | Ramanathan et al. |
| 9,323,550 B2 | 4/2016 | Lim et al. |
| 9,323,556 B2 | 4/2016 | Wagner |
| 9,323,623 B1 | 4/2016 | Havemose |
| 9,323,921 B2 | 4/2016 | Hunt et al. |
| 9,329,894 B2 | 5/2016 | Raghu |
| 9,336,040 B2 | 5/2016 | Dong et al. |
| 9,336,099 B1 | 5/2016 | Havemose |
| 9,348,652 B2 | 5/2016 | Raghu |
| 9,354,921 B2 | 5/2016 | Nelson |
| 9,354,927 B2 | 5/2016 | Hiltgen et al. |
| 9,354,977 B1 | 5/2016 | Backensto et al. |
| 9,355,161 B1 | 5/2016 | Havemose |
| 9,356,962 B2 | 5/2016 | Ilieva et al. |
| 9,372,732 B2 | 6/2016 | Adams et al. |
| 9,374,346 B2 | 6/2016 | Larson et al. |
| 9,378,059 B2 | 6/2016 | Huetter et al. |
| 9,384,347 B1 | 7/2016 | Havemose |
| 9,386,000 B2 | 7/2016 | Larson et al. |
| 9,389,893 B2 | 7/2016 | Raghu |
| 9,389,933 B2 | 7/2016 | Baumann et al. |
| 9,389,959 B1 | 7/2016 | Backensto et al. |
| 9,391,801 B2 | 7/2016 | Raghu |
| 2002/0002706 A1 | 1/2002 | Sprunk |
| 2002/0003884 A1 | 1/2002 | Sprunk |
| 2002/0019844 A1 | 2/2002 | Kurowski et al. |
| 2002/0032903 A1 | 3/2002 | Sprunk |
| 2002/0065776 A1 | 5/2002 | Calder et al. |
| 2002/0065869 A1 | 5/2002 | Calder et al. |
| 2002/0065874 A1 | 5/2002 | Chien et al. |
| 2002/0065876 A1 | 5/2002 | Chien et al. |
| 2002/0065945 A1 | 5/2002 | Calder et al. |
| 2002/0066021 A1 | 5/2002 | Chien et al. |
| 2002/0066022 A1 | 5/2002 | Calder et al. |
| 2002/0069369 A1 | 6/2002 | Tremain |
| 2002/0073101 A1 | 6/2002 | Stoyen |
| 2002/0073283 A1 | 6/2002 | Lewis et al. |
| 2002/0092003 A1 | 7/2002 | Calder et al. |
| 2002/0092015 A1 | 7/2002 | Sprunk et al. |
| 2002/0093980 A1 | 7/2002 | Trebes |
| 2002/0095665 A1 | 7/2002 | Chaudhry et al. |
| 2002/0147969 A1 | 10/2002 | Lethin et al. |
| 2002/0161884 A1 | 10/2002 | Munger et al. |
| 2002/0161925 A1 | 10/2002 | Munger et al. |
| 2002/0188653 A1 | 12/2002 | Sun |
| 2002/0194388 A1 | 12/2002 | Boloker et al. |
| 2003/0005102 A1 | 1/2003 | Russell |
| 2003/0018826 A1 | 1/2003 | Chaudhry et al. |
| 2003/0028861 A1 | 2/2003 | Wallman et al. |
| 2003/0037142 A1 | 2/2003 | Munger et al. |
| 2003/0058277 A1 | 3/2003 | Bowman-Amuah |
| 2003/0079116 A1 | 4/2003 | Chaudlhry et al. |
| 2003/0092972 A1 | 5/2003 | Mantilla et al. |
| 2003/0097278 A1 | 5/2003 | Mantilla et al. |
| 2003/0154284 A1 | 8/2003 | Bernardin et al. |
| 2003/0167307 A1 | 9/2003 | Filepp et al. |
| 2003/0167342 A1 | 9/2003 | Munger et al. |
| 2003/0167421 A1 | 9/2003 | Klemm |
| 2003/0182572 A1 | 9/2003 | Cowan et al. |
| 2003/0187911 A1 | 10/2003 | Abd-El-Malek et al. |
| 2003/0188141 A1 | 10/2003 | Chaudhry et al. |
| 2003/0191795 A1 | 10/2003 | Bernardin et al. |
| 2003/0208500 A1 | 11/2003 | Daynes et al. |
| 2003/0208673 A1 | 11/2003 | Chaudhry et al. |
| 2003/0212987 A1 | 11/2003 | Demuth et al. |
| 2003/0229900 A1 | 12/2003 | Reisman |
| 2004/0007121 A1 | 1/2004 | Graves et al. |
| 2004/0015627 A1 | 1/2004 | Desoli et al. |
| 2004/0030739 A1 | 2/2004 | Yousefi'zadeh |
| 2004/0031058 A1 | 2/2004 | Reisman |
| 2004/0055004 A1 | 3/2004 | Sun et al. |
| 2004/0088347 A1 | 5/2004 | Yeager et al. |
| 2004/0088348 A1 | 5/2004 | Yeager et al. |
| 2004/0088369 A1 | 5/2004 | Yeager et al. |
| 2004/0088646 A1 | 5/2004 | Yeager et al. |
| 2004/0098154 A1 | 5/2004 | McCarthy |
| 2004/0098447 A1 | 5/2004 | Verbeke et al. |
| 2004/0098485 A1 | 5/2004 | Larson et al. |
| 2004/0103205 A1 | 5/2004 | Larson et al. |
| 2004/0107285 A1 | 6/2004 | Larson et al. |
| 2004/0107286 A1 | 6/2004 | Larson et al. |
| 2004/0128670 A1 | 7/2004 | Robinson et al. |
| 2004/0133640 A1 | 7/2004 | Yeager et al. |
| 2004/0148307 A1 | 7/2004 | Rempell |
| 2004/0153558 A1 | 8/2004 | Gunduc et al. |
| 2004/0158549 A1 | 8/2004 | Matena et al. |
| 2004/0162951 A1 | 8/2004 | Jacobson et al. |
| 2004/0168030 A1 | 8/2004 | Traversat et al. |
| 2004/0172626 A1 | 9/2004 | Jalan et al. |
| 2004/0187115 A1 | 9/2004 | Tremblay et al. |
| 2004/0187116 A1 | 9/2004 | Tremblay et al. |
| 2004/0187123 A1 | 9/2004 | Tremblay et al. |
| 2004/0205377 A1 | 10/2004 | Nakamura et al. |
| 2004/0205414 A1 | 10/2004 | Roselli et al. |
| 2004/0221194 A1 | 11/2004 | Denninghoff et al. |
| 2004/0230960 A1 | 11/2004 | Nair et al. |
| 2004/0243986 A1 | 12/2004 | Nishiyama |
| 2004/0254648 A1 | 12/2004 | Johnson et al. |
| 2004/0254962 A1 | 12/2004 | Kodama et al. |
| 2004/0254964 A1 | 12/2004 | Kodama et al. |
| 2004/0267691 A1 | 12/2004 | Vasudeva |
| 2005/0005200 A1 | 1/2005 | Matena et al. |
| 2005/0027870 A1 | 2/2005 | Trebes |
| 2005/0050545 A1 | 3/2005 | Moakley |
| 2005/0055399 A1 | 3/2005 | Savchuk |
| 2005/0055588 A1 | 3/2005 | Nalawadi et al. |
| 2005/0064849 A1 | 3/2005 | Coppinger et al. |
| 2005/0064857 A1 | 3/2005 | Coppinger et al. |
| 2005/0064868 A1 | 3/2005 | Coppinger et al. |
| 2005/0086211 A1 | 4/2005 | Mayer |
| 2005/0086451 A1 | 4/2005 | Yates, Jr. et al. |
| 2005/0086650 A1 | 4/2005 | Yates, Jr. et al. |
| 2005/0090258 A1 | 4/2005 | Coppinger et al. |
| 2005/0113092 A1 | 5/2005 | Coppinger et al. |
| 2005/0125513 A1 | 6/2005 | Sin-Ling Lam et al. |
| 2005/0156736 A1 | 7/2005 | Rajapakse et al. |

(56) References Cited

U.S. PATENT DOCUMENTS

| | | |
|---|---|---|
| 2005/0160423 A1 | 7/2005 | Bantz et al. |
| 2005/0172018 A1 | 8/2005 | Devine et al. |
| 2005/0177635 A1 | 8/2005 | Schmidt et al. |
| 2005/0193269 A1 | 9/2005 | Haswell et al. |
| 2005/0198303 A1 | 9/2005 | Knauerhase et al. |
| 2005/0209930 A1 | 9/2005 | Coppinger et al. |
| 2005/0222931 A1 | 10/2005 | Mamou et al. |
| 2005/0223109 A1 | 10/2005 | Mamou et al. |
| 2005/0228808 A1 | 10/2005 | Mamou et al. |
| 2005/0232046 A1 | 10/2005 | Mamou et al. |
| 2005/0234969 A1 | 10/2005 | Mamou et al. |
| 2005/0235274 A1 | 10/2005 | Mamou et al. |
| 2005/0240354 A1 | 10/2005 | Mamou et al. |
| 2005/0240592 A1 | 10/2005 | Mamou et al. |
| 2005/0246708 A1 | 11/2005 | Turner et al. |
| 2005/0251803 A1 | 11/2005 | Turner et al. |
| 2005/0256843 A1 | 11/2005 | Santos et al. |
| 2005/0257080 A1 | 11/2005 | Santos et al. |
| 2005/0257090 A1 | 11/2005 | Santos et al. |
| 2005/0262188 A1 | 11/2005 | Mamou et al. |
| 2005/0262189 A1 | 11/2005 | Mamou et al. |
| 2005/0262190 A1 | 11/2005 | Mamou et al. |
| 2005/0262191 A1 | 11/2005 | Mamou et al. |
| 2005/0262192 A1 | 11/2005 | Mamou et al. |
| 2005/0262193 A1 | 11/2005 | Mamou et al. |
| 2005/0262194 A1 | 11/2005 | Mamou et al. |
| 2005/0262301 A1 | 11/2005 | Jacobson et al. |
| 2005/0268071 A1 | 12/2005 | Blandy et al. |
| 2005/0283644 A1 | 12/2005 | Lorch et al. |
| 2005/0283659 A1 | 12/2005 | Lamport et al. |
| 2005/0289246 A1 | 12/2005 | Easton et al. |
| 2006/0010195 A1 | 1/2006 | Mamou et al. |
| 2006/0020790 A1 | 1/2006 | Sprunk |
| 2006/0021029 A1 | 1/2006 | Brickell et al. |
| 2006/0036426 A1 | 2/2006 | Barr et al. |
| 2006/0040667 A9 | 2/2006 | Coppinger et al. |
| 2006/0041786 A1 | 2/2006 | Janakiraman et al. |
| 2006/0053439 A1 | 3/2006 | Sprunk |
| 2006/0059253 A1 | 3/2006 | Goodman et al. |
| 2006/0069717 A1 | 3/2006 | Mamou et al. |
| 2006/0074994 A1 | 4/2006 | Smits |
| 2006/0095276 A1 | 5/2006 | Axelrod et al. |
| 2006/0110011 A1 | 5/2006 | Cohen et al. |
| 2006/0112278 A1 | 5/2006 | Cohen et al. |
| 2006/0112279 A1 | 5/2006 | Cohen et al. |
| 2006/0112280 A1 | 5/2006 | Cohen et al. |
| 2006/0122939 A1 | 6/2006 | Cohen et al. |
| 2006/0136720 A1 | 6/2006 | Armstrong et al. |
| 2006/0136781 A1 | 6/2006 | Lamport |
| 2006/0143350 A1 | 6/2006 | Miloushev et al. |
| 2006/0143517 A1 | 6/2006 | Douceur et al. |
| 2006/0149945 A1 | 7/2006 | Chaudhry et al. |
| 2006/0149946 A1 | 7/2006 | Chaudhry et al. |
| 2006/0155930 A1 | 7/2006 | Birrell et al. |
| 2006/0155931 A1 | 7/2006 | Birrell et al. |
| 2006/0184935 A1 | 8/2006 | Abels et al. |
| 2006/0184936 A1 | 8/2006 | Abels et al. |
| 2006/0184937 A1 | 8/2006 | Abels et al. |
| 2006/0195508 A1 | 8/2006 | Bernardin et al. |
| 2006/0200632 A1 | 9/2006 | Tremblay et al. |
| 2006/0212146 A1 | 9/2006 | Johnson et al. |
| 2006/0212750 A1 | 9/2006 | Denninghoff et al. |
| 2006/0218563 A1 | 9/2006 | Grinstein et al. |
| 2006/0225065 A1 | 10/2006 | Chandhok et al. |
| 2006/0230216 A1 | 10/2006 | Fuente |
| 2006/0230407 A1 | 10/2006 | Rosu et al. |
| 2006/0233367 A1 | 10/2006 | Birrell et al. |
| 2006/0259818 A1 | 11/2006 | Howell et al. |
| 2006/0265508 A1 | 11/2006 | Angel et al. |
| 2007/0005919 A1 | 1/2007 | van Riel |
| 2007/0050367 A1 | 3/2007 | Suganuma et al. |
| 2007/0050686 A1 | 3/2007 | Keeton et al. |
| 2007/0067590 A1 | 3/2007 | Savagaonkar et al. |
| 2007/0074258 A1 | 3/2007 | Wood et al. |
| 2007/0099683 A1 | 5/2007 | Panther Trice et al. |
| 2007/0120673 A1 | 5/2007 | Rajapakse et al. |
| 2007/0128899 A1 | 6/2007 | Mayer |
| 2007/0136579 A1 | 6/2007 | Levy et al. |
| 2007/0174910 A1 | 7/2007 | Zachman et al. |
| 2007/0174915 A1 | 7/2007 | Gribble et al. |
| 2007/0180509 A1 | 8/2007 | Swartz et al. |
| 2007/0206611 A1 | 9/2007 | Shokri et al. |
| 2007/0226359 A1 | 9/2007 | Gunduc et al. |
| 2007/0233880 A1 | 10/2007 | Nieh et al. |
| 2007/0234302 A1 | 10/2007 | Suzuki et al. |
| 2007/0234337 A1 | 10/2007 | Suzuki et al. |
| 2007/0234342 A1 | 10/2007 | Flynn et al. |
| 2007/0234356 A1 | 10/2007 | Martins et al. |
| 2007/0239804 A1 | 10/2007 | Armstrong et al. |
| 2007/0240171 A1 | 10/2007 | Biro et al. |
| 2007/0244937 A1 | 10/2007 | Flynn et al. |
| 2007/0244962 A1 | 10/2007 | Laadan et al. |
| 2007/0245334 A1 | 10/2007 | Nieh et al. |
| 2007/0249320 A1 | 10/2007 | Coppinger et al. |
| 2007/0254638 A1 | 11/2007 | Coppinger et al. |
| 2007/0260733 A1 | 11/2007 | Havemose et al. |
| 2007/0266368 A1 | 11/2007 | Szpak et al. |
| 2007/0271445 A1 | 11/2007 | Tremblay et al. |
| 2007/0271830 A1 | 11/2007 | Holt et al. |
| 2007/0276879 A1 | 11/2007 | Rothman et al. |
| 2007/0282926 A1 | 12/2007 | Ben-Yehuda et al. |
| 2007/0283353 A1 | 12/2007 | Tremblay et al. |
| 2007/0288247 A1 | 12/2007 | Mackay |
| 2008/0005792 A1 | 1/2008 | Larson et al. |
| 2008/0016249 A1 | 1/2008 | Ellis et al. |
| 2008/0022276 A1 | 1/2008 | Coppinger et al. |
| 2008/0034201 A1 | 2/2008 | Munger et al. |
| 2008/0040279 A1 | 2/2008 | Coppinger et al. |
| 2008/0040477 A1 | 2/2008 | Johnson et al. |
| 2008/0040783 A1 | 2/2008 | Larson et al. |
| 2008/0040791 A1 | 2/2008 | Munger et al. |
| 2008/0040792 A1 | 2/2008 | Larson et al. |
| 2008/0046598 A1 | 2/2008 | Johnson et al. |
| 2008/0046699 A1 | 2/2008 | Pauw et al. |
| 2008/0052386 A1 | 2/2008 | Johnson et al. |
| 2008/0052695 A1 | 2/2008 | Dickenson et al. |
| 2008/0059214 A1 | 3/2008 | Vinberg et al. |
| 2008/0060077 A1 | 3/2008 | Cowan et al. |
| 2008/0104531 A1 | 5/2008 | Stambaugh |
| 2008/0104532 A1 | 5/2008 | Stambaugh |
| 2008/0109756 A1 | 5/2008 | Stambaugh |
| 2008/0109757 A1 | 5/2008 | Stambaugh |
| 2008/0109758 A1 | 5/2008 | Stambaugh |
| 2008/0109759 A1 | 5/2008 | Stambaugh |
| 2008/0109760 A1 | 5/2008 | Stambaugh |
| 2008/0109761 A1 | 5/2008 | Stambaugh |
| 2008/0111818 A1 | 5/2008 | Stambaugh |
| 2008/0120350 A1 | 5/2008 | Grabowski et al. |
| 2008/0120620 A1 | 5/2008 | Lett et al. |
| 2008/0126502 A1 | 5/2008 | Holt |
| 2008/0126505 A1 | 5/2008 | Holt |
| 2008/0126506 A1 | 5/2008 | Holt |
| 2008/0129725 A1 | 6/2008 | Stambaugh |
| 2008/0133688 A1 | 6/2008 | Holt |
| 2008/0133692 A1 | 6/2008 | Holt |
| 2008/0133694 A1 | 6/2008 | Holt |
| 2008/0133869 A1 | 6/2008 | Holt |
| 2008/0134161 A1 | 6/2008 | Chamieh et al. |
| 2008/0140801 A1 | 6/2008 | Holt |
| 2008/0140982 A1 | 6/2008 | Holt |
| 2008/0141065 A1 | 6/2008 | Okabe |
| 2008/0148262 A1 | 6/2008 | Dice |
| 2008/0150963 A1 | 6/2008 | Stambaugh |
| 2008/0155169 A1 | 6/2008 | Hiltgen et al. |
| 2008/0155208 A1 | 6/2008 | Hiltgen et al. |
| 2008/0155223 A1 | 6/2008 | Hiltgen et al. |
| 2008/0172632 A1 | 7/2008 | Stambaugh |
| 2008/0177994 A1 | 7/2008 | Mayer |
| 2008/0183882 A1 | 7/2008 | Flynn et al. |
| 2008/0184229 A1 | 7/2008 | Rosu et al. |
| 2008/0189432 A1 | 8/2008 | Abali et al. |
| 2008/0189468 A1 | 8/2008 | Schmidt et al. |
| 2008/0189700 A1 | 8/2008 | Schmidt et al. |
| 2008/0189769 A1 | 8/2008 | Casado et al. |

(56) References Cited

U.S. PATENT DOCUMENTS

| | | |
|---|---|---|
| 2008/0195840 A1 | 8/2008 | Archer et al. |
| 2008/0196026 A1 | 8/2008 | Azagury et al. |
| 2008/0201602 A1 | 8/2008 | Agarwal et al. |
| 2008/0215796 A1 | 9/2008 | Lam et al. |
| 2008/0216073 A1 | 9/2008 | Yates et al. |
| 2008/0216168 A1 | 9/2008 | Larson et al. |
| 2008/0222415 A1 | 9/2008 | Munger et al. |
| 2008/0222604 A1 | 9/2008 | Murphy |
| 2008/0234998 A1 | 9/2008 | Cohen et al. |
| 2008/0234999 A1 | 9/2008 | Cohen et al. |
| 2008/0235000 A1 | 9/2008 | Cohen et al. |
| 2008/0235001 A1 | 9/2008 | Cohen et al. |
| 2008/0235002 A1 | 9/2008 | Cohen et al. |
| 2008/0235711 A1 | 9/2008 | Cohen et al. |
| 2008/0235756 A1 | 9/2008 | Cohen et al. |
| 2008/0235764 A1 | 9/2008 | Cohen et al. |
| 2008/0243935 A1 | 10/2008 | Castro et al. |
| 2008/0244535 A1 | 10/2008 | Nelson et al. |
| 2008/0244544 A1 | 10/2008 | Neelakantam et al. |
| 2008/0244747 A1 | 10/2008 | Gleichauf et al. |
| 2008/0250051 A1 | 10/2008 | Grechanik et al. |
| 2008/0250265 A1 | 10/2008 | Chang et al. |
| 2008/0263114 A1 | 10/2008 | Nath et al. |
| 2008/0263658 A1 | 10/2008 | Michael et al. |
| 2008/0270199 A1 | 10/2008 | Chess et al. |
| 2008/0270838 A1 | 10/2008 | Dorai et al. |
| 2008/0288558 A1 | 11/2008 | De Pauw et al. |
| 2008/0288747 A1 | 11/2008 | Inglett et al. |
| 2008/0294937 A1 | 11/2008 | Ueda |
| 2008/0295114 A1 | 11/2008 | Argade et al. |
| 2008/0307258 A1 | 12/2008 | Challenger et al. |
| 2008/0307414 A1 | 12/2008 | Alpern et al. |
| 2008/0313345 A1 | 12/2008 | Bernardin et al. |
| 2008/0313364 A1 | 12/2008 | Flynn et al. |
| 2008/0320122 A1 | 12/2008 | Houlihan et al. |
| 2008/0320123 A1 | 12/2008 | Houlihan et al. |
| 2008/0320269 A1 | 12/2008 | Houlihan et al. |
| 2008/0320594 A1 | 12/2008 | Jiang |
| 2009/0006445 A1 | 1/2009 | Shemenzon et al. |
| 2009/0006621 A1 | 1/2009 | Ellis et al. |
| 2009/0006710 A1 | 1/2009 | Daniel et al. |
| 2009/0007063 A1 | 1/2009 | Szpak et al. |
| 2009/0007105 A1 | 1/2009 | Fries et al. |
| 2009/0007106 A1 | 1/2009 | Araujo, Jr. et al. |
| 2009/0007111 A1 | 1/2009 | Nelson et al. |
| 2009/0024851 A1 | 1/2009 | Andrade |
| 2009/0031307 A1 | 1/2009 | Chodroff et al. |
| 2009/0031309 A1 | 1/2009 | Lev |
| 2009/0031310 A1 | 1/2009 | Lev et al. |
| 2009/0036125 A1 | 2/2009 | Coppinger et al. |
| 2009/0037329 A1 | 2/2009 | Coppinger et al. |
| 2009/0037330 A1 | 2/2009 | Coppinger et al. |
| 2009/0037585 A1 | 2/2009 | Miloushev et al. |
| 2009/0037672 A1 | 2/2009 | Colbert et al. |
| 2009/0037680 A1 | 2/2009 | Colbert et al. |
| 2009/0042552 A1 | 2/2009 | Coppinger et al. |
| 2009/0043700 A1 | 2/2009 | Coppinger et al. |
| 2009/0044186 A1 | 2/2009 | Biro |
| 2009/0044265 A1 | 2/2009 | Ghosh et al. |
| 2009/0063665 A1 | 3/2009 | Bagepalli et al. |
| 2009/0064094 A1 | 3/2009 | Burka et al. |
| 2009/0064557 A1 | 3/2009 | Hughes et al. |
| 2009/0077329 A1 | 3/2009 | Wood et al. |
| 2009/0094603 A1 | 4/2009 | Hiltgen et al. |
| 2009/0094673 A1 | 4/2009 | Seguin et al. |
| 2009/0106256 A1 | 4/2009 | Safari et al. |
| 2009/0106424 A1 | 4/2009 | Safari et al. |
| 2009/0112616 A1 | 4/2009 | Jung et al. |
| 2009/0112617 A1 | 4/2009 | Jung et al. |
| 2009/0112620 A1 | 4/2009 | Jung et al. |
| 2009/0112621 A1 | 4/2009 | Jung et al. |
| 2009/0113109 A1 | 4/2009 | Nelson et al. |
| 2009/0113420 A1 | 4/2009 | Pawlowski |
| 2009/0113423 A1 | 4/2009 | Hiltgen et al. |
| 2009/0118593 A1 | 5/2009 | Jung et al. |
| 2009/0119154 A1 | 5/2009 | Jung et al. |
| 2009/0119493 A1 | 5/2009 | Venkitachalam et al. |
| 2009/0119684 A1 | 5/2009 | Mahalingam et al. |
| 2009/0125904 A1 | 5/2009 | Nelson |
| 2009/0132275 A1 | 5/2009 | Jung et al. |
| 2009/0138945 A1 | 5/2009 | Savchuk |
| 2009/0150883 A1 | 6/2009 | Tripathi et al. |
| 2009/0150885 A1 | 6/2009 | Safari et al. |
| 2009/0157882 A1 | 6/2009 | Kashyap |
| 2009/0158260 A1 | 6/2009 | Moon et al. |
| 2009/0164031 A1 | 6/2009 | Johnson et al. |
| 2009/0164501 A1 | 6/2009 | de Moura et al. |
| 2009/0164848 A1 | 6/2009 | Heidasch et al. |
| 2009/0164981 A1 | 6/2009 | Heidasch et al. |
| 2009/0165139 A1 | 6/2009 | Yerazunis et al. |
| 2009/0182964 A1 | 7/2009 | Greiner et al. |
| 2009/0182966 A1 | 7/2009 | Greiner et al. |
| 2009/0182971 A1 | 7/2009 | Greiner et al. |
| 2009/0182972 A1 | 7/2009 | Greiner et al. |
| 2009/0182973 A1 | 7/2009 | Greiner et al. |
| 2009/0182974 A1 | 7/2009 | Greiner et al. |
| 2009/0182975 A1 | 7/2009 | Greiner et al. |
| 2009/0183027 A1* | 7/2009 | Subhraveti ............... G06F 9/461 714/13 |
| 2009/0187724 A1 | 7/2009 | Greiner et al. |
| 2009/0187728 A1 | 7/2009 | Greiner et al. |
| 2009/0187732 A1 | 7/2009 | Greiner et al. |
| 2009/0193214 A1 | 7/2009 | Greiner et al. |
| 2009/0198762 A1 | 8/2009 | Arimilli et al. |
| 2009/0198949 A1 | 8/2009 | Kuligowski et al. |
| 2009/0204785 A1 | 8/2009 | Yates, Jr. et al. |
| 2009/0204964 A1 | 8/2009 | Foley et al. |
| 2009/0204966 A1 | 8/2009 | Johnson et al. |
| 2009/0208910 A1 | 8/2009 | Brueckner et al. |
| 2009/0210769 A1 | 8/2009 | Casper et al. |
| 2009/0216910 A1 | 8/2009 | Duchesneau |
| 2009/0216984 A1 | 8/2009 | Gainey, Jr. et al. |
| 2009/0217021 A1 | 8/2009 | Goodson et al. |
| 2009/0222496 A1 | 9/2009 | Liu et al. |
| 2009/0222558 A1 | 9/2009 | Xu et al. |
| 2009/0228889 A1 | 9/2009 | Yoshida |
| 2009/0230686 A1 | 9/2009 | Catlin |
| 2009/0248611 A1 | 10/2009 | Xu et al. |
| 2009/0249049 A1 | 10/2009 | Weissman et al. |
| 2009/0249357 A1 | 10/2009 | Chanda et al. |
| 2009/0249488 A1 | 10/2009 | Robinson et al. |
| 2009/0259612 A1 | 10/2009 | Hanson |
| 2009/0262741 A1 | 10/2009 | Jungck et al. |
| 2009/0282101 A1 | 11/2009 | Lim et al. |
| 2009/0282386 A1 | 11/2009 | Moir et al. |
| 2009/0288075 A1 | 11/2009 | Song et al. |
| 2009/0288084 A1 | 11/2009 | Astete et al. |
| 2009/0292858 A1 | 11/2009 | Lambeth et al. |
| 2009/0300528 A1 | 12/2009 | Stambaugh |
| 2009/0307528 A1 | 12/2009 | Byers et al. |
| 2009/0313620 A1 | 12/2009 | Sedukhin et al. |
| 2009/0316581 A1 | 12/2009 | Kashyap et al. |
| 2009/0319672 A1 | 12/2009 | Reisman |
| 2009/0319738 A1 | 12/2009 | Ben-Yehuda et al. |
| 2009/0320073 A1 | 12/2009 | Reisman |
| 2009/0327471 A1 | 12/2009 | Astete et al. |
| 2010/0005258 A1 | 1/2010 | Westenberg |
| 2010/0011127 A1 | 1/2010 | Johnson et al. |
| 2010/0011238 A1 | 1/2010 | Nakamura et al. |
| 2010/0011243 A1 | 1/2010 | Locasto et al. |
| 2010/0023703 A1 | 1/2010 | Christie et al. |
| 2010/0023704 A1 | 1/2010 | Christie et al. |
| 2010/0023706 A1 | 1/2010 | Christie et al. |
| 2010/0023707 A1 | 1/2010 | Hohmuth et al. |
| 2010/0030878 A1 | 2/2010 | Grabowski et al. |
| 2010/0037096 A1 | 2/2010 | Bum et al. |
| 2010/0037206 A1 | 2/2010 | Larimore et al. |
| 2010/0037235 A1 | 2/2010 | Larimore et al. |
| 2010/0042846 A1 | 2/2010 | Trotter et al. |
| 2010/0047760 A1 | 2/2010 | Best et al. |
| 2010/0070678 A1 | 3/2010 | Zhang et al. |
| 2010/0070935 A1 | 3/2010 | Bist et al. |
| 2010/0070940 A1 | 3/2010 | Bist et al. |
| 2010/0070978 A1 | 3/2010 | Chawla et al. |

(56) References Cited

U.S. PATENT DOCUMENTS

| | | |
|---|---|---|
| 2010/0076604 A1 | 3/2010 | Johnson et al. |
| 2010/0077160 A1 | 3/2010 | Liu et al. |
| 2010/0082922 A1 | 4/2010 | George et al. |
| 2010/0094948 A1 | 4/2010 | Ganesh et al. |
| 2010/0095074 A1 | 4/2010 | Ganesh et al. |
| 2010/0095075 A1 | 4/2010 | Ganesh et al. |
| 2010/0095100 A1 | 4/2010 | Darrington et al. |
| 2010/0095152 A1 | 4/2010 | Darrington et al. |
| 2010/0103837 A1 | 4/2010 | Jungck et al. |
| 2010/0107113 A1 | 4/2010 | Innes et al. |
| 2010/0107158 A1 | 4/2010 | Chen et al. |
| 2010/0122052 A1 | 5/2010 | Waldspurger et al. |
| 2010/0122073 A1 | 5/2010 | Narayanaswamy et al. |
| 2010/0138830 A1 | 6/2010 | Astete et al. |
| 2010/0138841 A1 | 6/2010 | Dice et al. |
| 2010/0153662 A1 | 6/2010 | Vick et al. |
| 2010/0153674 A1 | 6/2010 | Park et al. |
| 2010/0153690 A1 | 6/2010 | Vick et al. |
| 2010/0153776 A1 | 6/2010 | Vick et al. |
| 2010/0154051 A1 | 6/2010 | Bauer |
| 2010/0161559 A1 | 6/2010 | Patil et al. |
| 2010/0162249 A1 | 6/2010 | Shpeisman et al. |
| 2010/0162250 A1 | 6/2010 | Adl-Tabatabai et al. |
| 2010/0169537 A1 | 7/2010 | Nelson |
| 2010/0169894 A1 | 7/2010 | Sheaffer et al. |
| 2010/0174802 A1 | 7/2010 | Chan et al. |
| 2010/0180275 A1 | 7/2010 | Neogi et al. |
| 2010/0185590 A1 | 7/2010 | D'Angelo et al. |
| 2010/0192220 A1 | 7/2010 | Heizmann et al. |
| 2010/0211663 A1 | 8/2010 | Barboy et al. |
| 2010/0211681 A1 | 8/2010 | Chan et al. |
| 2010/0223499 A1 | 9/2010 | Panigrahy et al. |
| 2010/0223616 A1 | 9/2010 | De et al. |
| 2010/0235647 A1 | 9/2010 | Buer |
| 2010/0241673 A1 | 9/2010 | Wu et al. |
| 2010/0241726 A1 | 9/2010 | Wu |
| 2010/0241807 A1 | 9/2010 | Wu et al. |
| 2010/0251018 A1 | 9/2010 | Tamura |
| 2010/0251031 A1 | 9/2010 | Nieh et al. |
| 2010/0251363 A1 | 9/2010 | Todorovic |
| 2010/0268691 A1 | 10/2010 | Grinstein et al. |
| 2010/0274767 A1 | 10/2010 | Irisawa et al. |
| 2010/0274890 A1 | 10/2010 | Patel et al. |
| 2010/0280996 A1 | 11/2010 | Gross et al. |
| 2010/0281195 A1 | 11/2010 | Daniel et al. |
| 2010/0287280 A1 | 11/2010 | Sivan |
| 2010/0305720 A1 | 12/2010 | Doll et al. |
| 2010/0305721 A1 | 12/2010 | Kostadinov et al. |
| 2010/0306773 A1 | 12/2010 | Lee et al. |
| 2010/0318991 A1 | 12/2010 | Venkitachalam et al. |
| 2010/0328064 A1 | 12/2010 | Rogel |
| 2010/0330953 A1 | 12/2010 | Rogel et al. |
| 2010/0330961 A1 | 12/2010 | Rogel |
| 2010/0332630 A1 | 12/2010 | Harlow |
| 2010/0332635 A1 | 12/2010 | Rogel et al. |
| 2010/0332889 A1 | 12/2010 | Shneorson et al. |
| 2010/0333088 A1 | 12/2010 | Rogel et al. |
| 2011/0004868 A1 | 1/2011 | Bharadwaj |
| 2011/0004935 A1 | 1/2011 | Moffie et al. |
| 2011/0010711 A1 | 1/2011 | Patwardhan |
| 2011/0016453 A1 | 1/2011 | Grechanik et al. |
| 2011/0019647 A1 | 1/2011 | Fujino |
| 2011/0023050 A1 | 1/2011 | Strom et al. |
| 2011/0029970 A1 | 2/2011 | Arasaratnam |
| 2011/0032830 A1 | 2/2011 | Merwe et al. |
| 2011/0035358 A1 | 2/2011 | Naik |
| 2011/0035513 A1 | 2/2011 | Jevans et al. |
| 2011/0041006 A1 | 2/2011 | Fowler |
| 2011/0047618 A1 | 2/2011 | Evans et al. |
| 2011/0061043 A1 | 3/2011 | Rydh et al. |
| 2011/0066786 A1 | 3/2011 | Colbert |
| 2011/0067014 A1 | 3/2011 | Song et al. |
| 2011/0072430 A1 | 3/2011 | Mani |
| 2011/0082996 A1 | 4/2011 | Wester et al. |
| 2011/0113208 A1 | 5/2011 | Jouppi et al. |
| 2011/0125951 A1 | 5/2011 | Youngworth |
| 2011/0131183 A1 | 6/2011 | Chandhok et al. |
| 2011/0153992 A1 | 6/2011 | Srinivas et al. |
| 2011/0156914 A1 | 6/2011 | Sheharri et al. |
| 2011/0161730 A1 | 6/2011 | Van Der Merwe et al. |
| 2011/0161988 A1 | 6/2011 | Kashyap |
| 2011/0162076 A1 | 6/2011 | Song et al. |
| 2011/0167087 A1 | 7/2011 | Larson et al. |
| 2011/0167194 A1 | 7/2011 | Scales et al. |
| 2011/0167195 A1 | 7/2011 | Scales et al. |
| 2011/0167196 A1 | 7/2011 | Scales et al. |
| 2011/0167298 A1 | 7/2011 | Lee |
| 2011/0167416 A1 | 7/2011 | Sager et al. |
| 2011/0173441 A1 | 7/2011 | Bagepalli et al. |
| 2011/0173615 A1 | 7/2011 | Easton et al. |
| 2011/0173698 A1 | 7/2011 | Polyakov et al. |
| 2011/0179399 A1 | 7/2011 | Bekiroglu et al. |
| 2011/0184993 A1 | 7/2011 | Chawla et al. |
| 2011/0185053 A1 | 7/2011 | Larson et al. |
| 2011/0185169 A1 | 7/2011 | Munger et al. |
| 2011/0185292 A1 | 7/2011 | Chawla et al. |
| 2011/0185355 A1 | 7/2011 | Chawla et al. |
| 2011/0197022 A1 | 8/2011 | Green et al. |
| 2011/0197097 A1 | 8/2011 | Beaty et al. |
| 2011/0202927 A1 | 8/2011 | Miloushev et al. |
| 2011/0208908 A1 | 8/2011 | Chou et al. |
| 2011/0209151 A1 | 8/2011 | Chung et al. |
| 2011/0214050 A1 | 9/2011 | Stambaugh |
| 2011/0218966 A1 | 9/2011 | Barnes et al. |
| 2011/0218968 A1 | 9/2011 | Liu et al. |
| 2011/0219419 A1 | 9/2011 | Reisman |
| 2011/0225419 A1 | 9/2011 | Munger et al. |
| 2011/0231825 A1 | 9/2011 | Grechanik et al. |
| 2011/0238775 A1 | 9/2011 | Wu et al. |
| 2011/0258625 A1 | 10/2011 | Waldspurger et al. |
| 2011/0258692 A1 | 10/2011 | Morrison et al. |
| 2011/0264729 A1 | 10/2011 | Kulgavin |
| 2011/0270998 A1 | 11/2011 | Larson et al. |
| 2011/0271136 A1 | 11/2011 | Abbot et al. |
| 2011/0280387 A1 | 11/2011 | Soo et al. |
| 2011/0283246 A1 | 11/2011 | Bist et al. |
| 2011/0283262 A1 | 11/2011 | Ceze et al. |
| 2011/0289345 A1 | 11/2011 | Agesen et al. |
| 2011/0289507 A1 | 11/2011 | Khan et al. |
| 2011/0296113 A1 | 12/2011 | Elnozahy |
| 2011/0296241 A1 | 12/2011 | Elnozahy |
| 2011/0296245 A1 | 12/2011 | Alberi et al. |
| 2011/0307897 A1 | 12/2011 | Atterbury et al. |
| 2011/0320882 A1 | 12/2011 | Beaty et al. |
| 2012/0005461 A1 | 1/2012 | Moir et al. |
| 2012/0005672 A1 | 1/2012 | Cervantes et al. |
| 2012/0011341 A1 | 1/2012 | Greiner et al. |
| 2012/0011401 A1 | 1/2012 | Ranganathan et al. |
| 2012/0011504 A1 | 1/2012 | Ahmad et al. |
| 2012/0011508 A1 | 1/2012 | Ahmad |
| 2012/0013408 A1 | 1/2012 | Cortadella et al. |
| 2012/0017213 A1 | 1/2012 | Hunt et al. |
| 2012/0023209 A1 | 1/2012 | Fletcher et al. |
| 2012/0030653 A1 | 2/2012 | Porras et al. |
| 2012/0030659 A1 | 2/2012 | Porras et al. |
| 2012/0030661 A1 | 2/2012 | Porras et al. |
| 2012/0042034 A1 | 2/2012 | Goggin et al. |
| 2012/0042086 A1 | 2/2012 | Larson et al. |
| 2012/0054332 A1 | 3/2012 | Sahu et al. |
| 2012/0054345 A1 | 3/2012 | Sahu et al. |
| 2012/0054408 A1 | 3/2012 | Dong et al. |
| 2012/0054409 A1 | 3/2012 | Block et al. |
| 2012/0054412 A1 | 3/2012 | Gainey, Jr. et al. |
| 2012/0060165 A1 | 3/2012 | Clarke |
| 2012/0066676 A1 | 3/2012 | Dong et al. |
| 2012/0069131 A1 | 3/2012 | Abelow |
| 2012/0079368 A1 | 3/2012 | Abdelaziz et al. |
| 2012/0084393 A1 | 4/2012 | Williams et al. |
| 2012/0084520 A1 | 4/2012 | Chou et al. |
| 2012/0084782 A1 | 4/2012 | Chou et al. |
| 2012/0089485 A1 | 4/2012 | Williams et al. |
| 2012/0089971 A1 | 4/2012 | Williams et al. |
| 2012/0096134 A1 | 4/2012 | Suit |
| 2012/0096158 A1 | 4/2012 | Astete et al. |

(56) References Cited

U.S. PATENT DOCUMENTS

| | | |
|---|---|---|
| 2012/0096541 A1 | 4/2012 | Larson et al. |
| 2012/0102204 A1 | 4/2012 | Larson et al. |
| 2012/0102206 A1 | 4/2012 | Larson et al. |
| 2012/0102369 A1 | 4/2012 | Hiltunen et al. |
| 2012/0110103 A1 | 5/2012 | Larson et al. |
| 2012/0110185 A1 | 5/2012 | Ganesan et al. |
| 2012/0110186 A1 | 5/2012 | Kapur et al. |
| 2012/0117237 A1 | 5/2012 | Larson et al. |
| 2012/0117382 A1 | 5/2012 | Larson et al. |
| 2012/0124285 A1 | 5/2012 | Soran et al. |
| 2012/0137106 A1 | 5/2012 | Greiner et al. |
| 2012/0137286 A1 | 5/2012 | Schimpf et al. |
| 2012/0144005 A1 | 6/2012 | Quintard |
| 2012/0144153 A1 | 6/2012 | Greiner et al. |
| 2012/0144167 A1 | 6/2012 | Yates, Jr. et al. |
| 2012/0144232 A1 | 6/2012 | Griffith et al. |
| 2012/0144233 A1 | 6/2012 | Griffith et al. |
| 2012/0151225 A1 | 6/2012 | Huang et al. |
| 2012/0159101 A1 | 6/2012 | Miyoshi |
| 2012/0159462 A1 | 6/2012 | Leibman et al. |
| 2012/0159478 A1 | 6/2012 | Spradlin et al. |
| 2012/0164613 A1 | 6/2012 | Jung et al. |
| 2012/0166758 A1 | 6/2012 | Greiner et al. |
| 2012/0173732 A1 | 7/2012 | Sullivan |
| 2012/0174104 A1 | 7/2012 | Neogi et al. |
| 2012/0179446 A1 | 7/2012 | Tylutki |
| 2012/0185855 A1 | 7/2012 | Cervantes et al. |
| 2012/0191908 A1 | 7/2012 | North et al. |
| 2012/0191942 A1 | 7/2012 | Blandy et al. |
| 2012/0192142 A1 | 7/2012 | Schimpf et al. |
| 2012/0192207 A1 | 7/2012 | Kashyap |
| 2012/0204061 A1 | 8/2012 | Agesen et al. |
| 2012/0209822 A1 | 8/2012 | Prabhakar et al. |
| 2012/0210042 A1 | 8/2012 | Lim et al. |
| 2012/0216045 A1 | 8/2012 | Seguin et al. |
| 2012/0216198 A1 | 8/2012 | Easton et al. |
| 2012/0218901 A1 | 8/2012 | Jungck et al. |
| 2012/0221803 A1 | 8/2012 | Stabrawa et al. |
| 2012/0222042 A1 | 8/2012 | Chess et al. |
| 2012/0226699 A1 | 9/2012 | Lillibridge |
| 2012/0226795 A1 | 9/2012 | Larson et al. |
| 2012/0226870 A1 | 9/2012 | Elnozahy |
| 2012/0226939 A1 | 9/2012 | Elnozahy |
| 2012/0226947 A1 | 9/2012 | Alberi et al. |
| 2012/0227041 A1 | 9/2012 | Lambeth et al. |
| 2012/0232947 A1 | 9/2012 | McLachlan et al. |
| 2012/0233547 A1 | 9/2012 | McLachlan |
| 2012/0239624 A1 | 9/2012 | Barnes et al. |
| 2012/0239739 A1 | 9/2012 | Manglik et al. |
| 2012/0246513 A9 | 9/2012 | Bum et al. |
| 2012/0246638 A1 | 9/2012 | He et al. |
| 2012/0254286 A1 | 10/2012 | Harlow |
| 2012/0254355 A1 | 10/2012 | Kihara |
| 2012/0254862 A1 | 10/2012 | Dong |
| 2012/0254888 A1 | 10/2012 | Kalogeropulos et al. |
| 2012/0260123 A1 | 10/2012 | Madampath |
| 2012/0265959 A1 | 10/2012 | Le et al. |
| 2012/0266018 A1 | 10/2012 | Tanaka |
| 2012/0266132 A1 | 10/2012 | Coppinger et al. |
| 2012/0272240 A1 | 10/2012 | Starks et al. |
| 2012/0278278 A1 | 11/2012 | Wester et al. |
| 2012/0278573 A1 | 11/2012 | Colbert et al. |
| 2012/0278793 A1 | 11/2012 | Jalan et al. |
| 2012/0284477 A1 | 11/2012 | Gainey, Jr. et al. |
| 2012/0284699 A1 | 11/2012 | Van Der Merwe et al. |
| 2012/0284714 A1 | 11/2012 | Venkitachalam et al. |
| 2012/0284716 A1 | 11/2012 | Martins et al. |
| 2012/0290950 A1 | 11/2012 | Rapaport et al. |
| 2012/0297246 A1 | 11/2012 | Liu et al. |
| 2012/0310888 A1 | 12/2012 | Kuznetzov et al. |
| 2012/0311180 A1 | 12/2012 | Barkey et al. |
| 2012/0311580 A1 | 12/2012 | Emelianov et al. |
| 2012/0324378 A1 | 12/2012 | Stambaugh |
| 2012/0324417 A1 | 12/2012 | Somani et al. |
| 2012/0324447 A1 | 12/2012 | Huetter et al. |
| 2012/0324448 A1 | 12/2012 | Huetter et al. |
| 2012/0324449 A1 | 12/2012 | Huetter et al. |
| 2012/0324453 A1 | 12/2012 | Chandramouli et al. |
| 2012/0331444 A1 | 12/2012 | Szpak et al. |
| 2013/0007090 A1 | 1/2013 | Sankararaman |
| 2013/0007409 A1 | 1/2013 | Ganesh et al. |
| 2013/0007735 A1 | 1/2013 | Bookman et al. |
| 2013/0007744 A1 | 1/2013 | Arasaratnam |
| 2013/0013795 A1 | 1/2013 | Larson et al. |
| 2013/0013953 A1 | 1/2013 | Eck et al. |
| 2013/0014226 A1 | 1/2013 | Larson et al. |
| 2013/0014227 A1 | 1/2013 | Larson et al. |
| 2013/0014228 A1 | 1/2013 | Munger et al. |
| 2013/0014259 A1 | 1/2013 | Gribble et al. |
| 2013/0019091 A1 | 1/2013 | Munger et al. |
| 2013/0019243 A1 | 1/2013 | Schmidt et al. |
| 2013/0019280 A1 | 1/2013 | Larson et al. |
| 2013/0024645 A1 | 1/2013 | Cheriton et al. |
| 2013/0024855 A1 | 1/2013 | North |
| 2013/0024940 A1 | 1/2013 | Hutchins et al. |
| 2013/0031331 A1 | 1/2013 | Cheriton et al. |
| 2013/0036192 A1 | 2/2013 | Fausak |
| 2013/0036403 A1 | 2/2013 | Geist |
| 2013/0036451 A1 | 2/2013 | Fausak |
| 2013/0042150 A1 | 2/2013 | McNeeney |
| 2013/0042153 A1 | 2/2013 | McNeeney |
| 2013/0046598 A1 | 2/2013 | Roberts |
| 2013/0046722 A1 | 2/2013 | Hanson |
| 2013/0046948 A1 | 2/2013 | Vaghani et al. |
| 2013/0047154 A1 | 2/2013 | Mehta |
| 2013/0054807 A1 | 2/2013 | Sherwood et al. |
| 2013/0054820 A1 | 2/2013 | Reisman |
| 2013/0055009 A1 | 2/2013 | Patterson et al. |
| 2013/0055315 A1 | 2/2013 | Reisman |
| 2013/0060612 A1 | 3/2013 | Hurd |
| 2013/0060947 A1 | 3/2013 | Nelson |
| 2013/0060963 A1 | 3/2013 | Barkey et al. |
| 2013/0061264 A1 | 3/2013 | Reisman |
| 2013/0061273 A1 | 3/2013 | Reisman |
| 2013/0064241 A1 | 3/2013 | Larson et al. |
| 2013/0067103 A1 | 3/2013 | Larson et al. |
| 2013/0067224 A1 | 3/2013 | Larson et al. |
| 2013/0067277 A1 | 3/2013 | Mummidi |
| 2013/0067526 A1 | 3/2013 | Reisman |
| 2013/0073738 A1 | 3/2013 | Reisman |
| 2013/0073778 A1 | 3/2013 | Hunter et al. |
| 2013/0073823 A1 | 3/2013 | Hunter et al. |
| 2013/0073905 A1 | 3/2013 | Van Der Merwe et al. |
| 2013/0074065 A1 | 3/2013 | McNeeney et al. |
| 2013/0074129 A1 | 3/2013 | Reisman |
| 2013/0080732 A1 | 3/2013 | Nellans et al. |
| 2013/0086147 A1 | 4/2013 | Kashyap |
| 2013/0086347 A1 | 4/2013 | Liu et al. |
| 2013/0086367 A1 | 4/2013 | Gschwind et al. |
| 2013/0091275 A1 | 4/2013 | Safari et al. |
| 2013/0091335 A1 | 4/2013 | Mulcahy et al. |
| 2013/0097120 A1 | 4/2013 | Mummidi |
| 2013/0097369 A1 | 4/2013 | Talagala et al. |
| 2013/0097398 A1 | 4/2013 | Waldspurger et al. |
| 2013/0104199 A1 | 4/2013 | Sprunk |
| 2013/0110490 A1 | 5/2013 | Letz et al. |
| 2013/0111018 A1 | 5/2013 | Ammons et al. |
| 2013/0111473 A1 | 5/2013 | Ammons et al. |
| 2013/0117337 A1 | 5/2013 | Dunham |
| 2013/0117359 A1 | 5/2013 | Husain et al. |
| 2013/0121154 A1 | 5/2013 | Guay et al. |
| 2013/0124479 A1 | 5/2013 | Namjoshi et al. |
| 2013/0137430 A1 | 5/2013 | Coppinger et al. |
| 2013/0138695 A1 | 5/2013 | Stanev |
| 2013/0145002 A1 | 6/2013 | Kannan et al. |
| 2013/0145008 A1 | 6/2013 | Kannan et al. |
| 2013/0151494 A1 | 6/2013 | Dhamankar et al. |
| 2013/0151846 A1 | 6/2013 | Baumann et al. |
| 2013/0151848 A1 | 6/2013 | Baumann et al. |
| 2013/0159649 A1 | 6/2013 | Sherwood et al. |
| 2013/0159712 A1 | 6/2013 | Sigworth et al. |
| 2013/0166716 A1 | 6/2013 | Safari et al. |
| 2013/0166886 A1 | 6/2013 | Sasanka et al. |
| 2013/0166951 A1 | 6/2013 | Burn et al. |

(56) References Cited

U.S. PATENT DOCUMENTS

| | | |
|---|---|---|
| 2013/0170334 A1 | 7/2013 | Koinuma et al. |
| 2013/0179289 A1 | 7/2013 | Calder et al. |
| 2013/0179371 A1 | 7/2013 | Jain et al. |
| 2013/0179574 A1 | 7/2013 | Calder et al. |
| 2013/0179673 A1 | 7/2013 | Innes et al. |
| 2013/0179729 A1 | 7/2013 | Chiu et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185480 A1 | 7/2013 | Newell et al. |
| 2013/0185530 A1 | 7/2013 | Puttaswamy Naga et al. |
| 2013/0185667 A1 | 7/2013 | Harper et al. |
| 2013/0185716 A1 | 7/2013 | Yin et al. |
| 2013/0198334 A1 | 8/2013 | Ikenaga et al. |
| 2013/0198459 A1 | 8/2013 | Joshi et al. |
| 2013/0198740 A1 | 8/2013 | Arroyo et al. |
| 2013/0198742 A1 | 8/2013 | Kumar et al. |
| 2013/0204917 A1 | 8/2013 | Wang et al. |
| 2013/0204990 A1 | 8/2013 | Skjolsvold et al. |
| 2013/0204991 A1 | 8/2013 | Skjolsvold et al. |
| 2013/0212068 A1 | 8/2013 | Talius et al. |
| 2013/0212162 A1 | 8/2013 | Somadder |
| 2013/0212205 A1 | 8/2013 | Flockhart et al. |
| 2013/0212321 A1 | 8/2013 | Talagala et al. |
| 2013/0212592 A1 | 8/2013 | Strom et al. |
| 2013/0218915 A1 | 8/2013 | Billau et al. |
| 2013/0219183 A1 | 8/2013 | Billau et al. |
| 2013/0219280 A1 | 8/2013 | Weinstein et al. |
| 2013/0227236 A1 | 8/2013 | Flynn et al. |
| 2013/0238559 A1 | 9/2013 | Bushman |
| 2013/0238690 A1 | 9/2013 | Kashyap |
| 2013/0246355 A1 | 9/2013 | Nelson et al. |
| 2013/0246511 A1 | 9/2013 | Brown et al. |
| 2013/0246843 A1 | 9/2013 | Havemose et al. |
| 2013/0247070 A1 | 9/2013 | Larimore et al. |
| 2013/0254369 A1 | 9/2013 | Rogel et al. |
| 2013/0254459 A1 | 9/2013 | Laplace et al. |
| 2013/0262587 A1 | 10/2013 | Munger et al. |
| 2013/0263132 A1 | 10/2013 | Colbert et al. |
| 2013/0263220 A1 | 10/2013 | Larson et al. |
| 2013/0263247 A1 | 10/2013 | Jungck et al. |
| 2013/0268357 A1 | 10/2013 | Heath |
| 2013/0268683 A1 | 10/2013 | Larson et al. |
| 2013/0268932 A1 | 10/2013 | Park et al. |
| 2013/0275391 A1 | 10/2013 | Batwara et al. |
| 2013/0275534 A1 | 10/2013 | Larson et al. |
| 2013/0275808 A1 | 10/2013 | Mcneeney et al. |
| 2013/0275973 A1 | 10/2013 | Greenfield et al. |
| 2013/0276056 A1 | 10/2013 | Epstein |
| 2013/0282994 A1 | 10/2013 | Wires et al. |
| 2013/0290506 A1 | 10/2013 | Astete et al. |
| 2013/0290671 A1 | 10/2013 | Greiner et al. |
| 2013/0290781 A1 | 10/2013 | Chen et al. |
| 2013/0290782 A1 | 10/2013 | Chen et al. |
| 2013/0290960 A1 | 10/2013 | Astete et al. |
| 2013/0297854 A1 | 11/2013 | Gupta et al. |
| 2013/0297855 A1 | 11/2013 | Gupta et al. |
| 2013/0297894 A1 | 11/2013 | Cohen et al. |
| 2013/0298135 A1 | 11/2013 | Hiltunen et al. |
| 2013/0305023 A1 | 11/2013 | Gainey, Jr. et al. |
| 2013/0305242 A1 | 11/2013 | Wang et al. |
| 2013/0305246 A1 | 11/2013 | Goggin et al. |
| 2013/0305247 A1 | 11/2013 | Easton et al. |
| 2013/0306276 A1 | 11/2013 | Duchesneau |
| 2013/0311607 A1 | 11/2013 | Larson et al. |
| 2013/0311767 A1 | 11/2013 | Larson et al. |
| 2013/0311774 A1 | 11/2013 | Larson et al. |
| 2013/0311910 A1 | 11/2013 | Stambaugh |
| 2013/0311992 A1 | 11/2013 | Fuente et al. |
| 2013/0318341 A1 | 11/2013 | Bagepalli et al. |
| 2013/0318521 A1 | 11/2013 | Monaghan et al. |
| 2013/0322335 A1 | 12/2013 | Smith |
| 2013/0325450 A1 | 12/2013 | Levien et al. |
| 2013/0325451 A1 | 12/2013 | Levien et al. |
| 2013/0325452 A1 | 12/2013 | Levien et al. |
| 2013/0325453 A1 | 12/2013 | Levien et al. |
| 2013/0325704 A1 | 12/2013 | Gorman et al. |
| 2013/0325934 A1 | 12/2013 | Fausak et al. |
| 2013/0325998 A1 | 12/2013 | Hormuth et al. |
| 2013/0332610 A1 | 12/2013 | Beveridge |
| 2013/0332660 A1 | 12/2013 | Talagala et al. |
| 2013/0332686 A1 | 12/2013 | Ishizawa et al. |
| 2013/0332719 A1 | 12/2013 | Hormuth et al. |
| 2013/0339479 A1 | 12/2013 | Hormuth et al. |
| 2013/0339714 A1 | 12/2013 | Hormuth et al. |
| 2013/0345971 A1 | 12/2013 | Stamm et al. |
| 2013/0346988 A1 | 12/2013 | Bruno et al. |
| 2014/0006482 A1 | 1/2014 | Raghu et al. |
| 2014/0006580 A1 | 1/2014 | Raghu |
| 2014/0006581 A1 | 1/2014 | Raghu |
| 2014/0007089 A1 | 1/2014 | Bosch et al. |
| 2014/0007178 A1 | 1/2014 | Gillum et al. |
| 2014/0013059 A1 | 1/2014 | Joshi et al. |
| 2014/0013311 A1 | 1/2014 | Garrett et al. |
| 2014/0032767 A1 | 1/2014 | Nelson |
| 2014/0053269 A1 | 2/2014 | Ghosh et al. |
| 2014/0059333 A1 | 2/2014 | Dixon et al. |
| 2014/0059362 A1 | 2/2014 | Huang et al. |
| 2014/0095821 A1 | 4/2014 | Yang et al. |
| 2014/0108864 A1 | 4/2014 | Madampath |
| 2014/0115596 A1 | 4/2014 | Khan et al. |
| 2014/0142904 A1 | 5/2014 | Drees et al. |
| 2014/0142905 A1 | 5/2014 | Drees et al. |
| 2014/0146055 A1 | 5/2014 | Bala et al. |
| 2014/0149492 A1 | 5/2014 | Ananthanarayanan et al. |
| 2014/0149494 A1 | 5/2014 | Markley et al. |
| 2014/0149591 A1 | 5/2014 | Bhattacharya et al. |
| 2014/0149983 A1 | 5/2014 | Bonilla et al. |
| 2014/0181833 A1 | 6/2014 | Bird et al. |
| 2014/0195480 A1 | 7/2014 | Talagala et al. |
| 2014/0195564 A1 | 7/2014 | Talagala et al. |
| 2014/0201757 A1 | 7/2014 | Bird et al. |
| 2014/0207871 A1 | 7/2014 | Miloushev et al. |
| 2014/0208153 A1 | 7/2014 | Havemose |
| 2014/0240322 A1 | 8/2014 | Brumer et al. |
| 2014/0245318 A1 | 8/2014 | Adams et al. |
| 2014/0279941 A1 | 9/2014 | Atkisson |
| 2014/0281131 A1 | 9/2014 | Joshi et al. |
| 2014/0304698 A1 | 10/2014 | Chigurapati et al. |
| 2014/0310473 A1 | 10/2014 | Bilas et al. |
| 2014/0310708 A1 | 10/2014 | Lim et al. |
| 2014/0310810 A1 | 10/2014 | Brueckner et al. |
| 2014/0325238 A1 | 10/2014 | Ghose |
| 2014/0325239 A1 | 10/2014 | Ghose |
| 2014/0325267 A1 | 10/2014 | Liu et al. |
| 2014/0331220 A1 | 11/2014 | Barrat et al. |
| 2014/0331228 A1 | 11/2014 | Barrat et al. |
| 2014/0344315 A1 | 11/2014 | Larimore et al. |
| 2014/0351516 A1 | 11/2014 | Larimore et al. |
| 2014/0372717 A1 | 12/2014 | Ciu et al. |
| 2014/0380039 A1 | 12/2014 | Larson et al. |
| 2014/0380405 A1 | 12/2014 | Forsberg et al. |
| 2014/0380425 A1 | 12/2014 | Lockett et al. |
| 2015/0012570 A1 | 1/2015 | Le et al. |
| 2015/0012776 A1 | 1/2015 | Banikazemi et al. |
| 2015/0019827 A1 | 1/2015 | Waldspurger et al. |
| 2015/0052517 A1 | 2/2015 | Raghu et al. |
| 2015/0052521 A1 | 2/2015 | Raghu |
| 2015/0052523 A1 | 2/2015 | Raghu |
| 2015/0052524 A1 | 2/2015 | Raghu |
| 2015/0052525 A1 | 2/2015 | Raghu |
| 2015/0058298 A1 | 2/2015 | Earl et al. |
| 2015/0058933 A1 | 2/2015 | Larson et al. |
| 2015/0066844 A1 | 3/2015 | Yin et al. |
| 2015/0074058 A1 | 3/2015 | Zhao et al. |
| 2015/0074670 A1 | 3/2015 | Gerganov |
| 2015/0074743 A1 | 3/2015 | Ilieva et al. |
| 2015/0149999 A1 | 5/2015 | Ramanathan et al. |
| 2015/0160964 A1 | 6/2015 | Nelson |
| 2015/0163088 A1 | 6/2015 | Anschutz |
| 2015/0178097 A1 | 6/2015 | Russinovich |
| 2015/0222604 A1 | 8/2015 | Ylonen |
| 2015/0237022 A1 | 8/2015 | Larson et al. |
| 2015/0242626 A1 | 8/2015 | Wang et al. |

(56) References Cited

U.S. PATENT DOCUMENTS

| | | |
|---|---|---|
| 2015/0244680 A1 | 8/2015 | Larson et al. |
| 2015/0278034 A1 | 10/2015 | Barnes et al. |
| 2015/0293791 A1 | 10/2015 | Adams et al. |
| 2015/0309883 A1 | 10/2015 | North |
| 2015/0310210 A1 | 10/2015 | Sia et al. |
| 2015/0317491 A1 | 11/2015 | Yang et al. |
| 2015/0331708 A1 | 11/2015 | Bala et al. |
| 2015/0331720 A1 | 11/2015 | Huetter et al. |
| 2015/0334130 A1 | 11/2015 | Brueckner et al. |
| 2015/0341319 A1 | 11/2015 | Larson et al. |
| 2015/0356207 A1 | 12/2015 | Reitman et al. |
| 2015/0363324 A1 | 12/2015 | Joshi et al. |
| 2015/0378766 A1 | 12/2015 | Beveridge et al. |
| 2015/0378771 A1 | 12/2015 | Tarasuk-Levin et al. |
| 2015/0378785 A1 | 12/2015 | Tarasuk-Levin et al. |
| 2015/0378831 A1 | 12/2015 | Tarasuk-Levin et al. |
| 2015/0378847 A1 | 12/2015 | Tarasuk-Levin et al. |
| 2015/0378940 A1 | 12/2015 | Bradbury et al. |
| 2015/0378942 A1 | 12/2015 | Bradbury et al. |
| 2015/0381589 A1 | 12/2015 | Tarasuk-Levin et al. |
| 2016/0004805 A1 | 1/2016 | Drees et al. |
| 2016/0004869 A1 | 1/2016 | Ismael et al. |
| 2016/0006756 A1 | 1/2016 | Ismael et al. |
| 2016/0012009 A1 | 1/2016 | Banikazemi et al. |
| 2016/0019107 A1 | 1/2016 | North |
| 2016/0021077 A1 | 1/2016 | Larson et al. |
| 2016/0036862 A1 | 2/2016 | Bagepalli et al. |
| 2016/0062789 A1 | 3/2016 | Hiltgen et al. |
| 2016/0077761 A1 | 3/2016 | Stabrawa et al. |
| 2016/0077857 A1 | 3/2016 | Dong et al. |
| 2016/0077966 A1 | 3/2016 | Stabrawa et al. |
| 2016/0077975 A1 | 3/2016 | Stabrawa et al. |
| 2016/0078342 A1 | 3/2016 | Tang |
| 2016/0078585 A1 | 3/2016 | Sheldon et al. |
| 2016/0092251 A1 | 3/2016 | Wagner |
| 2016/0110215 A1 | 4/2016 | Bonilla et al. |
| 2016/0110657 A1 | 4/2016 | Gibiansky et al. |
| 2016/0117501 A1 | 4/2016 | Ghose |
| 2016/0119148 A1 | 4/2016 | Ghose |
| 2016/0132333 A1 | 5/2016 | Dixon et al. |
| 2016/0132334 A1 | 5/2016 | Dixon et al. |
| 2016/0132335 A1 | 5/2016 | Dixon et al. |
| 2016/0132336 A1 | 5/2016 | Dixon et al. |
| 2016/0132337 A1 | 5/2016 | Dixon et al. |
| 2016/0134584 A1 | 5/2016 | Lang et al. |
| 2016/0140052 A1 | 5/2016 | Waldspurger et al. |
| 2016/0147631 A1 | 5/2016 | Magdon-Ismail et al. |
| 2016/0147649 A1 | 5/2016 | Magdon-Ismail et al. |
| 2016/0147665 A1 | 5/2016 | Magdon-Ismail et al. |
| 2016/0148403 A1 | 5/2016 | Brumer et al. |
| 2016/0149950 A1 | 5/2016 | Ashley et al. |
| 2016/0150003 A1 | 5/2016 | Magdon-Ismail et al. |
| 2016/0154648 A1 | 6/2016 | Dixon et al. |
| 2016/0170849 A1 | 6/2016 | Cheng et al. |
| 2016/0179721 A1 | 6/2016 | Neiger et al. |
| 2016/0188181 A1 | 6/2016 | Smith |
| 2016/0191298 A1 | 6/2016 | Markley et al. |
| 2016/0191332 A1 | 6/2016 | Markley et al. |
| 2016/0196158 A1 | 7/2016 | Nipane et al. |
| 2016/0196426 A1 | 7/2016 | Hunt et al. |
| 2016/0210177 A1 | 7/2016 | Dixon et al. |
| 2016/0217253 A1 | 7/2016 | Newman et al. |
| 2016/0219115 A1 | 7/2016 | Dong et al. |

OTHER PUBLICATIONS

Xfree86. www.xfree86.org/current/xprop.1.html, Apr. 24, 2011.
D. Lezcano. Linux containers. lxc.sourceforge.net/lxc.html, Feb. 27, 2010.
Slock. tools.suckless.org/slock, 2006-2013.
Vmware ace virtualization suite. www.vmware.com/products/ace, 2013.
J. Chow, B. Pfaff, T. Garfinkel, K. Christopher, and M. Rosenblum. Understanding data lifetime via whole system simulation. In Proceedings of USENIX Security Symposium, pp. 22-22, 2004.
J. Chow, B. Pfaff, T. Garfinkel, and M. Rosenblum. Shredding your garbage: reducing data lifetime through secure leallocation. In Proceedings of the USENIX Security Symposium, pp. 22-22, 2005.
S. Davidoff. Cleartext passwords in linux memory. www.philosecurity.org, 2008.
A. Dinaburg, P. Royal, M. Sharif, and W. Lee. Ether: malware analysis via hardware virtualization extensions. In 15th ACM conference on Computer and communications security, pp. 51-62, 2008.
G. W. Dunlap, S. T. King, S. Cinar, M. A. Basrai, and P. M. Chen. Revirt: Enabling intrusion analysis through virtual-machine logging and replay. In in Proceedings of the 2002 Symposium on Operating Systems Design and Implementation (OSDI), pp. 211-224, 2002.
T. Garfinkel, B. Pfaff, J. Chow, and M. Rosenblum. Data lifetime is a systems problem. In Proc. of ACM SIGOPS European workshop. ACM, 2004.
T. Garfinkel, B. Pfaff, J. Chow, M. Rosenblum, and D. Boneh. Terra: a virtual machine-based platform for trusted computing. pp. 193-206. ACM Press, 2003.
T. Garfinkel and M. Rosenblum. A virtual machine introspection based architecture for intrusion detection. In Proc. Network and Distributed Systems Security Symposium, pages, pp. 191-206, 2003.
T. Garfinkel and M. Rosenblum. When virtual is harder than real: security challenges in virtual machine based aomputing environments. In Proceedings of the 10th conference on Hot Topics in Operating Systems, pp. 20-20, 2005.
Google Corp. Inter-process communication. dev.chromium.org/developers/ design-documents/inter-process-communication, Sep. 27, 2013.
A. Joshi, S. T. King, G. W. Dunlap, and P. M. Chen. Detecting past and present intrusions through vulnerability-specific predicates. In Proceedings of the twentieth ACM symposium on Operating systems principles, pp. 91-104, 2005.
S. T. King, G. W. Dunlap, and P. M. Chen. Debugging operating systems with time-traveling virtual machines. pp. 1-15, 2005.
K. Kourai and S. Chiba. Hyperspector: Virtual distributed monitoring environments for secure intrusion detection. In ACM/USENIX International Conference on Virtual Execution Environments, pp. 197-207, 2005.
Microsoft Corp. Hyper-v server 2008 r2.www.microsoft.com/hyper-v-server/ en/us/overview.aspx 2013.
A. M. Nguyen, N. Schear, H. Jung, A. Godiyal, S. T. King, and H. D. Nguyen. Mavmm: Lightweight and purpose built vmm for malware analysis. In Annual Computer Security Applications Conference, pp. 441-450, 2009.
D. Nurmi, R. Wolski, C. Grzegorczyk, G. Obertelli, S. Soman, L Youseff, and D. Zagorodnov. The eucalyptus open-source cloud-computing system. In Proceedings of the 9th IEEE/ACM International Symposium on Cluster Computing and the Grid, pp. 124-131, 2009.
D. A. S d. Oliveira and S. F. Wu. Protecting kernel code and data with a virtualization-aware collaborative operating system. In Annual Computer Security Applications Conference, pp. 451-460, 2009.
Oracle Corp. Virtualbox. www.VirtualBox.org, Sep. 27, 2013.
B. D. Payne, M. Carbone, M. Sharif, and W. Lee. Lares: An architecture for secure active monitoring using iirtualization. In IEEE Symposium on Security and Privacy, pp. 233-247, 2008.
R. Riley, X. Jiang, and D. Xu. Guest-transparent prevention of kernel rootkits with vmm-based memory shadowing. In the 11th international symposium on Recent Advances in Intrusion Detection, pp. 1-20, 2008.
N. Santos, K. P. Gummadi, and R. Rodrigues. Towards trusted cloud computing. In HOTCLOUD, 2009.
A. Seshadri, M. Luk, N. Qu, and A. Perrig. Secvisor: a tiny hypervisor to provide lifetime kernel code integrity for aommodity uses. In Proceedings of Twenty-First ACM SIGOPS symposium on Operating Systems Principles, pp. 335-350, 2007.

(56) References Cited

OTHER PUBLICATIONS

VMware.Cloud computing.www.vmware.com/solutions/cloud-computing, Sep. 27, 2013.
VMware Inc. www.vmware.com, 2013.
VMware Inc. Vmware infrastructure. www.vmware.com/landing_pages/ discover.html, 2013.
Xen. Xen cloud platform—advanced virtualization infrastructure for the clouds. www.xen.org/products/cloudxen.html, 2013.
A. Kivity, Y. Kamay, D. Laor, U. Lublin, and A. Liguori. kvm: the linux virtual machine monitor. In Proc. of the Linux Symposium, pp. 225-230, Jun. 2007.
M. Balduzzi, J. Zaddach, D. Balzarotti, E. Kirda, and S. Loureiro. A security analysis of amazon's elastic compute cloud service. In ACM Symposium on Applied Computing, pp. 1427-1434, 2012.
OpenVZ. Container-based Virtualization for Linux, www.openvz.com, 2013.
M. I. Gofman, R. Luo, P. Yang, and K. Gopalan. SPARC: A security and privacy aware virtual machine checkpointing mechanism. In Proceedings of the 10th annual ACM Workshop on Privacy in the Electronic Society (WPES), in conjunction with the ACM Conference on Computer and Communications Security (CCS), pp. 115-124, 2011.
D. P. Bovet and M. C. Pk Understanding the Linux Kernel, Third Edition. O'Reilly Media, 3 edition, Nov. 2005.
J. Corbet, A. Rubini, and G. Kroah-Hartman. Linux Device Drivers, 3rd Edition. O'Reilly Media, Inc., 2005.
D. A. Solomon and M. Russinovich. Inside Microsoft Windows 2000. Microsoft Press, 2000.

\* cited by examiner

Step 1: Add a Credit or Debit Card

Credit or debit card number:

9149239648

Cardholder's Name:
(as it appears on the credit card)

ping

Checkpoint (with or without closing FireFox)

Search for "CreditCard"

```
0114:8EB0 cach § C      C1
0114:8EC0 rolà     ..addCred
0114:8ED0 itCardNumber=914
0114:8EE09239648   returnj
0114:8EF0so 2   àÿ àÿ à█ à
```

SYSTEM AND METHOD FOR SECURITY AND PRIVACY AWARE VIRTUAL MACHINE CHECKPOINTING

CROSS REFERENCE TO RELATED APPLICATION

The present application is a Continuation of U.S. patent application Ser. No. 14/040,820, filed Sep. 30, 2013, now U.S. Pat. No. 9,069,782, issued Jun. 30, 2015, which is a non-provisional of, and claims benefit of priority from, U.S. Provisional Patent Application Ser. No. 61/708,232, filed Oct. 1, 2012, the entirety of which is expressly incorporated herein by reference in its entirety.

STATEMENT OF GOVERNMENT INTEREST

This invention was made with government support under CNS-0845832, awarded by the National Science Foundation. The government has certain rights in the invention.

FIELD OF THE INVENTION

The present technology relates to the field of virtual machine security, and in particular security of checkpoint information stored in physical persistent memory.

BACKGROUND OF THE INVENTION

Virtualization technology is being widely adopted in grid and cloud computing platforms [31, 34, 23, 28] to improve server consolidation and reduce operating costs. On one hand, virtual machines (VMs) help improve security through greater isolation and more transparent malware analysis and intrusion detection [22, 24, 27, 10, 11, 14, 17, 29, 26, 19]. On the other hand, virtualization also gives rise to new challenges in maintaining security and privacy in virtualized environments. Although significant advances have been made in developing techniques to secure the execution of VMs, a number of challenges remain unaddressed.

VM checkpointing refers to the act of saving a permanent snapshot (or checkpoint) of a VM's state at an instant in time. Virtual Machine (VM) checkpointing enables a user to capture a snapshot of a running VM on persistent storage. A VM's state includes, at the minimum, its memory image and CPU execution state and possibly additional states such as virtual disk contents. The checkpoint can be later used for various purposes such as restoring the VM to a previous state, recovering a long-running process after a crash, distributing a VM image with a preset execution state among multiple users, archiving a VM's execution record, conducting forensic examination, etc. Most hypervisors such as VMware (VMware Inc.), Hyper-V (Microsoft, Inc.), VirtualBox (Oracle Inc.), KVM [35], and Xen (Xen.org) support VM checkpointing.

Despite the above benefits, VM checkpoints can drastically prolong the lifetime and vulnerability of sensitive information. Checkpoints are stored on persistent storage and contain the VM's physical memory contents at a given time instant. Data that should normally be discarded quickly after processing, such as passwords (especially clear text passwords), credit card numbers, health records, or trade secrets, can now be saved forever in persistent storage through VM checkpointing.

This vulnerability can be demonstrated using a common scenario of entering credit card information in a website. As shown in FIG. 4, the FireFox browser was started inside a VirtualBox VM. The browser was then connected to www.amazon.com, "my account" clicked to add credit card information, the number 9149239648 entered into the credit card number field, and then checkpointing was performed. When searching through the checkpoint file with a hex editor, the credit card number entered earlier was located. In some of experiments, the checkpoint file contains the string "addCreditCard-Number=9149239648", which can enable an attacker to locate the credit card number easily by searching for the string "CreditCard" in the checkpoint. Furthermore, even if the checkpointing is performed after the browser terminates, the credit card number can still be located in the checkpoint file, likely because the browser's memory was not cleared before the browser terminated. In other words, the common advice to "close your browser after logging out" may give users a false sense of security. Many users are not aware that their input data may still reside in memory even after the application that has processed such data terminates. Such users may mistakenly assume that checkpointing the VM is safe simply because the application has terminated.

Passwords in the memory of xterm terminal emulator (both running and terminated) were also identified in the checkpoint file.

Besides memory, even checkpointing a VM's disk may also end up storing users' confidential data in the snapshot. For example, Balduzzi et. al [36] analyzed 5303 public Amazon EC2 snapshots and found that many of them contain sensitive information such as passwords, browser history, and deleted files.

Previous work on minimizing data lifetime has focused on clearing the deallocated memory (also known as memory scrubbing). Chow et al. [6] and Garfinkel et al. [12] discussed in depth the problem of sensitive data being stored in memory, and observed that the sensitive data may linger in memory for extended periods and hence may be exposed to compromise. In [7], authors proposed a multi-level approach to clearing deallocated memory at the application, compiler, library, and system levels. A similar mechanism is included in Windows operating systems, which uses system idle time to clear deallocated memory pages [30]. Also, in Unix systems, it is common to clear memory before reuse [12]. However, simply clearing deallocated memory does not solve our problem because memory pages that have not been deallocated may contain sensitive information and such information may be checkpointed. As a result, SPARC also clears the memory pages of the excluded processes in checkpoints. Selectively clearing memory pages during checkpointing is much more challenging than scrubbing only deallocated memory because multiple processes may share the same memory pages (e.g. shared libraries) and we must ensure that excluding one process will not affect other processes when the VM is restored.

Garfinkel et al. [12] also proposes to encrypt sensitive information in the memory and clear the sensitive information by simply discarding the key. However, encrypting sensitive information in memory can add significant overheads to access the information and may still expose sensitive information if the VM is checkpointed at the moment when some program decrypts the sensitive information.

Features protecting virtual disk, memory, and checkpoints have found their way into research prototypes as well as commercial virtualization products. Garfinkel et al. [13] developed a hypervisor-based trusted computing platform that uses trusted hardware features such as encrypted disks and the use of a secure counter to protect against file system rollback attacks, to permit systems with varying security requirements to execute side-by-side on the same hardware platform. The platform's privacy features include encrypted disks and the use of a secure counter to protect against file system rollback attacks in which the state of a file is rolled back. [15] and [2] also suggested encrypting checkpoints. However, encrypting the checkpoint alone is insufficient because (1) it still prolongs the lifetime of confidential data that should normally be quickly destroyed after use; (2) when the VM is restored, the checkpoint will be decrypted and loaded into the memory of the VM, thus exposing the confidential data again; (3) the checkpoint file may be shared by multiple users, thus increasing the likelihood of data leakage.

VMware ACE [2], VMware Infrastructure [33], and VirtualBox [25] allow users to exclude the entire memory from being checkpointed. However, none of them provides a level of granularity that we do by selectively excluding processes from the checkpointed memory. Davidoff et al. [9] retrieved clear text passwords from the physical memory of a Linux system. Their work aimed to show that the physical RAM may retain sensitive information even after the system has been powered off, and the attacker with physical access to the system can steal information through cold boot memory dumping attacks. However, with checkpoints, the problem is significantly more severe: in the RAM, the amount of time the sensitive information persists in the memory after the machine is powered off, is limited by the RAM's ability to retain information in absence of power. However, the checkpoints are saved to the disk and the information stored in the checkpoints can persist for long time. Also, they assume that the attacker has physical access to the system, but we do not.

Several prior works have employed VM checkpointing to enable execution replay for intrusion analysis and OS debugging. Dunlap et al. [11] proposed an intrusion detection mechanism called ReVirt which allows instruction-by-instruction replay of the guest OS execution. King et al. [18] used ReVirt and disk logging to implement an OS debugger. However, neither work attempts to address data lifetime issues raised by VM checkpointing.

SUMMARY OF THE INVENTION

To address the limitations of traditional checkpointing technologies, two approaches are provided to prevent users' confidential data from being stored in VM checkpoints. The first is an application-transparent approach for situations when it is not possible to modify the applications that handle confidential data. The approach seeks to identify processes that store confidential data and to exclude all the memory pages and files that potentially contain data accessed by these processes from the checkpoint file. While transparent, this approach results in the termination of applications when the VM is later restored. The second approach is an application-visible approach which preserves the application, but not the confidential data, upon VM restoration. The key idea is to provide the application programmers with an API that allows them to mark the memory regions and files that contain confidential data, and to be notified by the hypervisor when VM checkpointing or restoration events occur. Thus an application can adapt its execution and the visibility of confidential data to checkpoint/restore events. In both approaches, we assume that the VM is not compromised when the checkpointing is performed. A cooperative application may also store a time-varying code along with variable or contingent data, which permits the application to determine whether data is stale or has been restored. This, in turn permits blanking or corruption of the respective data in the checkpoint file, to the extent it is present, without interference with the application, since the application will ignore the contents if the data is restored or stale in any case.

The key challenge with both approaches is to exhaustively exclude or sanitize all VM contents that contain confidential data and to ensure that the VM's stability and consistency are maintained when the VM is restored from the checkpoints. Similar approaches can be used to prevent confidential data from being stored in disk checkpoints or other local, remote or distributed storage media.

Application-Transparent Approach for Excluding Confidential Data

An application-transparent approach is investigated for privacy-aware checkpointing for cases where it is not possible to modify a VM's applications, such as Web browsers, Email clients, Terminals etc.

Since the internal semantics of the application, such as data structures handling confidential information, are not known, the best one can do to exclude confidential information from checkpoints is to exclude the entire memory footprint of the application in both user and kernel space. This approach ensures that, when the VM is later restored from the sanitized checkpoint, the original applications that handled confidential information will no longer resume. Developing an application-transparent approach is challenging because processes and the operating system can have complex dependencies. Specifically, we expect the following requirements to be met in order to safely exclude entire applications from VM checkpoints: (1) During checkpointing, the stability of any processes currently executing in the VM should not be affected; (2) Checkpointing should exhaustively identify and exclude all memory regions accessed by applications that handle confidential information; (3) After restoration, processes that did not have any dependencies (such as inter-process communication) with the excluded application should resume normally; (4) The mechanism should not compromise the security of the VM and the hypervisor.

FIG. 2B gives the high-level architecture of the proposed application-transparent approach, which works with both hosted and native hypervisors. A special process called the guest service inside the VM collects physical addresses of memory pages that belong to the applications being excluded from the VM checkpoint. When checkpointing is initiated, another special process in the hypervisor, called the exclusion service, requests the guest service to provide the collected physical addresses of memory pages to be excluded. The exclusion service then relays the addresses to the checkpointer in the hypervisor, which in turn zeros out the specified pages in the checkpoint file.

Another option is to monitor the user input stream, or more generally selectively from the I/O stream from non-program memory sources during a session. The selection of sources, such as user keyboard input, is such that a reasonable assumption may be applied that any such information contains information that might be private, though exceptions may be provided. The stream is then searched or cross correlated with the checkpoint files, and memory locations that include "copies" of the stream are then tagged as possible private information. In some cases, this will be highly disruptive to a restoration of a checkpoint file, since this may void the state of an application, and therefore is best applied to applications whose particular state is not desired to be restored.

To demonstrate the feasibility of the application-transparent approach, a prototype called SPARC—a Security and Privacy AwaRe Checkpointing system [38] was developed.

SPARC ensures that all memory footprint of the excluded process, such as virtual memory pages, TTY buffers, and network packets, are cleared. FIGS. 1A and 1B show an example where a user enters a credit card number into the FireFox web browser and the checkpoint is performed as soon as the credit card number is entered. FIG. 1A gives the screenshot of a VM restored using VirtualBox's default mechanism. FIG. 1B gives the screenshot of the VM restored using SPARC in which Firefox and the information processed by Firefox (such as the credit card number entered) are excluded from being checkpointed. SPARC also handles dynamic changes to virtual-to-physical memory mappings while checkpointing is in progress (since memory pages can be swapped in and out of disks), by freezing all user space processes, except the guest service.

The performance of the SPARC prototype was evaluated on a number of real-world applications. FIGS. 5A and 5B compare the execution time of performing checkpointing and restoration using SPARC and the VirtualBox's default mechanism. All experiments were conducted on a host with Intel Dual CPU 2.26 GHz processor and 2 GB of RAM, and running Ubuntu Linux 10.4 kernel version 2.6.32, and a guest VM with 800 MB of memory, a single processor, and Ubuntu Linux 9.10 kernel version 2.6.31. Each data point is an average of execution time over 5 runs. The experimental results show that the prototype imposes 0:5%-7:1% overhead on checkpointing, 1:4%-2:5% overhead on restoration, and 1%-5:3% overall overhead.

Designing a Process Container to Facilitate Privacy-Aware Checkpointing

The sensitive data processed by a process may reside in a number of memory locations such as process memory, the deallocated pages, TTY buffers, the socket/pipe/FIFO buffers etc. Currently, disparate locations in the VM's kernel memory must be examined in order to identify memory pages related to a process. To ease the identification of process-specific pages, a lightweight process container may be provided that cleanly encapsulates the state of each process (or process groups). Processes running inside the container will be excluded from being checkpointed. The design of such a container also makes traditional techniques for taint analysis easier and more efficient. Existing container mechanisms [20, 37] do not provide adequate support for memory tracking and exclusion for operations such as VM checkpointing.

Accounting for Inter-Process Dependencies

Processes may communicate with each other directly or in-directly through mechanisms such as sockets, pipes, FIFO buffers etc. As a result, excluding a process may affect other processes that communicate with it after restoration. In addition, non-system-critical processes that have interacted with the excluded process may obtain sensitive information from the excluded process, and hence also need to be excluded. Techniques may therefore be provided to account for such inter-process dependencies while maintaining system stability after restoration. All processes that depend upon the excluded process should be exhaustively identified. One possible solution is to monitor the establishment of inter-process dependencies using hooks in the guest kernel and analyze this information to derive inter-process dependencies. This approach, however, may miss some external dependencies that could occur when some the corresponding code paths have not been executed before checkpointing. For example, this approach cannot detect the dependency where the excluded process writes to a file before checkpointing and another process accesses the file after restoration. This issue may be addressed by combining both static analysis and dynamic tracking.

Ensuring Consistent Storage

A process being excluded from checkpoint file may be performing a write operation on a file or a database when checkpointing is performed. If the memory pages are simply cleared of the process from the checkpoints and the process killed during restoration, the file or the database could be left in an inconsistent state after restoration. Privacy-aware checkpointing could compound this problem by introducing I/O operations that do not complete after restoration. One approach to solving this problem is to checkpoint the specific files that have been closed by the process, and after restoration, roll back such files to a prior consistent state. Another approach is to track all the I/O operations on files opened by the excluded process and undo those operations upon VM restoration.

Security Analysis

Potential attacks that may specifically target privacy-aware checkpointing may also be identified. For example, the attacker may use privacy-aware checkpointing to hide their activities by excluding their malicious applications. This can affect intrusion detection techniques that rely on replaying checkpoints (e.g. [11]). Such potential attacks may be identified through formal verification, i.e., formally modeling the system and the attackers' behavior, and checking if the system conforms to desirable security properties.

Application-Visible Approach for Excluding Confidential Data

The application-transparent approach described above for privacy-aware checkpointing is useful when the applications within the VMs cannot be modified. Since the semantics of the application internals are unknown, this approach requires that the application be terminated when the VM is later restored, because the integrity of the application cannot be guaranteed upon resumption from a sanitized checkpoint. However, in some situations it may be desirable to keep the application alive after the VM is restored.

Ideally, one would prefer that the application can determine on its own as to what internal state to reset and what to retain after a VM restoration event. To do so, firstly, an application needs to keep track of all the internal application state that contains confidential data so that it can be excluded from the checkpoint. Secondly, after a VM is restored from a checkpoint, the application needs to be able to resume execution safely, even though some of its internal state (containing confidential data) was excluded from the checkpoint. Finally, some of the application's confidential data may be stored in the guest OS in the form of internal kernel state, such as network packets, I/O buffers etc. Thus a VM checkpointing should ensure that such kernel state is excluded from the checkpoint and that the kernel can resume safely after VM's restoration.

To address the above challenges, an application-visible approach is provided, which preserves the application, but not its confidential data, when a VM is restored from the checkpoint. As the name suggests, the basic idea is to expose the VM checkpointing and restoration operations to the applications within the VM through an application programmer interface (API). The API allows an application to specify the memory regions that contain confidential data before a privacy-aware checkpointing operation occurs and to resume normally with integrity once the VM is restored from a sanitized checkpoint. Specifically, the API will (a) allow applications to register confidential memory, which will not be checkpointed or transmitted without explicit permission of the applications; (b) inform applications just before checkpointing to allow applications to transition to a "safe" state; (c) inform applications after checkpointing completes to allow applications to resume safely; and (d) inform applications after the VM is restored from a checkpoint so that applications can restart safely.

While an application can use the API above to register the memory location of its confidential data, it is still possible that other memory locations that are not registered become tainted by the confidential data during normal processing by the application. Information flow analysis may be performed to automatically register all variables that may store the registered data. In addition, the application also constantly interacts with the guest kernel by invoking system calls and exchanging data for I/O operations. Thus confidential data may also reside in the kernel memory at the time the checkpointing is initiated. Therefore, the checkpointer should exclude the application's footprint that may be present in kernel memory, not just in user space memory.

One approach is as follows. When checkpointing is initiated, the kernel will temporarily pause new system calls and I/O requests from the application and complete (or flush) any pending I/O operations such as disk I/O, network packets, display buffers, etc. The kernel will also zero out all I/O buffers after the completion of the I/O operations to prevent data leakage through buffer reuse. Once the kernel memory is sanitized of application's confidential data, the VM checkpointing operation can be allowed to proceed. Scrubbing the kernel memory in this manner could potentially add non-trivial latency to the start of checkpointing.

The technique permits application programmers to use a privacy-aware checkpointing API, to help applications retain greater control over their confidential data and execution state during VM checkpointing and after VM restoration. Specifically, by making the checkpointing mechanism visible to the applications, leakage of confidential data from the VM can be prevented without compromising the application's stability after the VM is restored. In addition, the technique will enable programmers to exclude confidential data that cannot be specified by users of the application, such as encryption keys processed within the program.

It is therefore an object to provide a security and privacy aware VM checkpointing mechanism, which enables users to selectively exclude processes and terminal applications that contain users' confidential and private information from being checkpointed. The technology helps minimize the lifetime of confidential information by preventing unintended checkpointing of process-specific memory contents. A prototype of the technology using the VirtualBox hypervisor and Linux VM and tested it over a number of applications. This imposes only 1:02%-5:29% of overhead with common application workloads in testing.

The technology can also exclude confidential disk information from being checkpointed. VMs are designed in which the state of each process is cleanly encapsulated. This helps avoid scrubbing process-specific information from disparate locations in OS memory. In addition, process containers can tightly isolate the entire state of a process and hence simplify the task of identifying and destroying sensitive information. Finally, the technology assumes that the hypervisor and the VM have existing runtime protection mechanisms against malicious intrusions and focuses on exclusively selective exclusion of confidential process information from checkpoints. Potential attacks on the technology that may specifically target the technology to hide the attacker's activities, may be identified, and counter-measures developed.

DESCRIPTION OF THE PREFERRED EMBODIMENTS

The present technology provides techniques to address some of the security and privacy issues in VM checkpointing. VM checkpointing saves a persistent snapshot (or a checkpoint) of the entire memory and disk state of a VM in execution.

Security and Privacy AwaRe Checkpointing (SPARC) is a mechanism that enables users to selectively exclude processes and terminal applications that contain sensitive data from being checkpointed. Selective exclusion is performed by the hypervisor by sanitizing those memory pages in the checkpoint file that belong to the excluded applications. SPARC poses only 1.02-5.29% of overhead with common application workloads, if most pages are dirty before checkpointing is performed, in a commodity Linux operating system.

SPARC enables users to exclude specific applications, which contain users' confidential and private information, from being checkpointed by the hypervisor. For example, a user may wish to exclude a web browser application from being checkpointed because the user may enter his password and credit card number using the browser. Moreover, SPARC enables users to exclude terminal applications on which applications processing sensitive information are running from being checkpointed. A SPARC prototype based on the VirtualBox 3.1.2 OSE hypervisor and Ubuntu Linux 9.10 guest (kernel v2.6.31) was implemented.

Excluding an Application from Checkpoint

SPARC enables users to specify applications they wish to exclude from being checkpointed. Such applications are typically applications that may process sensitive information (e.g. FireFox, Internet Explorer, Email clients, etc). VirtualBox checkpointing creates two files: a .sav file which stores the contents of the VM's physical memory, and a .vdi file which stores the disk image. For efficiency, when checkpointing the disk image, instead of cloning the entire disk, VirtualBox freezes the current disk and creates a new differencing disk to which all subsequent write operations are redirected. Exclusion of physical memory of specific applications from being checkpointed is a particular focus. Disk checkpointing issues may be analogously handled.

Figure 1A:
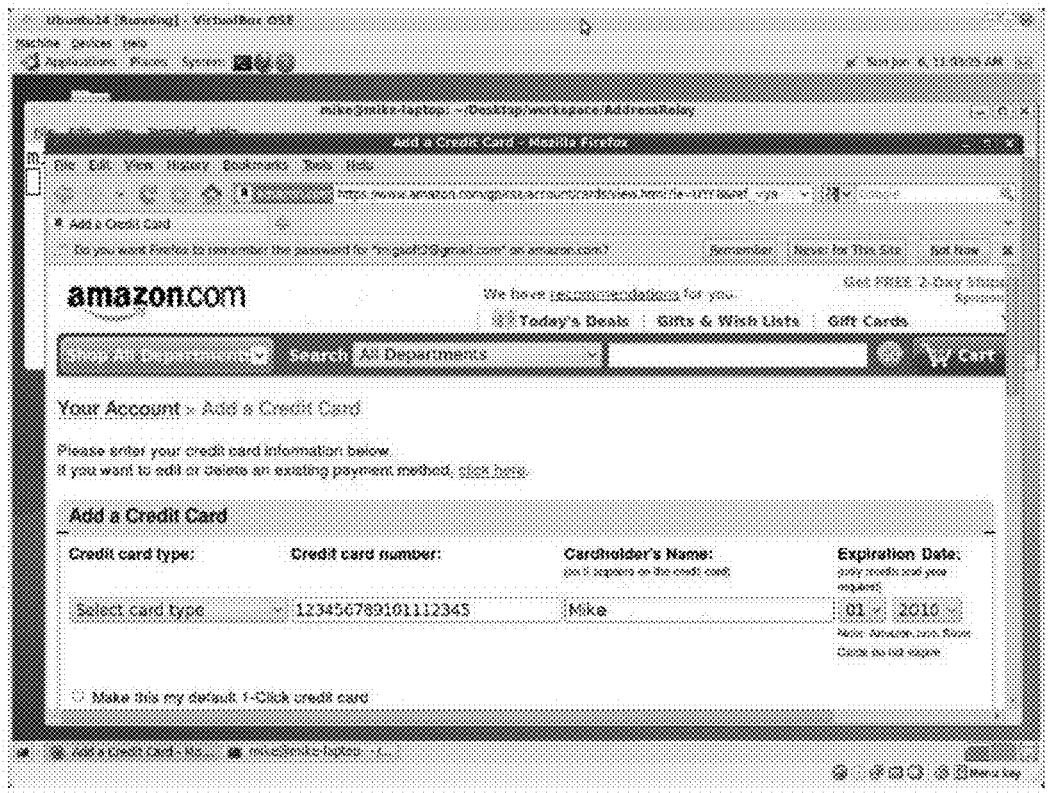
FIG. 1A shows VM restored using VirtualBox's default checkpointing mechanism.
Figure 1B:
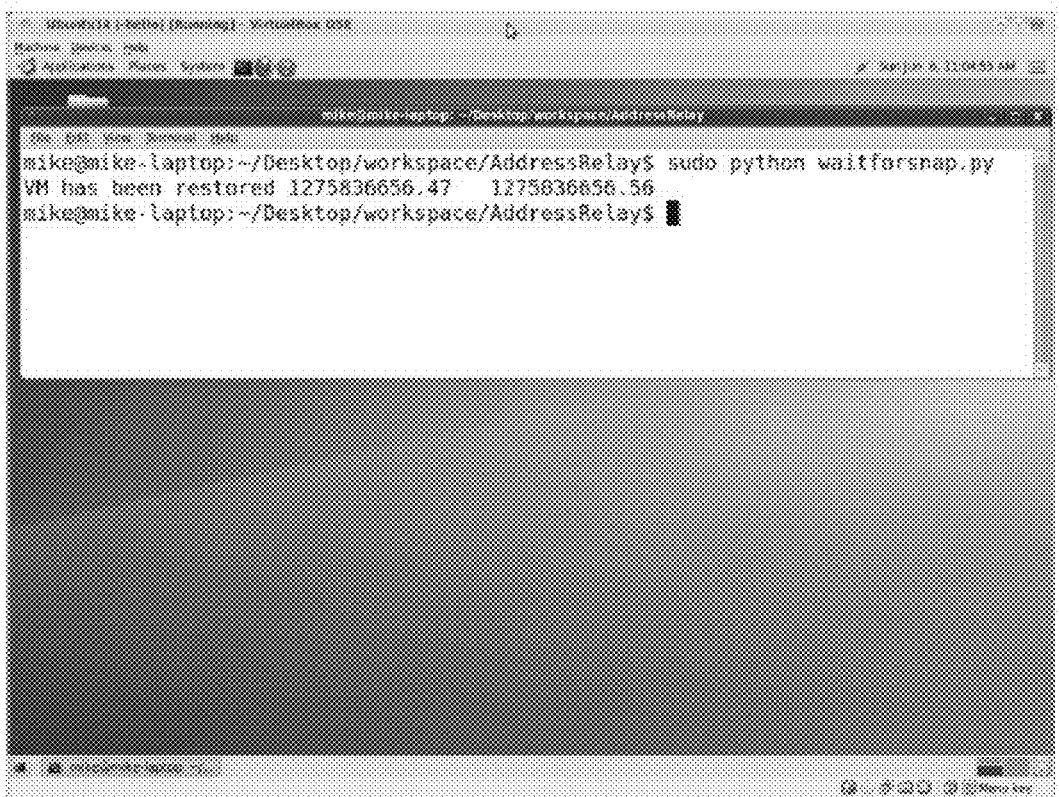
FIG. 1B shows VM restored using SPARC with FireFox excluded.

Again, consider the example where a user has entered a credit card number into the FireFox web browser. If the user performs checkpointing after the credit card number is entered, then the credit card number may be stored in the checkpoint even if FireFox has been terminated or is being used to access other URLs. SPARC would let the user exclude FireFox from being checkpointed, i.e., data processed by FireFox will not be stored in the checkpoints (but the corresponding memory pages will not be cleared from RAM in order not to affect the current execution of processes). FIG. 1A gives the screenshot of a VM restored using VirtualBox's default mechanism, in which checkpointing is performed as soon as the user enters his or her credit card number. FIG. 1B gives the screenshot of the VM restored using SPARC in which FireFox and the information processed by FireFox are excluded from checkpointing.

Figure 2A:
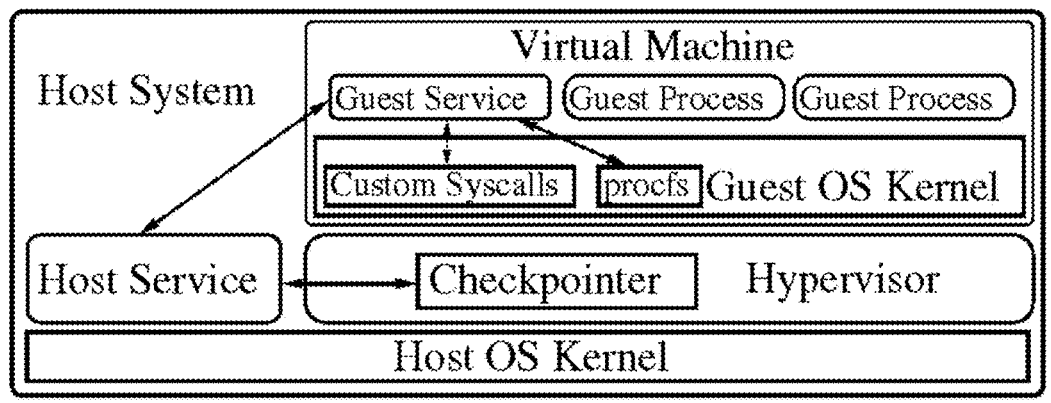
FIGS. 2A and 2B shows the Architecture of SPARC with an application aware and application transparent approach, respectively.
Figure 2B:
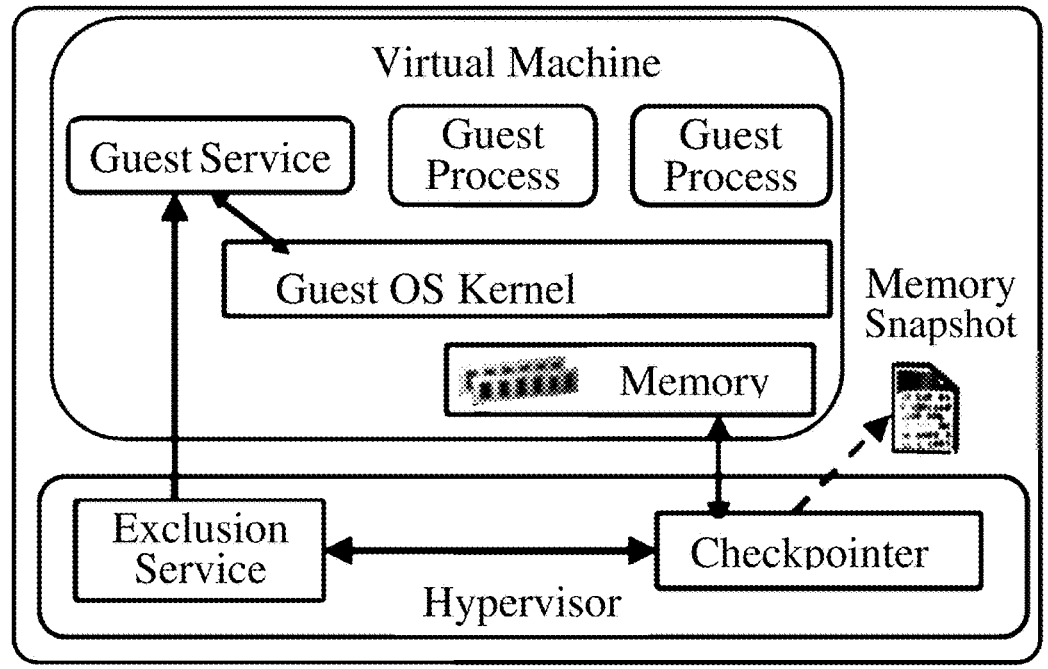

FIG. 2A gives the high-level architecture of SPARC. First, the user selects a list of applications that he or she wishes to exclude from being checkpointed. Next, a special process called the guest service in the VM invokes custom system calls to identify and collect physical addresses of memory pages that belong to the application being excluded, such as process memory, page cache pages, etc. Custom syscalls were used for ease of prototyping and can be easily replaced with a more transparent and extensible ioctl interface. Checkpointing is initiated from another special process called the host service located at the host system. The host service sends a notification to the guest service that checkpointing has been requested. The guest service replies with the collected physical addresses of memory pages that need to be excluded. The host service then relays the addresses to the hypervisor which in turn commences the checkpoint. The checkpointer in the hypervisor uses the received physical addresses to determine which memory to clear in the say file. To ensure that VM can be restored successfully, excluding a process should not affect other processes. As a result, memory pages that are shared by multiple processes will not be excluded from being checkpointed.

Excluding Process Physical Memory

In the virtual address space of a process in Linux, the program code segment stores the executable code of the program. The uninitialized and initialized data sections store uninitialized and initialized static variables, respectively. The heap contains dynamically allocated memory. The memory-mapped region for shared libraries section contains shared libraries mapped into the memory of the process. The stack contains information about function calls in progress e.g., local variables of functions.

SPARC identifies and collects information about memory pages that belong to a process with ID pid and excludes those pages from the checkpoint. First, the guest service invokes a system call that locates the struct task struct associated with each process, which links together all information of a process e.g. memory, open files, terminal, and pending signals. This structure contains field struct mm struct *mm which points to the structure containing virtual memory information of a process. The mm struct contains fields unsigned long start code and unsigned long end code which point to the beginning and ending addresses of the process' code segment respectively, and struct vm area struct * mmap which points to the head of the list of vm area structs where each vm area struct represents a segment of process virtual memory. The vm area struct contains fields unsigned long vm start and unsigned long vm end which point to the beginning and ending addresses of the segment within the virtual process memory space, struct file * vm file which points to the corresponding file descriptor if the segment represents a memory mapped file (e.g. library or otherwise NULL), and struct vm area struct *vm next which points to the next segment. The system call then traverses a list of vm area structs and compares the vm start and vm end against start code and end code. If they match, then the memory segment represents an executable image, and hence is skipped because it cannot contain sensitive information and clearing the executable image may affect other processes which share the same in-memory executable image. Also, it checks if vm file is NULL and if so adds the address to the list; otherwise, the segment represents a shared library mapped into memory, and is skipped over because it may affect other processes which have mapped the same library into memory.

The process file system (procfs) is a virtual file system that enables access and modification of kernel parameters from the user space through a file-like interface. For example, the user can find out the previously described process virtual memory information by reading file/proc/pid/maps. The guest service converts the virtual address of each page into the physical address based on file /proc/pid/pagemap in the procfs. For each virtual page of the process, this file contains e.g., a 64-bit integer which encodes a bit indicating whether the page is resident in the physical memory and if so the physical address of the page. To avoid affecting other processes in the system, all resident pages which are being mapped more than once are skipped. To determine the number of times a physical page has been mapped, the guest service checks the file /proc/kpagecount which contains an array that records the number of times each physical page has been mapped.

Finally, the physical address of each page is sent to the host service which in turn relays the address to the hypervisor. When VirtualBox creates a memory checkpoint, prior to saving a physical page to the .sav file, SPARC checks if the physical address of the page matches one of the received addresses. If not, it saves the contents of the page to the checkpoint. Otherwise, it saves a page containing all 0's. To implement this behavior in the VirtualBox, the function pgmSavePages( ), which saves the VM's physical memory in checkpoints, was modified.

Because pages are constantly swapped between the disk and the physical memory, the virtual-to-physical memory mappings of a process may change after collecting the physical addresses. This may result in excluding the wrong memory contents. This is overcome by freezing all user space processes except the guest service. This is achieved by using the freeze processes( ) function of the Linux kernel and preventing the guest service from freezing by setting its PF NOFREEZE flag. Once the checkpointing completes, all processes are unfrozen with the thaw processes( ) function, and the execution proceeds as normal. When the VM is restored, the guest service detects the restoration event and sends the SIGKILL signal to each target process whose memory contents were previously excluded during checkpointing. This SIGKILL signal is useful to allow the guest kernel to clean up any residual state (other than memory) for excluded processes before the VM resumes. Finally, the guest service unfreezes the remaining processes and the execution proceeds as normal.

If, prior to the checkpoint, the target process deallocates pages containing sensitive information, these page can no longer be identified and cleared. Hence, the function free pages( ) which deallocates pages is modified, to zero out any page belonging to the target process prior to deallocation.

Excluding Pages of a Process in the Page Cache

Page cache is used by the kernel to speed up disk operations by caching disk data in the main memory. Page cache speeds up disk operations as follows. When data is read from the disk, a page is allocated in the physical memory and is filled with corresponding data from the disk. Thus, all subsequent reads targeted at the same disk location can quickly access the data in the main memory. Subsequent write operations to the disk location simply modify the page in the page cache. The kernel, after some delay, synchronizes the page with the disk. Every disk operation in Linux goes through the page cache (except for the swap device or files opened with O DIRECT flag) [5].

If the process performs disk I/O operations, the sensitive information read from and written to the disk may reside in the page cache. For example, when searching for any string using the Google search engine through a web browser, it was found that the string appears in the kernel's page cache, possibly because Google caches suggestions for frequent searches on the local disk. Moreover, when a process terminates, the page cache retains some of the pages of the terminated process for a period of time in case that the same data is accessed by another process in the near future. Even when the page is evicted, the page contents will remain in the free memory pool until overwritten.

SPARC excludes the cached pages of the target process in the checkpoints as follows. First, it locates the file descriptor table of the target process (struct fdtable * fdt). The file descriptor table contains field struct file ** fd which is an array of opened file descriptors and struct fd set *open fds which points to the structure containing information about open file descriptors. If open fds contains a set bit for file descriptor i, we examine location i in array fd and refer to the field struct* fd entry which points to the directory entry associated with a file descriptor. The directory entry contains a field struct inode* d inode which points to the inode associated with the directory entry. Reference is then made to field struct address space i mapping* of the inode, which contains information about pages in the page cache that cache information of the file represented by the file descriptor. Next, function pagevec lookup( ) is called, which takes as a parameter the i mapping field of the inode and an object of type struct pagevec that contains an array pages of page descriptors. Function pagevec lookup( ) uses the i mapping field of the inode to identify all pages in the page cache which cache the data of the file represented by the file descriptor and fills the pages field of page vec with page descriptors of such pages. The page descriptors are then converted to physical addresses of the pages, the addresses transferred to the host service, and they are cleared similarly to the process physical pages.

Note that when a process closes a file descriptor, the descriptor is removed from the descriptor table of the process. As a result, if the process closes the descriptor prior to checkpointing, the above approach will fail to detect the associated pages in the page cache. To counter this, whenever a file descriptor is closed, all pages are evicted and cleared from the page cache associated with the inode of the closed file descriptor.

Even after a page is being evicted from page cache (remove from page cache( )), the physical memory pages may still retain sensitive data belonging to the target process. Hence SPARC sanitizes (zeros out) each evicted page that was originally brought into the cache on behalf of the target process.

Finally, the (cleared) pages in the page cache may also be used by other processes. To avoid affecting the processes which rely on these pages, when the VM is restored (but before the processes are thawed), all pages used by the target processes are flushed from the page cache.

Excluding Pipe Buffers

Pipes and FIFOs are mechanisms commonly used for implementing producer/consumer relationship between two processes. A pipe enables communication between the parent and the child processes. A parent process creates a pipe by issuing a pipe( ) system call. The system call returns two file descriptors. Any data written the first file descriptor (e.g. via the write( ) system call) can be read from the second descriptor (e.g. with the read( ) system call. Shell programs make use of pipes to connect output of one process to the input of another (e.g. "ls|grep myinfo"). FireFox browser also uses pipes to trace malloc memory allocations.

FIFOs are similar to pipes but allow communication of two unrelated processes. A FIFO is created via mkfifo( ) system call, which takes the name of the FIFO as one of the parameters. Once created, the FIFO appears like a regular file on the file system, but behaves like a pipe: the producer process opens the FIFO "file" for writing and the consumer process for reading. For example, in a terminal, a user can create a FIFO called myfifo with command mkfifo myfifo. Issuing command echo "Data lifetime is important">myfifo will write the string "Data lifetime is important" to the buffer of myfifo. Subsequent command cat myfifo will remove the string from the buffer of myfifo and print "Data lifetime is important". FIFOs are frequently used by the Google Chrome to implement communications between the renderer process and the browser process [16].

Data exchanged via pipes and FIFOs flows through a pipe buffer in the kernel. Thus, if the target process makes use of pipes and/or FIFOs, the corresponding pipe buffers should also be sanitized. Each pipe buffer is implemented using a struct pipe buffer structure, which contains a field page pointing to the page descriptor of a page storing the actual inter-process data.

Pipe buffers are sanitized as follows. First the file descriptors opened by the process which represent pipes and FIFOs are located, in a manner similar to identifying file descriptors representing regular files, except that the S ISFIFO macro is called, which takes the i mode field of the inode and returns true if the file descriptor represents a pipe or a FIFO. If the macro returns true, the struct pipe inode info *i pipe field of the inode is referred to. This field contains array struct pipe buffer bufs[PIPE BUFFERS] of all pipe buffers owned by the pipe. The array is then traversed and the physical address of the page associated with each pipe buffer determined.

Excluding Socket Buffers

All application-level network communication takes place through network sockets. With each socket, the kernel associates a list of socket buffers (sk buffs) which contain data exchanged over the socket. If a process sends or receives sensitive information via an open socket (e.g. through read( ) and write( ) system calls), the information may be stored in the sk buffs of the sockets used by the process. Therefore, when excluding a process, all sockets opened by the process are detected the memory associated with sk buffs sanitized.

Identifying all descriptors of a process that represent sockets is similar to detecting pipes and FIFOs, except that the S ISSOCK macro is used. The struct socket *SOCKET I(struct inode *inode) function is used to look up struct socket structure associated with the inode of the socket file descriptor. The socket structure contains the field struct sock *sk, which contains a queue of sending sk buffs called sk write queue and a queue of receiving sk buffs called sk receive queue; both have the type struct sk buff head. These two queues from the sk buff head are then gone through. Each sk buff contains field unsigned char *data which points to the data carried by the sk buff. The contents of the data fields of each sk buff in the checkpoints are cleared, every time when the sk buff is released. For each sk buff in these two queues, virt to phys( ) macro is used to translate the virtual address of the tt sk buff to the corresponding physical address and transfer the address to the host service.

GUI Related Issues

It is common for processes to display sensitive information on the screen. When a VM is restored, but before the target process is terminated, the information displayed by the process may linger on the screen for a brief moment. To address the problem, at checkpointing time, the XCreateWindow( ) API provided by X-Windows is invoked to visually cover the windows of the target processes with black rectangles. When the checkpoint completes, the rectangles are removed and the user continues using the process. When the VM is restored, the windows remain covered. The windows are removed briefly after sending the SIGKILL signals to the target processes and unfreezing the processes. To detect all windows of a given process, the list of all open windows is traversed, and the windows' NET WM PID property—the process ID of the process owning the window, is checked.

SPARC also enables a user to choose the process to exclude from checkpointing by clicking on the process window. When the user clicks the window, SPARC automatically checks the NET WM PID property of the window and the process is then excluded as previously described. To enable this functionality, some code was borrowed from xwininfo [3], xprop [4], and slock [1] utilities.

Note that the buffers belonging to the X-windows, GTK, and other GUI components may also contain sensitive information of the process encoded in a different format. Currently pages in the checkpoints that contain clear text are zeroed out. Zeroing out pages that contain sensitive information with different formats can use a similar approach.

Excluding Terminal Applications

Applications running on terminals may take confidential data as inputs and output confidential data on the terminal. As a result, terminals where the excluded applications are running should also be excluded from being checkpointed.

In Linux, there are two main types of terminals: virtual consoles and pseudo terminals. A system typically contains 7 virtual consoles (named tty1-tty7); the first 6 consoles usually provide a text terminal interface consisting of the login and shell, and the 7th console usually provides a graphical interface. Pseudo terminal applications emulate a text terminal within some other graphical system. A typical pseudo terminal application such as xterm forks off a shell process (e.g. bash). When the user runs a command (e.g. 1s), the shell forks off a child process and replaces the child's executable image with the code of the specified command. In all terminal types, by default, the child process inherits the terminal of its parent process. In this paper, we consider two of the most often used terminals: virtual consoles and terminal emulators.

Figure 3:
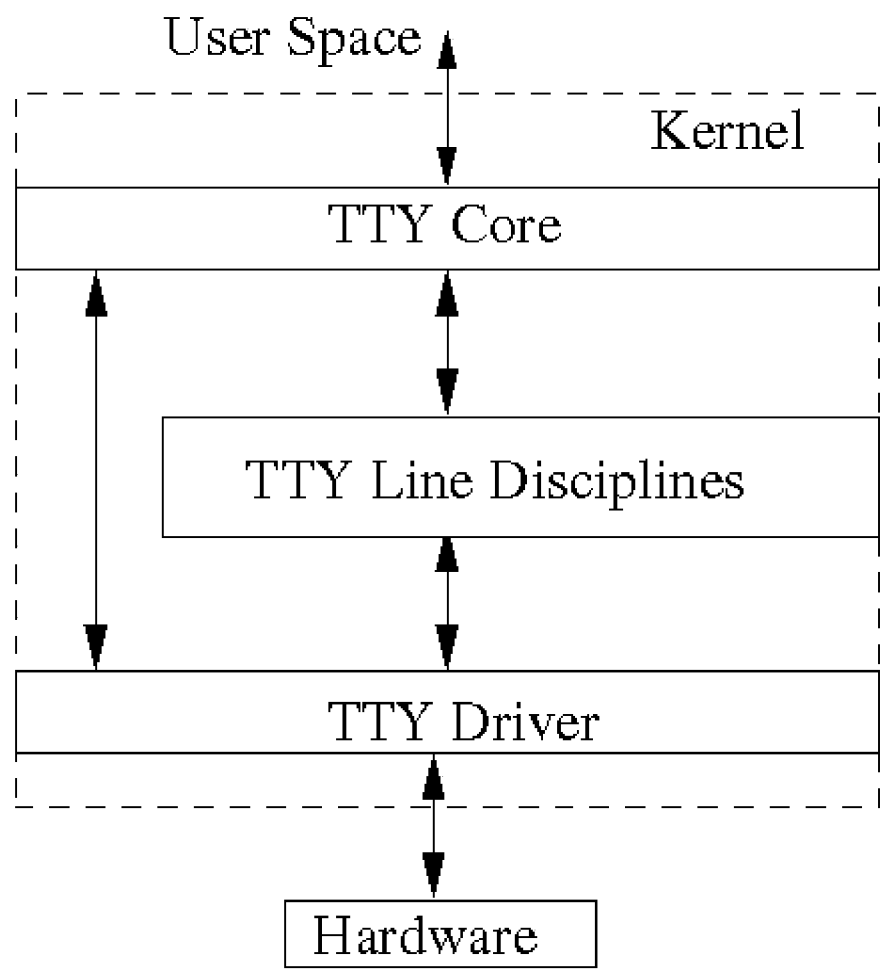
FIG. 3 shows the Teletype (TTY) subsystem architecture.
Figure 4:
FIG. 4 shows a scenario where the credit card number is checkpointed.
Figure 4:
Figure 5A:
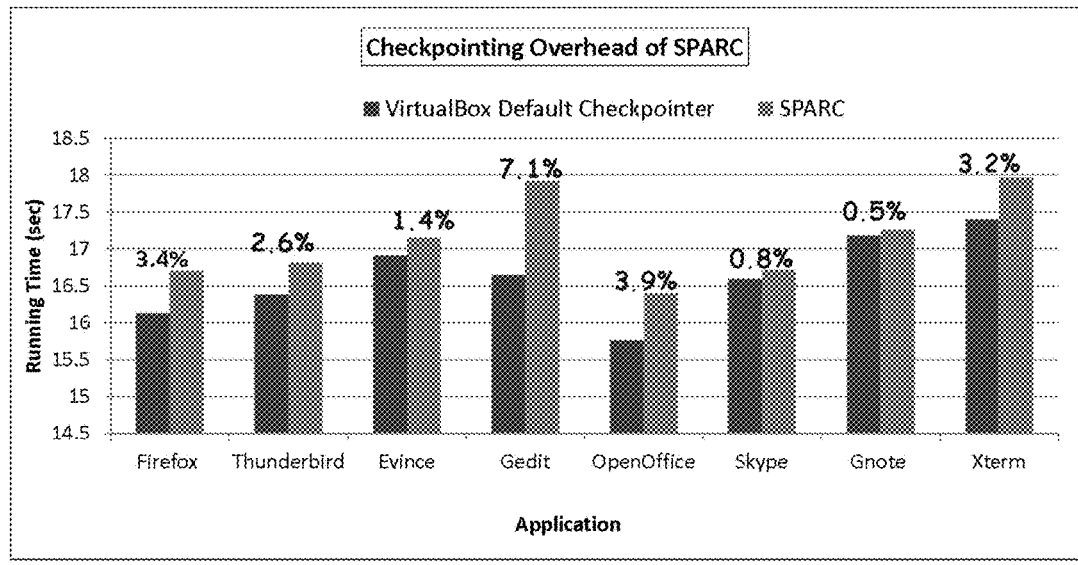
FIGS. 5A and 5B show experimental results of SPARC and VirtualBox's default checkpointing mechanism.
Figure 5B:
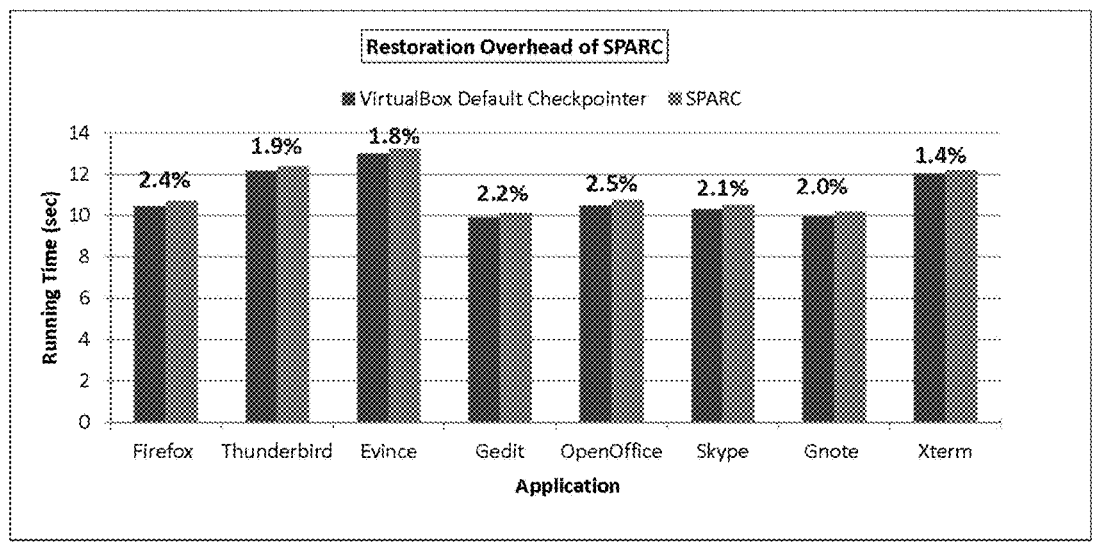

All terminals rely on the Teletype (TTY) subsystem in the kernel. FIG. 3 shows the architecture of the TTY subsystem where arrows indicate the flow of data. The uppermost layer of the TTY subsystem is the TTY core, which arbitrates the flow of data between user space and TTY. The data received by the TTY core is sent to TTY line discipline drivers, which usually convert data to a protocol specific format such as PPP or Bluetooth. Finally, the data is sent to the TTY driver, which converts the data to the hardware specific format and sends it to the hardware. There are three types of TTY drivers: console, serial port, and pseudo terminal (pty). All data received by the TTY driver from the hardware flows back up to the line disciplines and finally to the TTY core where it can be retrieved from the user space. Sometimes the TTY core and the TTY driver communicate directly [8].

Identifying Terminals where a Processes is Running

The terminal on which a process is running is identified as follows. First, the list of task structs associated with the process and refer to the field struct signal struct *signal which points to the structure containing signal related information of the process is traversed. The struct signal struct contains field struct tty struct *tty, which links together all information related to an instance of TTY subsystem. The tty struct contains field char name [64] which stores the name of the terminal where process P is running. If the process is running on the virtual console, then the name is "ttyxx" where "xx" is a number. Otherwise, if the process is running on a pseudo terminal, then the name is "ptsxx".

Once the terminal name where the process is running is determined, all other processes which are running on the same terminal are identified. Such processes will also be excluded from being checkpointed because the corresponding terminal is excluded. This is achieved by traversing the list of task structs and checking if the signal→tty→name field matches that of the tty struct of a target process. If so, the process is excluded.

If the process is running on a pseudo terminal, the pseudo terminal application (e.g. xterm) is also excluded because it may contain the input or output information of the process. The terminal application is usually not attached to the same terminal as the target process. However, the terminal application can be detected by following the task struct * real parent pointer which points to the task struct of a parent process, until the terminal application is reached. The terminal application and all its descendants are then excluded as described above.

Excluding TTY Information

An instance of the TTY subsystem associated with the console/pseudo terminal is sanitized by clearing the buffers at every level shown in FIG. 3. The tty struct representing the TTY subsystem contains all such buffers.

When excluding a virtual console, the associated tty struct is located as follows. Array vc cons of type struct vc is traversed. This structure contains a field struct vc data * d which points to the structure containing console related information including int vc num which represents the console number. If vc num matches the number of the excluded console, then the field tty struct * vc tty which points to the tty struct associated with the console is referred to.

Next, the information stored in the relevant tty structs is used to find all buffers associated with the TTY subsystem. The TTY core uses structure tty buffer to buffer the information received from the user space. The buffer includes field char buf ptr which points to the character buffer and field size which stores the size of the buffer. The tty struct contains field buf, which contains pointers to lists of all tty buffers associated with the TTY core. TTY line discipline drivers use three buffers: read buf, write buf, and echo buf. read buf stores the data received from the TTY driver, write buf stores the data received from the TTY core, which needs to be written to the TTY device, and echo buf stores the characters received from the device which need to be echoed back to the device. In experiments, no information buffered in the console driver was found. Next the physical addresses of the aforementioned buffers are obtained and send the addresses along with buffer sizes to the host service.

Excluding TTY subsystems of pseudo terminals is slightly more complex because the pseudo terminal driver (also known as pty) must be sanitized. The pseudo terminal driver is a specialized interprocess communication channel consisting of two cooperating virtual character devices: pseudo terminal master (ptm) and pseudo terminal slave (pts). Data written to the ptm is readable from the pts and vice-versa. Therefore, in a terminal emulator, a parent process can open the ptm end of the pty and control the I/O of its child processes that use the pts end as their terminal device i.e. stdin, stdout, and stderr streams. Both pts and ptm devices are associated with tty struct structure. The pts tty struct can be located by examining the field signal→tty→name of the task struct associated with children processes of the pseudo terminal application e.g. the bash shell process forked by xterm. The tty struct * link field of the pts tty struct points to the tty struct of the ptm device. The buffers of both tty structs must be cleared. The rest of the operations are similar to operations involved in excluding a virtual console.

Sensitive data may persist in the TTY subsystem buffers even after they are deallocated. Hence, to prevent such data from being checkpointed we modify functions: buffer free( ) and tty buffer free all( ) to sanitize the tty buffers on deallocation, static inline ssize t do tty write( ) and void free tty struct( ) to sanitize write buf and echo buf, and n tty close( ) to sanitize the read buf.

Experiments

The following experiments were performed.

First an xterm terminal application was run, a string entered into the xterm prompt and, the VM checkpointed. The string appeared in the .sav file 6 times. After clearing the memory of xterm and its child process bash, the string appeared in the .sav file 3 times. After zeroing out xterm, bash, and the associated TTY buffers, the string no longer appeared in the file.

In the second experiment, xterm was used to run the "su" program which is used to gain root privileges, the password entered into the su's prompt, and a checkpoint created. The string appeared twice. Clearing xterm, bash, and su processes had no effect on the number of appearances. Once we cleared the TTY buffers the string disappeared.

Performance Results

The performance of SPARC was evaluated on a number of applications that may process sensitive information: FireFox web browser, ThunderBird email client, Evince document viewer, Gedit text editor, OpenOffice Writer word processor, Skype VOIP application, Gnote desktop notes software, and Xterm terminal emulator. All experiments were conducted on a host system with Intel Dual CPU 2.26 GHz processor and 2 GB of RAM, and running Ubuntu Linux 10.4 kernel version 2.6.32, and a guest VM with 800 MB of memory, a single processor, and Ubuntu Linux 9.10 kernel version 2.6.31.

TABLE 1

Execution time for performing checkpointing using VirtualBox's checkpointing mechanism.

| | Execution Time (seconds) | | | | | | | |
|---|---|---|---|---|---|---|---|---|
| Operations | Firefox | Thunderbird | Evince | Gedit | Open Office | Skype | Gnote | Xterm |
| Checkpointing | 16.13 | 16.38 | 16.91 | 16.65 | 15.76 | 16.59 | 17.18 | 17.40 |
| Restoration | 10.45 | 12.18 | 13.02 | 9.91 | 10.49 | 10.30 | 9.97 | 12.05 |

TABLE 2

Execution time for performing checkpointing using SPARC.

| | | Execution Time (seconds) | | | | | | | |
|---|---|---|---|---|---|---|---|---|---|
| | Operations | Firefox | Thunderbird | Evince | Gedit | Open Office | Skype | Gnote | Xterm |
| 1 | Receive checkpoint notification from host | 0.00 | 0.00 | 0.00 | 0.00 | 0.00 | 0.00 | 0.00 | 0.00 |
| 2 | Identify processes running on a terminal | N/A | N/A | N/A | N/A | N/A | N/A | N/A | 0.03 |
| 3 | Freeze all user processes | 0.01 | 0.01 | 0.01 | 0.01 | 0.01 | 0.01 | 0.01 | 0.01 |
| 4 | Get physical page addresses of the process | 0.11 | 0.10 | 0.10 | 0.10 | 0.08 | 0.08 | 0.09 | 0.14 |
| 5 | Get page cache pages of the process | 0.04 | 0.03 | 0.04 | 0.05 | 0.03 | 0.04 | 0.03 | 0.06 |
| 6 | Get physical addresses of TTY buffers | N/A | N/A | N/A | N/A | N/A | N/A | N/A | 0.06 |
| 7 | Get physical addresses of pipe buffers | 0.00 | 0.00 | 0.00 | 0.00 | 0.00 | 0.00 | 0.00 | 0.00 |
| 8 | Get physical addresses of socket buffers | 0.02 | 0.03 | 0.02 | 0.02 | 0.02 | 0.02 | 0.02 | 0.03 |
| 9 | Send physical address information to host | 0.01 | 0.00 | 0.00 | 0.00 | 0.00 | 0.00 | 0.00 | 0.00 |
| 10 | Notify host service that all addresses were sent | 0.00 | 0.00 | 0.00 | 0.00 | 0.00 | 0.00 | 0.00 | 0.04 |

TABLE 2-continued

Execution time for performing checkpointing using SPARC.

| | Execution Time (seconds) | | | | | | | |
|---|---|---|---|---|---|---|---|---|
| Operations | Firefox | Thunderbird | Evince | Gedit | Open Office | Skype | Gnote | Xterm |
| 11 Receive notification that snapshot is complete | 0.01 | 0.01 | 0.02 | 0.01 | 0.00 | 0.00 | 0.00 | 0.00 |
| 12 Unfreeze processes | 0.04 | 0.03 | 0.04 | 0.04 | 0.05 | 0.04 | 0.03 | 0.02 |
| 13 Send checkpoint notification to the guest service | 0.00 | 0.00 | 0.00 | 0.00 | 0.00 | 0.00 | 0.00 | 0.00 |
| 14 Receive physical address from the guest service | 0.35 | 0.30 | 0.34 | 0.32 | 0.29 | 0.32 | 0.30 | 0.40 |
| 15 Receive notification that addresses were sent | 0.00 | 0.00 | 0.00 | 0.00 | 0.00 | 0.00 | 0.00 | 0.04 |
| 16 Create checkpoint with the process excluded | 16.96 | 16.20 | 16.48 | 17.25 | 15.76 | 16.08 | 16.61 | 17.02 |
| 17 Notify the guest that the checkpointing is completed | 0.10 | 0.10 | 0.05 | 0.10 | 0.09 | 0.08 | 0.11 | 0.10 |
| 18 Receive notification that the checkpointing is completed | 0.04 | 0.04 | 0.04 | 0.04 | 0.04 | 0.04 | 0.04 | 0.04 |
| 19 Kill the excluded processes | 0.00 | 0.00 | 0.00 | 0.00 | 0.00 | 0.00 | 0.00 | 0.00 |
| 20 Flush the page cache | 0.11 | 0.11 | 0.10 | 0.07 | 0.14 | 0.12 | 0.07 | 0.08 |
| 21 Unfreeze processes | 0.10 | 0.08 | 0.09 | 0.11 | 0.09 | 0.05 | 0.08 | 0.05 |
| 22 Checkpointing | 16.70 | 16.82 | 17.15 | 17.92 | 16.40 | 16.72 | 17.26 | 17.97 |
| 23 Restoration | 10.71 | 12.41 | 13.26 | 10.13 | 10.76 | 10.52 | 10.17 | 12.22 |

Tables 1 and 2 give the execution time when performing checkpointing using VirtualBox's default mechanism and using SPARC, respectively. Each data point reported is an average of execution time over 5 runs. Note that the time it takes for VirtualBox to perform checkpointing depends on the number of memory pages that are dirty; the more pages are dirty, the longer time the checkpointing is performed. In our experiments, prior to checkpointing, we run a program which allocates large amounts of memory and fills the memory with random data. The average sizes of .sav file after checkpointing is around 630 MB. The column heading "Operations" in these two tables gives the various operations performed. In particular, in Table 1(b), operations 1-12 and 13-18 are conducted by the guest and host services to perform checkpointing respectively, operations 19-21 are performed by the guest service to restore the VM. Rows 22 and 23 in Table 1(b) give the overall checkpointing time and the over overall restoration time, respectively. Note that, because some of the operations are performed in parallel by the guest and the host service, the numbers in row 22 are slightly higher than the actual execution time.

Observe from Tables 1(a) and 1(b) that, SPARC imposes 0:51%-7:01% overhead on checkpointing, 1:38%-2:51% overhead on restoration, and 1:02%-5:29% of overall overhead. The overheads of SPARC can be further reduced by using system-specific optimizations. For example, in VirtualBox the overhead of communication between host and guest services can likely be reduced by using the Host-Guest communication mechanism. This however, comes with cost of added implementation complexity.

Hardware Overview

Figure 6:
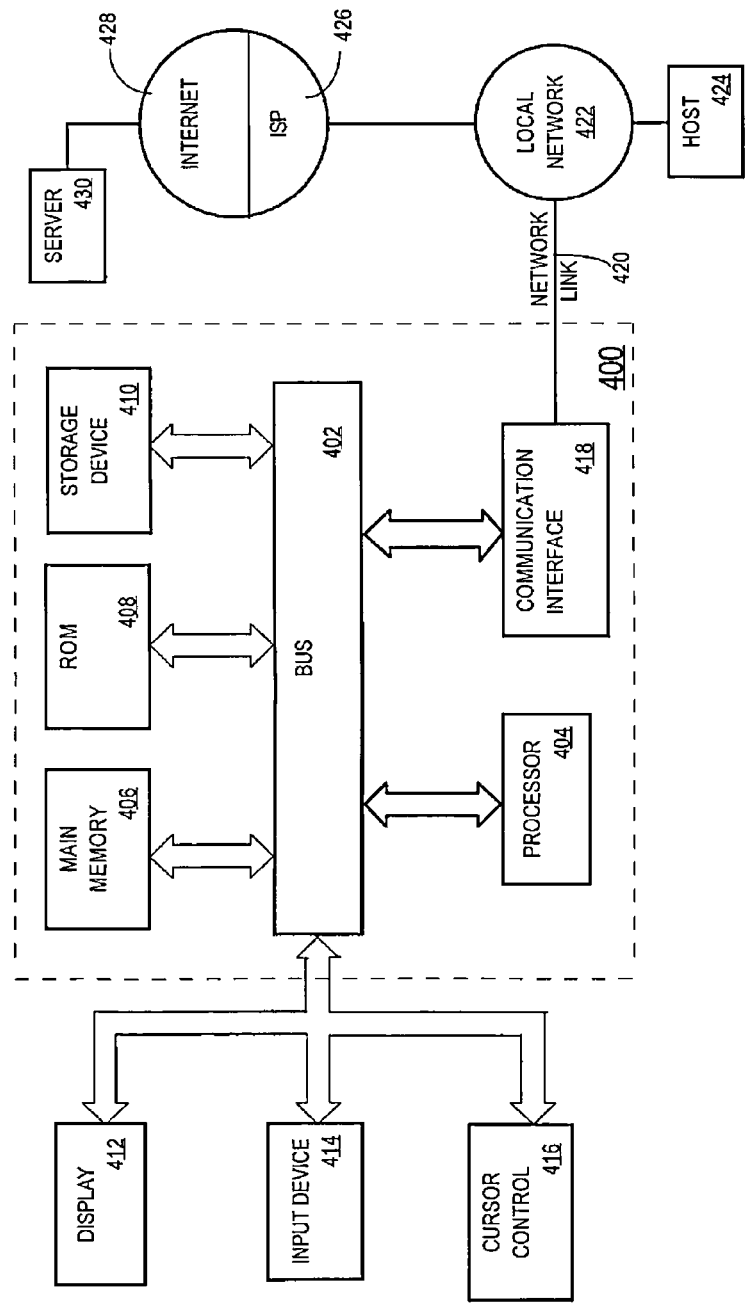
FIG. 6 shows a hardware overview.

FIG. 6 (see U.S. Pat. No. 7,702,660, expressly incorporated herein by reference), shows a block diagram that illustrates a computer system 400 upon which an embodiment may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. The computer system may also employ non-volatile memory, such as FRAM and/or MRAM.

The computer system may include a graphics processing unit (GPU), which, for example, provides a parallel processing system which is architected, for example, as a single instruction-multiple data (SIMD) processor. Such a GPU may be used to efficiently compute transforms and other readily parallelized and processed according to mainly consecutive unbranched instruction codes.

Computer system 400 may be coupled via bus 402 to a display 412, such as a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

As discussed above, the present technology provides an alternate or supplemental user input system and method, which may advantageously be used in conjunction with other user interface functions which employ the same camera or cameras.

The technology is related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions for implementation. Thus, embodiments of are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, semiconductor devices, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine. Wireless or wired communications, using digitally modulated electromagnetic waves are preferred.

Common forms of machine-readable media include, for example, hard disk (or other magnetic medium), CD-ROM, DVD-ROM (or other optical or magnetoptical medium), semiconductor memory such as RAM, PROM, EPROM, FLASH-EPROM, any other memory chip or cartridge, a carrier wave as described hereinafter, or any other medium from which a computer can read. Various forms of machine-readable media may be involved in carrying one or more sequences of one or more instructions to processor 404 for execution.

For example, the instructions may initially be carried on a magnetic disk of a remote computer. The remote computer can load the instructions into its dynamic memory and send the instructions over the Internet through an automated computer communication network. An interface local to computer system 400, such as an Internet router, can receive the data and communicate using a wireless Ethernet protocol (e.g., IEEE-802.11n) to a compatible receiver, and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

U.S. 2012/0173732, expressly incorporated herein by reference, discloses various embodiments of computer systems, the elements of which may be combined or subcombined according to the various permutations.

In this description, several preferred embodiments were discussed. It is understood that this broad invention is not limited to the embodiments discussed herein, but rather is composed of the various combinations, subcombinations and permutations thereof of the elements disclosed herein. The invention is limited only by the following claims.

References (Each of the following references is expressly incorporated herein by reference in its entirety.)

[1] slock. tools.suckless.org/slock.
[2] Vmware ace virtualization suite. www.vmware.com/products/ace/.
[3] Xfree86. www.xfree86.org/4.2.0/xwininfo.1.html.
[4] Xfree86. www.xfree86.org/current/xprop.1.html.
[5] D. P. Bovet and M. C. Ph. Understanding the Linux Kernel, Third Edition. O'Reilly Media, 3 edition, November 2005.
[6] J. Chow, B. Pfaff, T. Garfinkel, K. Christopher, and M. Rosenblum. Understanding data lifetime via whole system simulation. In Proceedings of USENIX Security Symposium, pages 22-22, 2004.
[7] J. Chow, B. Pfaff, T. Garfinkel, and M. Rosenblum. Shredding your garbage: reducing data lifetime through secure deallocation. In Proceedings of the USENIX Security Symposium, pages 22-22, 2005.
[8] J. Corbet, A. Rubini, and G. Kroah-Hartman. Linux Device Drivers, 3rd Edition. O'Reilly Media, Inc., 2005.
[9] S. Davidoff. Cleartext passwords in linux memory. www.philosecurity.org, 2008.

[10] A. Dinaburg, P. Royal, M. Sharif, and W. Lee. Ether: malware analysis via hardware virtualization extensions. In 15th ACM conference on Computer and communications security, pages 51-62, 2008.

[11] G. W. Dunlap, S. T. King, S. Cinar, M. A. Basrai, and P. M. Chen. Revirt: Enabling intrusion analysis through virtual-machine logging and replay. In Proceedings of the 2002 Symposium on Operating Systems Design and Implementation (OSDI), pages 211-224, 2002.

[12] T. Garfinkel, B. Pfaff, J. Chow, and M. Rosenblum. Data lifetime is a systems problem. In Proc. of ACM SIGOPS European workshop. ACM, 2004.

[13] T. Garfinkel, B. Pfaff, J. Chow, M. Rosenblum, and D. Boneh. Terra: a virtual machine-based platform for trusted computing. pages 193-206. ACM Press, 2003.

[14] T. Garfinkel and M. Rosenblum. A virtual machine introspection based architecture for intrusion detection. In Proc. Network and Distributed Systems Security Symposium, pages, pages 191-206, 2003.

[15] T. Garfinkel and M. Rosenblum. When virtual is harder than real: security challenges in virtual machine based computing environments. In Proceedings of the 10th conference on Hot Topics in Operating Systems, pages 20-20, 2005.

[16] Google Corp. Inter-process communication. dev.chromium.org/developers/design-documents/inter-process-communication.

[17] A. Joshi, S. T. King, G. W. Dunlap, and P. M. Chen. Detecting past and present intrusions through vulnerability-specific predicates. In Proceedings of the twentieth ACM symposium on Operating systems principles, pages 91-104, 2005.

[18] S. T. King, G. W. Dunlap, and P. M. Chen. Debugging operating systems with time-traveling virtual machines. pages 1-15, 2005.

[19] K. Kourai and S. Chiba. Hyperspector: Virtual distributed monitoring environments for secure intrusion detection. In ACM/USENIX International Conference on Virtual Execution Environments, pages 197-207, 2005.

[20] D. Lezcano. Linux containers. lxc.sourceforge.net/lxc.html.

[21] Microsoft Corp. Hyper-v server 2008 r2.www.microsoft.com/hyper-v-server/en/us/overview.aspx.

[22] A. M. Nguyen, N. Schear, H. Jung, A. Godiyal, S. T. King, and H. D. Nguyen. Mavmm: Lightweight and purpose built vmm for malware analysis. In Annual Computer Security Applications Conference, pages 441-450, 2009.

[23] D. Nurmi, R. Wolski, C. Grzegorczyk, G. Obertelli, S. Soman, L. Youseff, and D. Zagorodnov. The eucalyptus open-source cloud-computing system. In Proceedings of the 9th IEEE/ACM International Symposium on Cluster Computing and the Grid, pages 124-131, 2009.

[24] D. A. S. d. Oliveira and S. F. Wu. Protecting kernel code and data with a virtualization-aware collaborative operating system. In Annual Computer Security Applications Conference, pages 451-460, 2009.

[25] Oracle Corp. Virtualbox. www.VirtualBox.org.

[26] B. D. Payne, M. Carbone, M. Sharif, and W. Lee. Lares: An architecture for secure active monitoring using virtualization. In IEEE Symposium on Security and Privacy, pages 233-247, 2008.

[27] R. Riley, X. Jiang, and D. Xu. Guest-transparent prevention of kernel rootkits with vmm-based memory shadowing. In the 11th international symposium on Recent Advances in Intrusion Detection, pages 1-20, 2008.

[28] N. Santos, K. P. Gummadi, and R. Rodrigues. Towards trusted cloud computing. In HOTCLOUD, 2009.

[29] A. Seshadri, M. Luk, N. Qu, and A. Perrig. Secvisor: a tiny hypervisor to provide lifetime kernel code integrity for commodity uses. In Proceedings of Twenty-First ACM SIGOPS symposium on Operating Systems Principles, pages 335-350, 2007.

[30] D. A. Solomon and M. Russinovich. Inside Microsoft Windows 2000. Microsoft Press, 2000.

[31] VMware.Cloud computing.www.vmware.com/solutions/cloud-computing/.

[32] VMware Inc. www.vmware.com/.

[33] VMware Inc. Vmware infrastructure. www.vmware.com/landing_pages/discover.html.

[34] Xen. Xen cloud platform—advanced virtualization infrastructure for the clouds. www.xen.org/products/cloudxen.html.

[35] A. Kivity, Y. Kamay, D. Laor, U. Lublin, and A. Liguori. kvm: the linux virtual machine monitor. In Proc. of the Linux Symposium, pages 225-230, June 2007.

[36] M. Balduzzi, J. Zaddach, D. Balzarotti, E. Kirda, and S. Loureiro. A security analysis of amazon's elastic compute cloud service. In ACM Symposium on Applied Computing, pages 1427-1434, 2012.

[37] OpenVZ. Container-based Virtualization for Linux, www.openvz.com/.

[38] M. I. Gofman, R. Luo, P. Yang, and K. Gopalan. SPARC: A security and privacy aware virtual machine checkpointing mechanism. In Proceedings of the 10th annual ACM Workshop on Privacy in the Electronic Society (WPES), in conjunction with the ACM Conference on Computer and Communications Security (CCS), pages 115-124, 2011.

What is claimed is:

1. A method of preventing restoration of private information from a checkpoint creation within a virtual machine, comprising:

(a) identifying all memory occupied by data from at least one application executing under control of a hypervisor of the virtual machine in a memory space of a computer, with a guest process;

(b) determining inter-process dependencies with the guest process;

(c) identifying kernel state memory pages which represent an internal kernel state of a kernel;

(d) upon initiation of checkpoint creation, requesting from the guest process the identified physical identifying memory addresses of the memory pages that belong to the at least one of:

memory pages that belong to the at least one application, by the guest process, memory pages the belong to processes that depend on the at least one application based on the determined inter-process dependencies, by the guest process, and kernel state memory pages, and providing the requested identified physical memory addresses of the memory pages that belong to the at least one application to the hypervisor;

(e) at least one of obscuring and segregating at least a portion of information in the memory pages corresponding to the received identification of the memory addresses;

(f) persistently storing a checkpoint file representing a state of the hypervisor with the at least a portion of the memory pages corresponding to the received identification of the memory addresses at least one of obscured and segregated; and (g) restoring a prior state of the hypervisor from the persistently stored checkpoint file, wherein the restored prior state of the hypervisor is sufficient to resume operation of the virtual machine, other than the at least one application and the processes that depend on the at least one application.

2. The method according to claim 1, wherein the virtual machine has a user space which supports user processes and a kernel space which supports kernel processes, and wherein all user space processes within the virtual machine are frozen, except the guest process, between the initiation of the checkpoint creation and said persistently storing the checkpoint file.

3. The method according to claim 1, wherein the inter-process dependencies comprise information in teletype (TTY) buffers, socket buffers, pipe buffers, and first-in first-out (FIFO) buffers.

4. The method according to claim 1, wherein a process container is provided to encapsulate all memory pages and files associated with the at least one application, wherein the memory pages within the process container are excluded from the checkpoint file.

5. The method according to claim 1, wherein a process container is provided to encapsulate all memory pages and files associated with a respective at least one application, wherein the memory pages and files within the process container are separately stored within a respective checkpoint file.

6. The method according to claim 1, wherein the checkpoint file is encrypted.

7. The method according to claim 1, further comprising determining the inter-process dependencies for the at least one application executing within the virtual machine by a static analysis.

8. The method according to claim 1, further comprising determining the inter-process dependencies for a plurality of applications executing within the virtual machine by static analysis and dynamic analysis.

9. The method according to claim 1, further comprising determining a status of a communication of the at least one application, and deferring initiation of checkpoint creation with respect to the at least one application until completion of the communication.

10. The method according to claim 1, further comprising:
communicating a message to the at least one application prior to initiation of checkpoint creation;
assuming a safe state by the at least one application, in which confidential information is removed from the memory pages within the persistently stored checkpoint file; and
wherein said restoring a prior state of the hypervisor comprises reverting the at least one application to a normal operation state absent the removed confidential information.

11. The method according to claim 10, further comprising:
after restoring the prior state of the virtual machine from the persistently stored checkpoint file informing the at least one application that the virtual machine is restored.

12. The method according to claim 1, further comprising, before persistently storing the checkpoint file:

initiating a checkpointing process;
sanitizing kernel space memory by pausing system calls and I/O requests from the at least one application by the kernel;
completing or flushing any pending I/O operations of the at least one application; and
removing data from all I/O buffers after the completion of the I/O operations.

13. The method according to claim 1, further comprising:
(a) monitoring an input-output data stream communication from non-program memory sources during a computing session, and storing a series of states representing activities of the at least one application with respect to respective associated input-output data stream communications;
(b) an least one of searching and cross correlating the checkpoint file with data from the monitored input-output data stream communication;
(c) tagging instances of data within the checkpoint file based on a match or cross correlation of portions of the checkpoint file with data from the monitored input-output data stream communication; and
(d) restoring the virtual machine to substantially resume operation, based on the persistently stored checkpoint file, wherein a state of the at least one application is rolled back to a state prior to a respective monitored input-output data stream communication.

14. A method of preserving privacy of information during a checkpoint restoration process of a virtual machine, comprising:
(a) monitoring an input-output data stream communication from non-program memory sources during a computing session prior to creation of a checkpoint file, and storing data representing a series of states representing activities of at least one application executing on the virtual machine with respect to their associated input-output data stream communications;
(b) at least one of searching and cross correlating a created checkpoint file with the data from the monitored input-output data stream communication;
(c) tagging instances of data within the created checkpoint file based on at least one of a match and a cross correlation of portions of the created checkpoint file with the data from the monitored input-output data stream communication; and
(d) restoring the virtual machine to substantially resume operation, based on the created checkpoint file, wherein a state of the at least one application is rolled back to a state prior to a respective monitored input-output data stream communication based on at least the tagged instances of data.

15. The method according to claim 14, wherein a process container is provided to encapsulate all memory pages and files associated with the at least one application, wherein the memory pages within the process container are at least one of excluded from and obscured within, the checkpoint file.

16. The method according to claim 14, further comprising:
determining inter-process dependencies for the at least one application executing within the virtual machine by static analysis and dynamic analysis; and
tagging at least a portion of instances of data within the created checkpoint file dependent on the inert-process dependencies.

17. The method according to claim 14, further comprising determining a status of a communication of the at least one application, and deferring a creation of the checkpoint file with respect to the at least one application until completion of the communication.

18. The method according to claim 14, further comprising:
prior to creation of the checkpoint file:
communicating a message to the at least one application;
assuming a safe state by the at least one application, in which private information is removed from the memory pages which are to be captured within the created checkpoint file;
sanitizing kernel space memory by pausing system calls and I/O requests from the at least one application by the kernel;
at least one of completing and flushing any pending I/O operations of the at least one application; and
removing data from all I/O buffers after the completion of the I/O operations;
creating the checkpoint file; and
after creating the checkpoint file;
reverting the at least one application to a normal operation state;
restoring an operation state of the virtual machine from the checkpoint file; and
informing the at least one application that the virtual machine is restored from a checkpoint file.

19. A method of checkpoint creation by a hypervisor of a virtual machine having at least one transaction processing application executing in the virtual machine under control of the hypervisor, comprising:
(a) identifying memory pages occupied by:
(i) data from the at least one application, by a guest process;
(ii) data from processes having inter-process dependencies with the at least one application, by the guest process; and
(iii) data which represents an internal kernel state of a kernel;
(b) at least one of obscuring and segregating at least a portion of information in the identified memory pages representing data associated with particular user sessions of use of the at least one application;
(c) persistently storing a checkpoint file representing a state of the virtual machine with the at least a portion of the memory pages corresponding to the received identification of the memory pages at least one of obscured and segregated; and
(d) restoring a prior state of the virtual machine from the persistently stored checkpoint file, wherein the restored prior state of the hypervisor is sufficient to resume operation of the virtual machine, other than the particular user sessions of use of the at least one application.

20. The method according to claim 19, further comprising, prior to identifying the memory pages:
assuming a safe state by the at least one application, in which data associated with user sessions of use of the at least one application is removed from the memory pages;
sanitizing kernel space pages by pausing system calls and I/O requests from the at least one application by the kernel;
at least one of completing and flushing any pending I/O operations of the at least one application; and
removing data from all I/O buffers after the completion of the I/O operations.

* * * * *